United States Patent
Chalmers et al.

(10) Patent No.: US 11,995,483 B2
(45) Date of Patent: *May 28, 2024

(54) DEVICES, METHODS, AND USER INTERFACES FOR PROVIDING AUDIO NOTIFICATIONS

(71) Applicant: Apple Inc., Cupertino, CA (US)

(72) Inventors: Devin W. Chalmers, Oakland, CA (US); Sean B. Kelly, San Francisco, CA (US); Karlin Y. Bark, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,804

(22) Filed: Dec. 13, 2021

(65) Prior Publication Data
US 2022/0100590 A1    Mar. 31, 2022

Related U.S. Application Data

(63) Continuation of application No. 16/575,299, filed on Sep. 18, 2019, now Pat. No. 11,231,975.
(Continued)

(51) Int. Cl.
*G06F 3/00* (2006.01)
*G06F 3/01* (2006.01)
(Continued)

(52) U.S. Cl.
CPC .............. *G06F 9/542* (2013.01); *G06F 3/011* (2013.01); *G06F 3/017* (2013.01); *H04L 51/224* (2022.05)

(58) Field of Classification Search
CPC .......... G06F 3/017; G06F 3/011; G06F 9/542; H04L 51/224
See application file for complete search history.

(56) References Cited

U.S. PATENT DOCUMENTS

| | | |
|---|---|---|
| 5,561,444 A | 10/1996 | Johnston, Jr. et al. |
| 9,264,803 B1 | 2/2016 | Johnson et al. |

(Continued)

FOREIGN PATENT DOCUMENTS

| | | |
|---|---|---|
| CN | 103970460 A | 8/2014 |
| CN | 105955617 A | 9/2016 |

(Continued)

OTHER PUBLICATIONS

Office Action, dated Oct. 27, 2020, received in U.S. Appl. No. 16/575,299, 17 pages.

(Continued)

*Primary Examiner* — Kyle R Stork
(74) *Attorney, Agent, or Firm* — Morgan, Lewis & Bockius LLP

(57) ABSTRACT

An electronic device that is in communication with one or more wearable audio output devices detects occurrence of an event while the one or more wearable audio output devices are being worn by a user. In response to detecting the occurrence of the event, the electronic device outputs, via the one or more wearable audio output devices, one or more audio notifications corresponding to the event, including: in accordance with a determination that the user of the electronic device is currently engaged in a conversation, delaying outputting the one or more audio notifications corresponding to the event until the conversation has ended; and, in accordance with a determination that the user of the electronic device is not currently engaged in a conversation, outputting the one or more audio notifications corresponding to the event without delaying the outputting.

27 Claims, 57 Drawing Sheets

Related U.S. Application Data

(60) Provisional application No. 62/739,176, filed on Sep. 29, 2018.

(51) Int. Cl.
  *G06F 9/54* (2006.01)
  *H04L 51/224* (2022.01)

(56) References Cited

U.S. PATENT DOCUMENTS

| | | | |
|---|---|---|---|
| 10,051,107 | B1 | 8/2018 | Prasad et al. |
| 10,051,604 | B2 | 8/2018 | Ryu et al. |
| 11,057,866 | B2 * | 7/2021 | Ryu ............ H04W 88/02 |
| 11,093,110 | B1 * | 8/2021 | Bossio ............ G10L 15/26 |
| 11,231,975 | B2 * | 1/2022 | Chalmers ............ H04L 51/224 |
| 2013/0244633 | A1 | 9/2013 | Jacobs et al. |
| 2015/0193098 | A1 | 7/2015 | Kauffmann et al. |
| 2015/0230022 | A1 | 8/2015 | Sakai et al. |
| 2015/0341489 | A1 * | 11/2015 | Weksler ............ H04M 3/533 |
| | | | 455/414.1 |
| 2016/0014266 | A1 | 1/2016 | Bhatt |
| 2016/0357510 | A1 | 12/2016 | Watson et al. |
| 2017/0280223 | A1 | 9/2017 | Cavarra et al. |
| 2018/0025325 | A1 | 1/2018 | Bosko et al. |
| 2018/0090143 | A1 | 3/2018 | Saddler et al. |
| 2018/0109751 | A1 | 4/2018 | Choi et al. |
| 2018/0166044 | A1 | 6/2018 | Heo et al. |
| 2018/0270343 | A1 | 9/2018 | Rout et al. |
| 2018/0359349 | A1 | 12/2018 | Graylin et al. |
| 2020/0033932 | A1 | 1/2020 | Sachs et al. |
| 2020/0066236 | A1 | 2/2020 | Giusti et al. |
| 2020/0104194 | A1 | 4/2020 | Chalmers et al. |
| 2022/0100590 | A1 | 3/2022 | Chalmers et al. |
| 2022/0342628 | A1 | 10/2022 | Carrigan et al. |

FOREIGN PATENT DOCUMENTS

| | | | |
|---|---|---|---|
| CN | 106020763 | A | 10/2016 |
| CN | 107231473 | A | 10/2017 |
| CN | 108292203 | A | 7/2018 |
| CN | 108604178 | A | 9/2018 |
| KR | 20140147557 | A | 12/2014 |
| KR | 20150135057 | A | 12/2015 |
| WO | WO 2018169763 | A1 | 9/2018 |

OTHER PUBLICATIONS

Office Action, dated Mar. 24, 2021, received in U.S. Appl. No. 16/575,299, 18 pages.
Notice of Allowance, dated Oct. 15, 2021, received in U.S. Appl. No. 16/575,299, 18 pages.
Office Action, dated Oct. 11, 2021, received in Australian U.S. Appl. No. 16/575,299, which corresponds with U.S. Appl. No. 16/575,299, 3 pages.
Invitation to Pay Additional Fees, dated Jan. 9, 2020, received in International Patent Application No. PCT/US2019/052239, which corresponds with U.S. Appl. No. 16/575,299, 15 pages.
Notice of Allowance, dated Apr. 28, 2022, received in Australian Patent Application No. 2019347704, which corresponds with U.S. Appl. No. 16/575,299, 3 pages.
Certificate of Grant, dated Sep. 1, 2022, received in Australian Patent Application No. 2019347704, which corresponds with U.S. Appl. No. 16/575,299, 3 pages.
Office Action, dated May 8, 2023, received in European Patent Application No. 19782853.6, which corresponds with U.S. Appl. No. 16/575,299, 10 pages.
Office Action, dated Dec. 14, 2022, received in Indian Patent Application No. 202117009676, 9 pages.
Office Action, dated May 6, 2022, received in Japanese Patent Application No. 2021-510170, which corresponds with U.S. Appl. No. 16/575,299, 2 pages.
Patent, dated May 20, 2022, received in Japanese Patent Application No. 2021-510170, which corresponds with U.S. Appl. No. 16/575,299, 2 pages.
Office Action, dated Sep. 25, 2022, received in Korean Patent Application No. 2021-7004686, which corresponds with U.S. Appl. No. 16/575,299, 11 pages.
Patent, dated May 19, 2023, received in Korean Patent Application No. 2021-7004686, which corresponds with U.S. Appl. No. 16/575,299, 4 pages.
Office Action, dated Jun. 26, 2023, received in Japanese Patent Application No. 2022-081683, which corresponds with U.S. Appl. No. 17/549,804, 2 pages.
Office Action, dated Jan. 20, 2024, received in Chinese Patent Application No. 22190375.0, which corresponds with U.S. Appl. No. 16/575,299, 2 pages.
Office Action, dated Jan. 11, 2024, received in Korean Patent Application No. 2023-7017055, which corresponds with U.S. Appl. No. 17/549,804, 9 pages.
Office Action, dated Aug. 24, 2023, received in Chinese Patent Application No. 2018800323358, which corresponds with U.S. Appl. No. 17/138,602, 1 page.
Intent to Grant, dated Jan. 5, 2024, received in Chinese Patent Application No. 2018800323358, which corresponds with U.S. Appl. No. 17/138,602, 2 pages.
Office Action, dated May 30, 2023, received in Australian Patent Application No. 2022218518, which corresponds with U.S. Appl. No. 17/549,804, 3 pages.
Notice of Allowance, dated Jan. 15, 2024, received in Australian Patent Application No. 2022218518, which corresponds with U.S. Appl. No. 17/549,804, 5 pages.

* cited by examiner

First time placing headphone(s) in ear in a day:

Messages received:

508-1 Harold Smith: Hey, I'll be in town next Wednesday through Sunday 508-2 Barbara Lee (Mom): Are you coming home this weekend?

508-3 Barbara Lee (Mom): Don't forget it's dad's birthday.

508-4 Harold Smith: Let's find a time to catch up.

Messages received:

508-4 Harold Smith: Let's find a time to catch up.

508-5 Team (group message): John Godfrey: Running ten minutes late, sorry.

508-6 Team (group message): Alice Young: No problem. We'll discuss other projects first.

534 Current time: 10:20 AM
536 Current location: Lobby, Building 1

530 Event Notification:
    531 Subject: Project Status Updates
    532 Time: 10:30 AM
    533 Location: Apollo conference room, Building 1, N. De Anza Blvd., Cupertino 544 Current time: 2:50 PM
546 Current location: Lobby, Building 1

540 Event Notification:
    541 Subject: Test Bench Evaluation
    542 Time: 3:00 PM
    543 Location: Montara conference room, Building 5, S. Main St., Sunnyvale No notifications received in last 10 minutes:

Notifications received:

558-1 Travis: Thanks for covering me at lunch.
558-2 Travis: Sending you back $
558-3 Travis sent you a payment for "lunch".

560-1 Octavia: Need to reschedule our 3 pm meeting.
560-2 Octavia: I'll send you an updated calendar invite.
560-3 Event Invitation: From: Octavia, Time: 4:30 PM 562-1 Ellie: Look at this cutie I met on my run
562-2 Ellie: 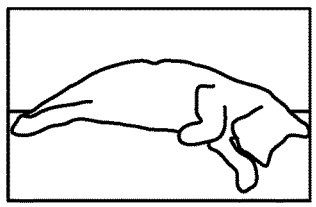

562-3 Ellie: By the way Mom texted me earlier.
562-4 Ellie: Are you going home for dad's birthday?
562-5 Ellie: Can you pick me up?

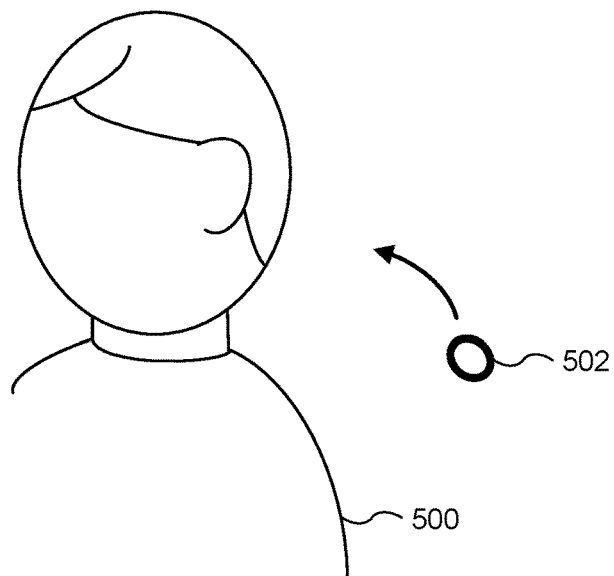

Figure 5G

Notifications received:

558-1 Travis: Thanks for covering me at lunch.
558-2 Travis: Sending you back $
558-3 Travis sent you a payment for "lunch".

560-1 Octavia: Need to reschedule our 3 pm meeting.
560-2 Octavia: I'll send you an updated calendar invite.
560-3 Event Invitation: From: Octavia, Time: 4:30 PM 562-1 Ellie: Look at this cutie I met on my run
562-2 Ellie: 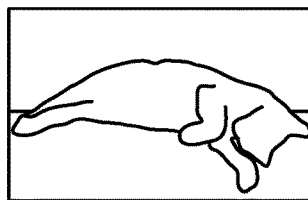

562-3 Ellie: By the way Mom texted me earlier.
562-4 Ellie: Are you going home for dad's birthday?
562-5 Ellie: Can you pick me up?

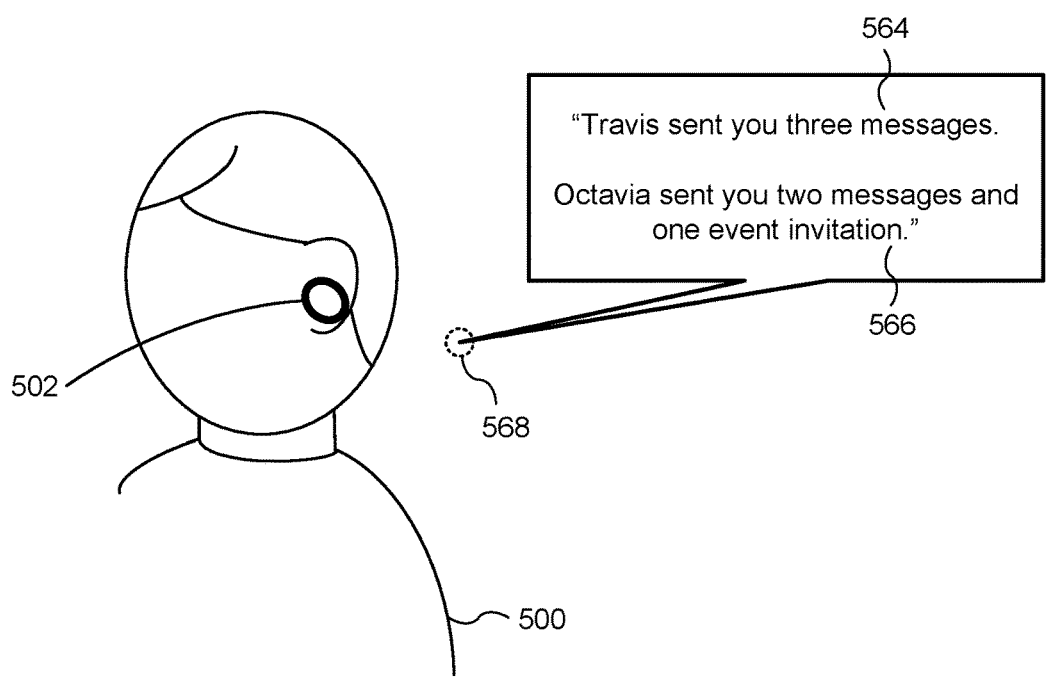

Figure 5H

Notifications received:

558-1 Travis: Thanks for covering me at lunch.
558-2 Travis: Sending you back $
558-3 Travis sent you a payment for "lunch".

560-1 Octavia: Need to reschedule our 3 pm meeting.
560-2 Octavia: I'll send you an updated calendar invite.
560-3 Event Invitation: From: Octavia, Time: 4:30 PM 562-1 Ellie: Look at this cutie I met on my run
562-2 Ellie: 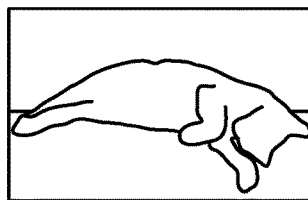

562-3 Ellie: By the way Mom texted me earlier.
562-4 Ellie: Are you going home for dad's birthday?
562-5 Ellie: Can you pick me up?

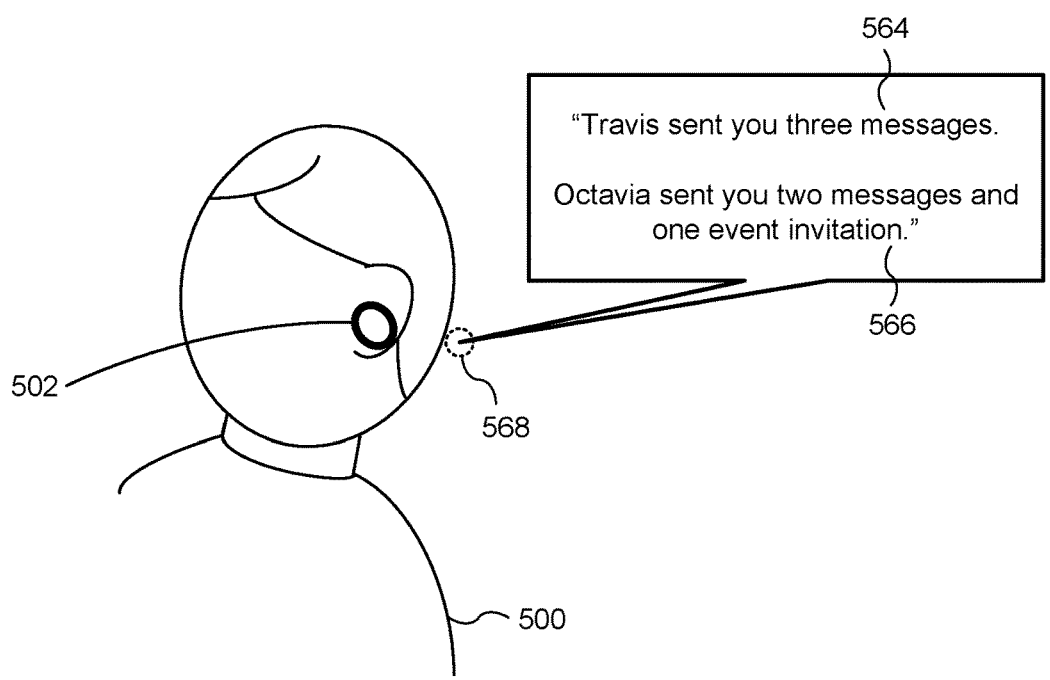

Figure 5I

Notifications received:

558-1 Travis: Thanks for covering me at lunch.
558-2 Travis: Sending you back $
558-3 Travis sent you a payment for "lunch".

560-1 Octavia: Need to reschedule our 3 pm meeting.
560-2 Octavia: I'll send you an updated calendar invite.
560-3 Event Invitation: From: Octavia, Time: 4:30 PM 562-1 Ellie: Look at this cutie I met on my run
562-2 Ellie: 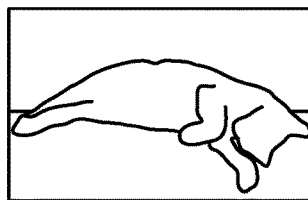

562-3 Ellie: By the way Mom texted me earlier.
562-4 Ellie: Are you going home for dad's birthday?
562-5 Ellie: Can you pick me up?

"Travis sent you three messages.

Octavia sent you two messages and one event invitation."

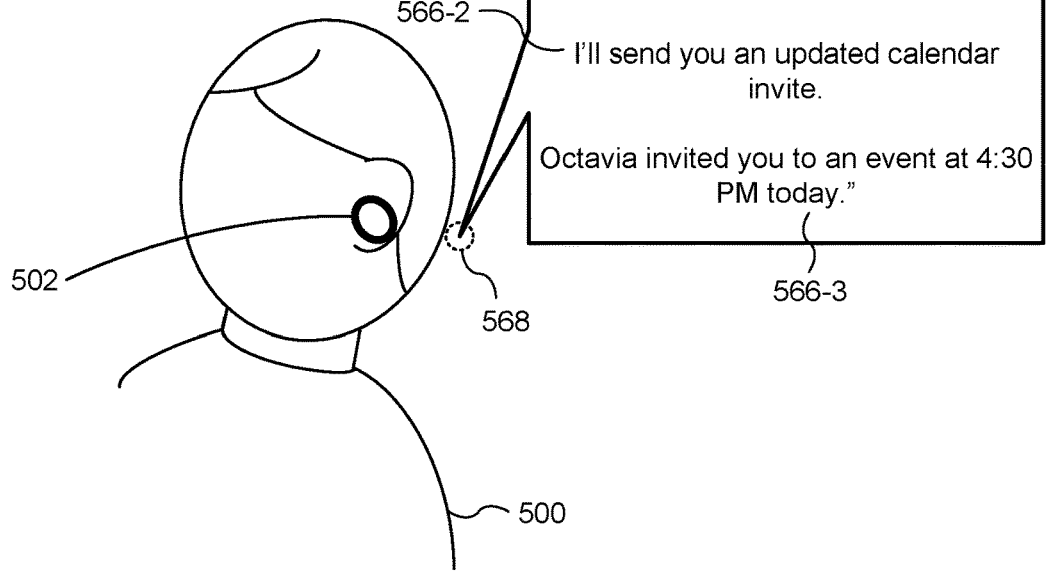

Figure 5J

Notifications received:

558-1 Travis: Thanks for covering me at lunch.
558-2 Travis: Sending you back $
558-3 Travis sent you a payment for "lunch".

560-1 Octavia: Need to reschedule our 3 pm meeting.
560-2 Octavia: I'll send you an updated calendar invite.
560-3 Event Invitation: From: Octavia, Time: 4:30 PM 562-1 Ellie: Look at this cutie I met on my run
562-2 Ellie: 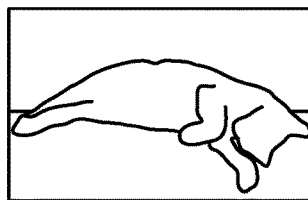

562-3 Ellie: By the way Mom texted me earlier.
562-4 Ellie: Are you going home for dad's birthday?
562-5 Ellie: Can you pick me up?

"Octavia says: Need to reschedule our 3 PM meeting.

I'll send you an updated calendar invite.

Octavia invited you to an event at 4:30 PM today."

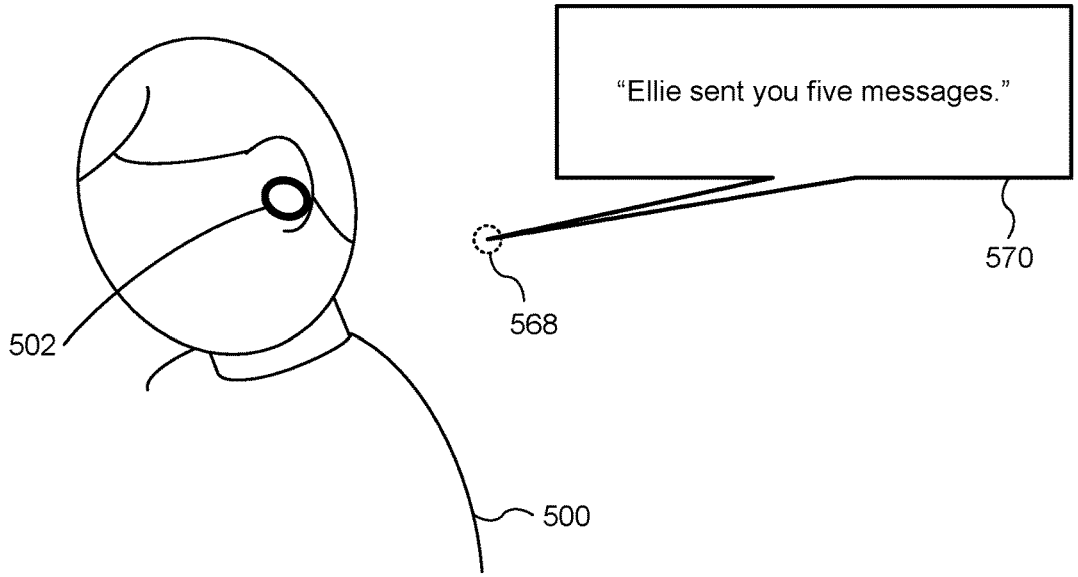

"Ellie sent you five messages."

Figure 5K

Notifications received:

558-1 Travis: Thanks for covering me at lunch.
558-2 Travis: Sending you back $
558-3 Travis sent you a payment for "lunch".

560-1 Octavia: Need to reschedule our 3 pm meeting.
560-2 Octavia: I'll send you an updated calendar invite.
560-3 Event Invitation: From: Octavia, Time: 4:30 PM 562-1 Ellie: Look at this cutie I met on my run
562-2 Ellie: 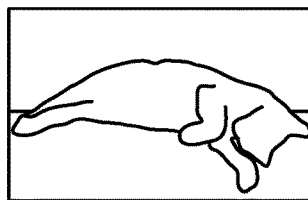

562-3 Ellie: By the way Mom texted me earlier.
562-4 Ellie: Are you going home for dad's birthday?
562-5 Ellie: Can you pick me up?

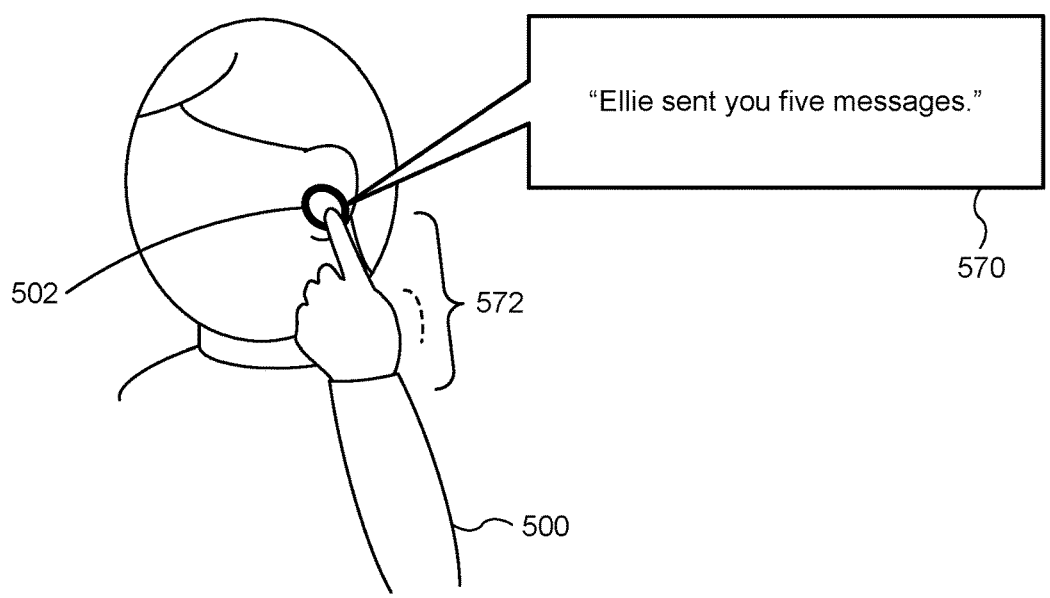

Figure 5L

Notifications received:

558-1 Travis: Thanks for covering me at lunch.
558-2 Travis: Sending you back $
558-3 Travis sent you a payment for "lunch".

560-1 Octavia: Need to reschedule our 3 pm meeting.
560-2 Octavia: I'll send you an updated calendar invite.
560-3 Event Invitation: From: Octavia, Time: 4:30 PM 562-1 Ellie: Look at this cutie I met on my run
562-2 Ellie: 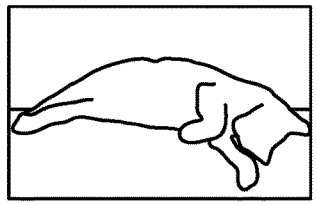

562-3 Ellie: By the way Mom texted me earlier.
562-4 Ellie: Are you going home for dad's birthday?
562-5 Ellie: Can you pick me up?

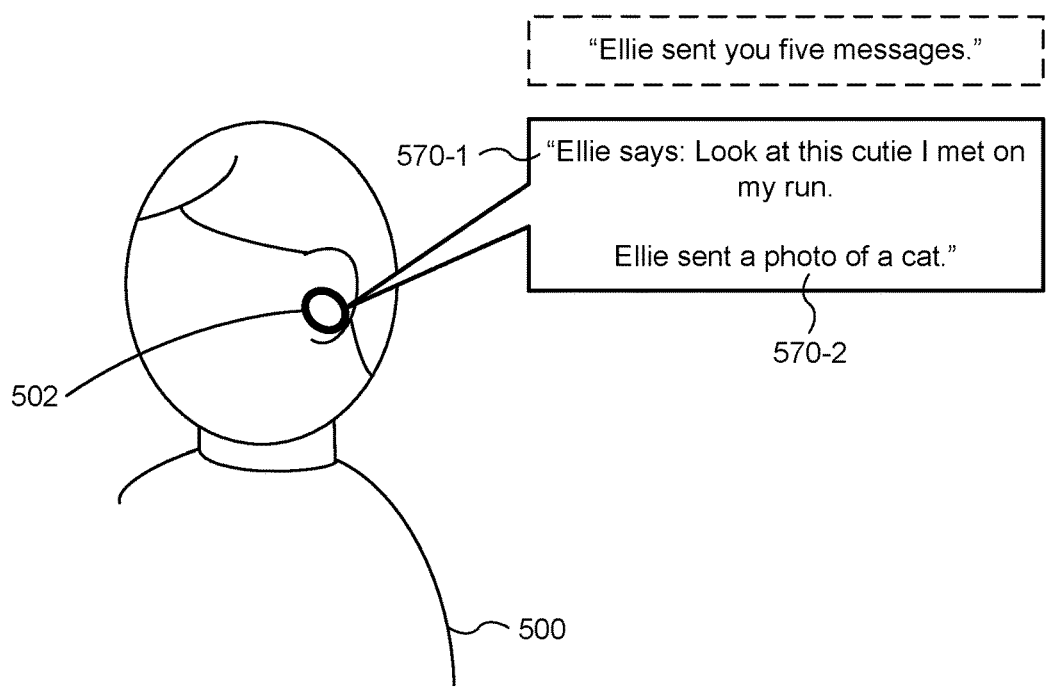

Figure 5M

Notifications received:

558-1 Travis: Thanks for covering me at lunch.
558-2 Travis: Sending you back $
558-3 Travis sent you a payment for "lunch".

560-1 Octavia: Need to reschedule our 3 pm meeting.
560-2 Octavia: I'll send you an updated calendar invite.
560-3 Event Invitation: From: Octavia, Time: 4:30 PM 562-1 Ellie: Look at this cutie I met on my run
562-2 Ellie: 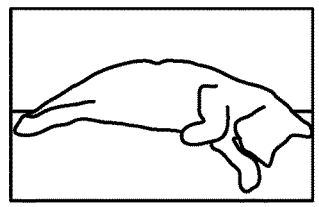

562-3 Ellie: By the way Mom texted me earlier.
562-4 Ellie: Are you going home for dad's birthday?
562-5 Ellie: Can you pick me up?

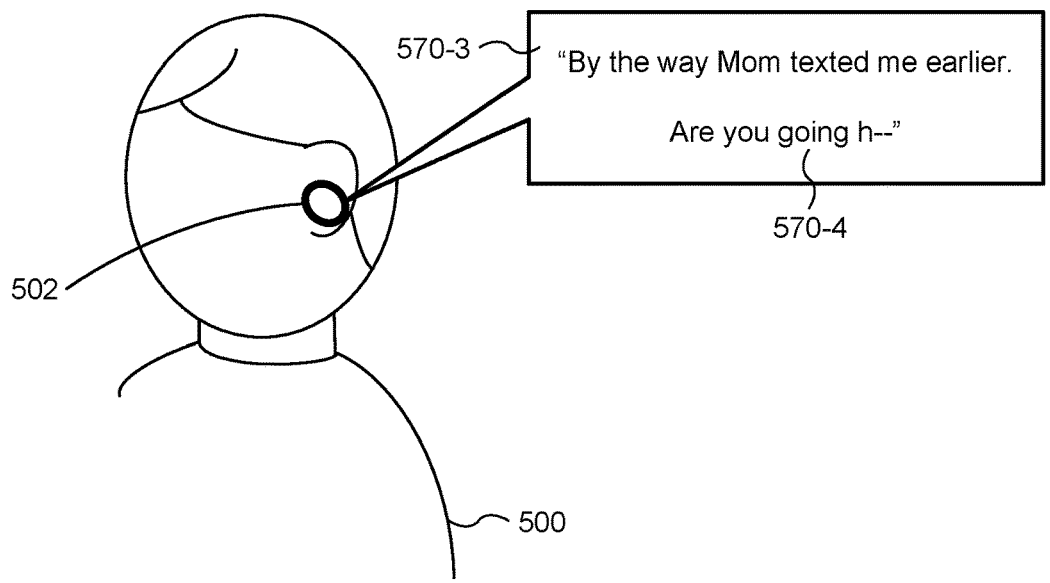

Figure 5N

Notifications received:

558-1 Travis: Thanks for covering me at lunch.
558-2 Travis: Sending you back $
558-3 Travis sent you a payment for "lunch".

560-1 Octavia: Need to reschedule our 3 pm meeting.
560-2 Octavia: I'll send you an updated calendar invite.
560-3 Event Invitation: From: Octavia, Time: 4:30 PM 562-1 Ellie: Look at this cutie I met on my run
562-2 Ellie: 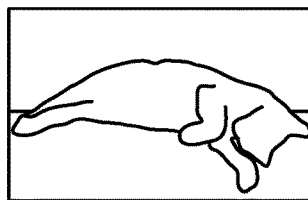
562-3 Ellie: By the way Mom texted me earlier.
562-4 Ellie: Are you going home for dad's birthday?
562-5 Ellie: Can you pick me up?

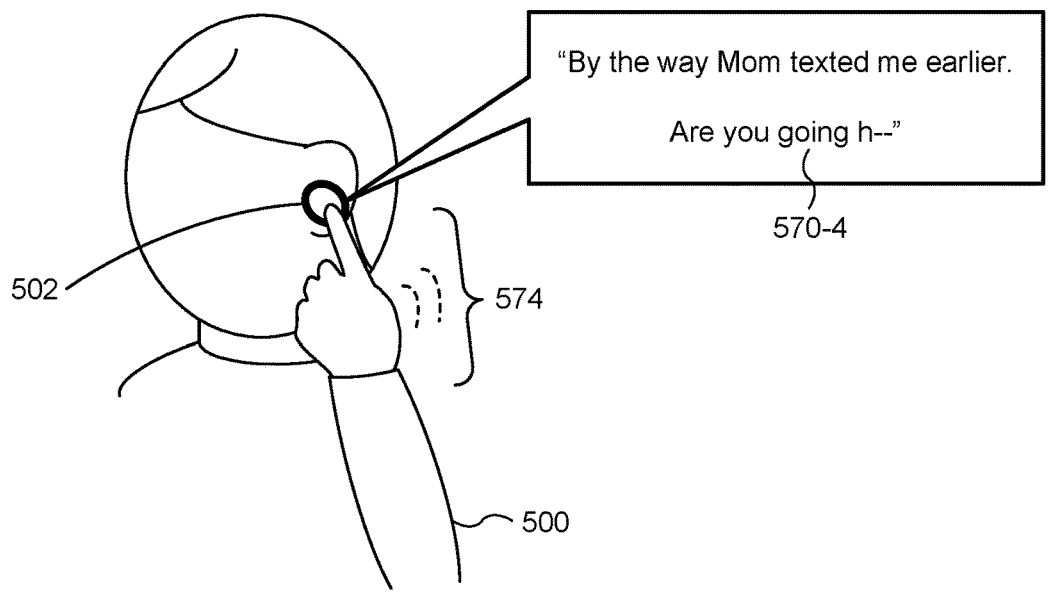

Figure 5O

Notifications received:

558-1 Travis: Thanks for covering me at lunch.
558-2 Travis: Sending you back $
558-3 Travis sent you a payment for "lunch".

560-1 Octavia: Need to reschedule our 3 pm meeting.
560-2 Octavia: I'll send you an updated calendar invite.
560-3 Event Invitation: From: Octavia, Time: 4:30 PM 562-1 Ellie: Look at this cutie I met on my run
562-2 Ellie: 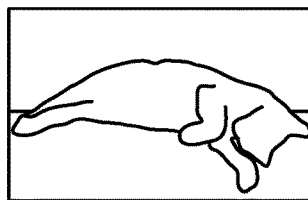

562-3 Ellie: By the way Mom texted me earlier.
562-4 Ellie: Are you going home for dad's birthday?
562-5 Ellie: Can you pick me up?

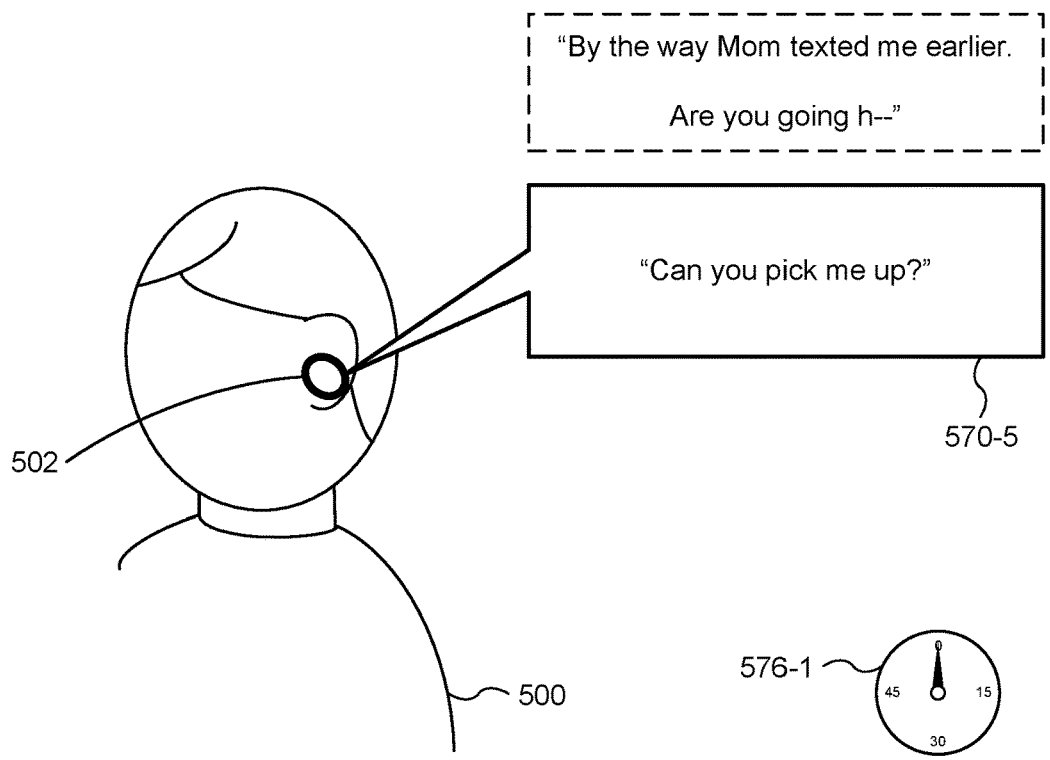

Figure 5P

Notifications received:

558-1 Travis: Thanks for covering me at lunch.
558-2 Travis: Sending you back $
558-3 Travis sent you a payment for "lunch".

560-1 Octavia: Need to reschedule our 3 pm meeting.
560-2 Octavia: I'll send you an updated calendar invite.
560-3 Event Invitation: From: Octavia, Time: 4:30 PM 562-1 Ellie: Look at this cutie I met on my run
562-2 Ellie: 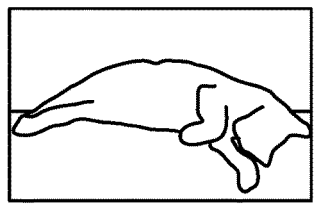

562-3 Ellie: By the way Mom texted me earlier.
562-4 Ellie: Are you going home for dad's birthday?
562-5 Ellie: Can you pick me up?

"Can you pick me up?"

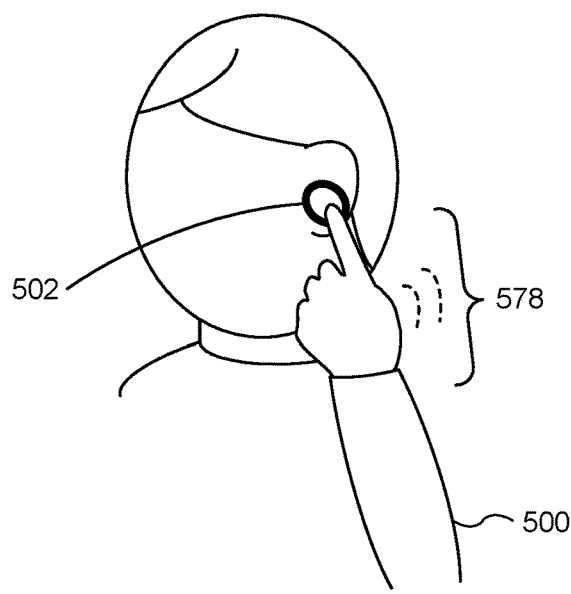

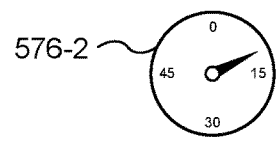

Figure 5Q

Notifications received:

558-1 Travis: Thanks for covering me at lunch.
558-2 Travis: Sending you back $
558-3 Travis sent you a payment for "lunch".

560-1 Octavia: Need to reschedule our 3 pm meeting.
560-2 Octavia: I'll send you an updated calendar invite.
560-3 Event Invitation: From: Octavia, Time: 4:30 PM 562-1 Ellie: Look at this cutie I met on my run
562-2 Ellie: 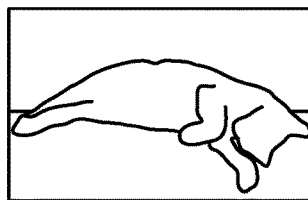

562-3 Ellie: By the way Mom texted me earlier.
562-4 Ellie: Are you going home for dad's birthday?
562-5 Ellie: Can you pick me up?

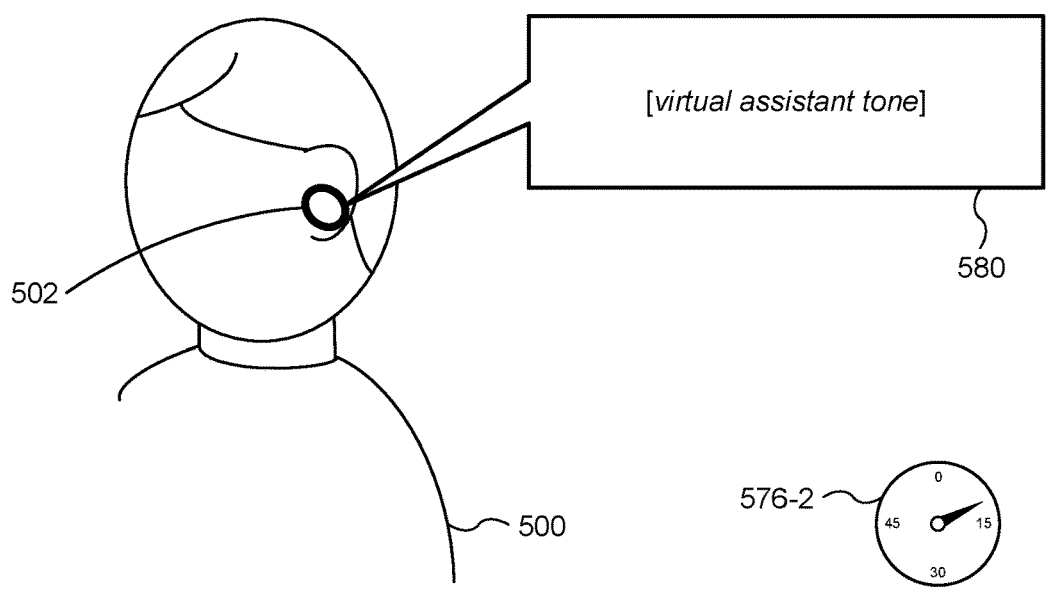

Figure 5R

Notifications received:

560-3 Event Invitation: From: Octavia, Time: 4:30 PM

Notifications received:

560-3 Event Invitation: From: Octavia, Time: 4:30 PM

Notifications received:

560-3 Event Invitation: From: Octavia, Time: 4:30 PM

Notifications received:

560-3 Event Invitation: From: Octavia, Time: 4:30 PM

Notifications received:

560-3 Event Invitation: From: Octavia, Time: 4:30 PM

Notifications received:

560-3 Event Invitation: From: Octavia, Time: 4:30 PM

Notifications received:

560-3 Event Invitation: From: Octavia, Time: 4:30 PM

Notifications received:

560-3 Event Invitation: From: Octavia, Time: 4:30 PM

Notifications received:

560-3 Event Invitation: From: Octavia, Time: 4:30 PM

Notifications received:

5108 Map Navigation: In 400 feet, turn left at Main St.

612 The information includes one or more audio notifications corresponding to one or more events associated with a respective time period 614 In response to detecting that the one or more wearable audio output devices have been placed in the respective position relative to the user's ear, outputting the one or more audio notifications corresponding to the one or more events associated with the respective time period is performed in accordance with a determination that the one or more wearable audio output devices have been placed in the respective position relative to the user's ear for an initial time during the respective time period;
　　after detecting that the one or more wearable audio output devices have been placed in the respective position relative to the user's ear, detect, via the one or more sensors, that the one or more wearable audio output devices have been placed in the respective position for a subsequent time during the respective time period; and
　　in response to detecting, via the one or more sensors, that the one or more wearable audio output devices have been placed in the respective position for the subsequent time during the respective time period, forgo outputting audio notifications corresponding to the one or more events associated with the respective time period 616 The information includes one or more audio notifications corresponding to one or more events that are scheduled to occur or predicted to occur within a predefined period of time following placement of the one or more wearable audio output devices in the respective position relative to the user's ear

Figure 6B

618 Outputting the one or more audio notifications includes outputting a first audio notification corresponding to a first event in the plurality of events.
   In accordance with a determination that the electronic device is in a first context, the first audio notification includes first audio content corresponding to the first context; and
   in accordance with a determination that the electronic device is in a second context that is different from the first context, the first audio notification includes second audio content, different from the first audio content, corresponding to the second context.

620 The first event corresponds to a calendar event occurring at a first geographical location, where the first geographical location includes respective location information at a plurality of hierarchical levels in a location hierarchy;
   determining that the electronic device is in the first context includes determining that a location of the electronic device is within a same first geographic region as the first geographical location, the first geographic region corresponding to a first hierarchical level in the location hierarchy, where the first audio content includes respective location information at hierarchical levels lower than the first hierarchical level in the location hierarchy;
   determining that the electronic device is in the second context includes determining that the location of the electronic device is in a same second geographic region as the first geographical location, where the second geographic region is different from the first geographic region and corresponds to a second hierarchical level, different from the first hierarchical level, in the location hierarchy, where the second audio content includes respective location information at hierarchical levels lower than the second hierarchical level in the location hierarchy 622 The first event corresponds to a first message received from a first contact;
   determining that the electronic device is in the first context includes determining that a first portion of an identifier of the first contact is the same as a first portion of an identifier of at least one other contact in a list of contacts stored on the electronic device, where the first audio content includes the first portion of the identifier of the first contact, a second portion of the identifier of the first contact, and content of the first message; and
   determining that the electronic device is in the second context includes determining that the first portion of the identifier of the first contact is not a first portion of an identifier of any other contact in the list of contacts, where the second audio content includes the first portion of the identifier of the first contact and the content of the first message without including the second portion of the identifier (A)

Figure 6C

618 Outputting the one or more audio notifications includes outputting a first audio notification corresponding to a first event in the plurality of events.
  In accordance with a determination that the electronic device is in a first context, the first audio notification includes first audio content corresponding to the first context; and
  in accordance with a determination that the electronic device is in a second context that is different from the first context, the first audio notification includes second audio content, different from the first audio content, corresponding to the second context.

(A)

624 The first event corresponds to a first message from a first contact;
  determining that the electronic device is in the first context includes determining that the first event does not consecutively follow a second event, in the plurality of events, that corresponds to a second message from the first contact, where the first audio content includes an identifier of the first contact and content of the first message; and
  determining that the electronic device is in the second context includes determining that the first event consecutively follows a second event in the plurality of events that corresponds to a second message from the first contact, where the second audio content includes the content of the first message and does not include an identifier of the first contact 626 The first event corresponds to a first message that is part of a group messaging session for a respective group;
  determining that the electronic device is in the first context includes determining that the first event does not consecutively follow a second event, in the plurality of events, that corresponds to a second message that is part of the group messaging session, where the first audio content includes an identifier of the respective group or the group messaging session and content of the first message; and
  determining that the electronic device is in the second context includes determining that the first event consecutively follows a second event in the plurality of events that corresponds to a second message that is part of the group messaging session, where the second audio content includes the content of the first message and does not include an identifier of the respective group or the group messaging session

Figure 6D

| 628 Outputting the one or more audio notifications includes outputting a first respective audio notification corresponding to a first respective event in the plurality of events. The first respective event corresponds to a first application that is associated with a first notification class, and the first respective audio notification has a first structure defined by the first notification class |

| 630 Outputting the one or more audio notifications includes outputting a second respective audio notification corresponding to a second respective event in the plurality of events. The second respective event corresponds to a second application, and the second respective audio notification has a second structure defined by the second application |

Figure 6E

712 The determination that the event is associated with the first characteristic in the first group of characteristics includes a determination that the event is initiated by a first user of a plurality of users;
    the determination that the event is associated with the second characteristic in the first group of characteristics includes a determination that the event is initiated by a second user of the plurality of users;
    outputting an audio notification that includes the audio content representing the event and has the first audio output property includes outputting an audio notification that includes the audio content representing the event using a first simulated voice that is associated with the first user; and
    outputting an audio notification that includes the audio content representing the event and has the second audio output property includes outputting an audio notification that includes the audio content representing the event using a second simulated voice that is different from the first simulated voice and that is associated with the second user 714 The determination that the event is associated with the first characteristic in the first group of characteristics includes a determination that the event is associated with a first transaction value;
    the determination that the event is associated with the second characteristic in the first group of characteristics includes a determination that the event is associated with a second transaction value that is different from the first transaction value;
    the first audio output property includes a first sound effect that represents the first transaction value; and
    the second audio output property includes a second sound effect that is different from the first sound effect and that represents the second transaction value 716 The determination that the event is associated with the first characteristic in the first group of characteristics includes a determination that the event is a first type of notification;
    the determination that the event is associated with the second characteristic in the first group of characteristics includes a determination that the event is a second type of notification that is different from the first type of notification;
    the first audio output property includes first background audio that is associated with the first type of notification; and
    the second audio output property includes second background audio that is different from the first background audio and that is associated with the second type of notification

Figure 7B

718 The determination that the event is associated with the first characteristic in the first group of characteristics includes a determination that the event is associated with a first type of message;
  the determination that the event is associated with the second characteristic in the first group of characteristics includes a determination that the event is associated with a second type of message that is different from the first type of message;
  the first audio output property includes a first spatial location that is associated with the first type of message; and
  the second audio output property includes a second spatial location that is different from the first location and that is associated with the second type of message 720 The first type of message corresponds to messages between a user of the electronic device and at least two other users; and
  the second type of message corresponds to messages between the user of the electronic device and at most one other user 722 The first spatial location is a simulated spatial location outside of the user's head, and the second spatial location is a simulated spatial location inside the user's head 724 Display, on the display, a user interface. The user interface includes:
    a representation of the one or more audio output devices;
    a first user interface element that represents the first type of message and that is displayed at a first location in the user interface, where the first location in the user interface defines the first spatial location that is associated with the first type of message; and
    a second user interface element that represents the second type of message and that is displayed at a second location in the user interface, where the second location in the user interface defines the second spatial location that is associated with the second type of message;
  receive, on the touch-sensitive surface, an input corresponding to the first user interface element; and
  in response to receiving the input:
    move the first user interface element to a third location in the user interface; and
    associate the first type of message with a third spatial location defined by the third location in the user interface

Figure 7C

812 After detecting the occurrence of the first event, detect occurrence of a third event;
    after detecting the occurrence of the third event, and after outputting the one or more notifications corresponding to the first event, output, via the one or more wearable audio output devices, one or more audio notifications corresponding to the third event; and
    in response to detecting the input directed to the one or more wearable audio output devices:
        in accordance with a determination that the input is detected after beginning to output the one or more audio notifications corresponding to the third event, and within the predefined time period with respect to the one or more audio notifications corresponding to the third event, perform the first operation, wherein the first operation is associated with the one or more audio notifications corresponding to the third event 814 Outputting the one or more audio notifications corresponding to a respective event includes outputting a portion of audio content corresponding to the respective event; and
    performing the first operation associated with the one or more audio notifications corresponding to the respective event includes forgoing outputting remaining portions of the one or more audio notifications corresponding to the respective event 816 Outputting the one or more audio notifications corresponding to a respective event includes outputting a first portion of audio content corresponding to the respective event; and
    performing the first operation associated with the one or more audio notifications corresponding to the respective event includes outputting a second portion, different from the first portion, of the audio content corresponding to the respective event 818 Performing the second operation that is not associated with the one or more audio notifications corresponding to a respective event includes invoking a virtual assistant or controlling media content playback 820 The first operation associated with the one or more audio notifications corresponding to a respective event is based on an application associated with the respective event

Figure 8B

822 Detecting a respective event includes receiving media content other than textual content, and performing the first operation associated with the one or more audio notifications corresponding to the respective event includes providing a verbal description of the media content other than textual content 824 In accordance with a determination that the input is detected while outputting a first audio notification of the one or more audio notifications, the first operation is performed with respect to the first audio notification;
   in accordance with a determination that the input is detected while outputting a second audio notification of the one or more audio notifications that is different from the first audio notification, the first operation is performed with respect to the second audio notification 826 In accordance with a determination that the input is a first type of input, the first operation is a first type of operation; and
   in accordance with a determination that the input is a second type of input that is different from the first type of input, the first operation is a second type of operation that is different from the first type of operation 828 In accordance with a determination that the input is a first type of input, the second operation is a third type of operation; and
   in accordance with a determination that the input is a second type of input that is different from the first type of input, the second operation is a fourth type of operation that is different from the third type of operation 830 Detecting the input directed to the one or more wearable audio output devices includes detecting a tap input on the one or more wearable audio output devices

Figure 8C

832 Detecting the input directed to the one or more wearable audio output devices includes detecting, via the one or more accelerometers, movement of the one or more wearable audio output devices 834 Outputting the one or more audio notifications corresponding to a respective event includes outputting a first portion of audio content corresponding to the respective event;
    in accordance with detecting, via the one or more accelerometers, movement of the one or more wearable audio output devices in a first direction, performing the first operation includes forgoing outputting a second portion of audio content corresponding to the respective event; and
    in accordance with detecting, via the one or more accelerometers, movement of the one or more wearable audio output devices in a second direction opposite the first direction, performing the first operation includes outputting the second portion of audio content corresponding to the respective event 836 After detecting the occurrence of a respective event, forgo outputting one or more notifications corresponding to the respective event other than the one or more audio notifications output via the one or more wearable audio output devices

Figure 8D

916 While outputting the respective audio output, and prior to detecting the input corresponding to a response to the first event:
    detect, via the touch-sensitive surface, a first touch input; and
    in response to detecting, via the touch-sensitive surface, the first touch input, output, via the one or more wearable audio output devices, one or more response options to the first event.
    Detecting the input corresponding to a response to the first event includes detecting, via the touch-sensitive surface, a second touch input selecting a respective response option of the one or more response options; and
    the generated response to the first event corresponds to the selected respective response option.

918 While outputting the respective audio output, and prior to detecting the input corresponding to a response to the first event:
    detect, via the rotatable input mechanism, a first input; and
    in response to detecting, via the rotatable input mechanism, the first input, output, via the one or more wearable audio output devices, one or more response options to the first event.
    Detecting the input corresponding to a response to the first event includes detecting, via the rotatable input mechanism, a second input selecting a respective response option of the one or more response options; and
    the generated response to the first event corresponds to the selected respective response option.

920 Prior to detecting the input corresponding to a response to the first event, detect, via the one or more attitude sensors, a change in attitude of the electronic device; and
    in response to detecting the change in attitude of the electronic device:
        in accordance with a determination that the change in attitude of the electronic device is detected within a predefined time period with respect to the one or more audio notifications corresponding to the first event, display, on the display, one or more response options to the first event.
    Detecting the input corresponding to a response to the first event includes detecting an input selecting a respective response option of the one or more response options.

Figure 9B

922 After outputting the one or more audio notifications corresponding to the first event, and before outputting the respective audio output indicating that the electronic device is prepared to receive a response to the first event:
    output, via the one or more wearable audio output devices, a plurality of response options prompting a user of the electronic device to provide a response to the first event > 924 The first event is a calendar event invitation, and the plurality of response options include an option to accept the calendar event invitation and an option to decline the calendar event invitation 926 Detect a volume of ambient noise relative to the one or more audio input devices; and
    adjust an output volume of the one or more audio notifications based on the volume of ambient noise

Figure 9C

1016 Outputting the one or more audio notifications corresponding to the first event is performed in accordance with a determination that the electronic device is in a respective mode that allows audio notifications 1018 Outputting the one or more audio notifications corresponding to the first event is performed based on previous user behavior monitored by a virtual assistant executing on the electronic device 1020 Prior to outputting the one or more audio notifications corresponding to the first event, detect, via the one or more audio input devices, a verbal input indicating a respective event property that is of interest to the user.
   Outputting the one or more audio notifications corresponding to the first event is performed in accordance with a determination that the first event is associated with the respective event property.

Figure 10B

DEVICES, METHODS, AND USER INTERFACES FOR PROVIDING AUDIO NOTIFICATIONS

RELATED APPLICATIONS

This application is a continuation of U.S. patent application Ser. No. 16/575,299, filed Sep. 18, 2019, which claims priority to U.S. Provisional Patent Application No. 62/739,176, filed Sep. 29, 2018, each of which is hereby incorporated by reference in its entirety.

TECHNICAL FIELD

This relates generally to electronic devices with audio output devices such as wearable audio output devices, including but not limited to electronic devices that provide audio notifications via the audio output devices.

BACKGROUND

Audio notifications are widely used to convey information to a user verbally. But conventional methods of providing audio notifications are cumbersome, inefficient, and limited. In some cases, conventional methods of providing audio notifications require multiple inputs to generate the audio notifications or to respond to the audio notifications. In some cases, conventional methods of providing audio notifications provide too little information or too much information at once. In some cases, conventional methods of providing audio notifications provide audio notifications in an intrusive and distracting manner. In addition, conventional methods take longer and require more user interaction than necessary, thereby wasting energy. This latter consideration is particularly important in battery-operated devices.

SUMMARY

Accordingly, there is a need for electronic devices with improved methods and interfaces for providing audio notifications. Such methods and interfaces optionally complement or replace conventional methods of providing audio notifications. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with providing audio notifications are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has (and/or is in communication with) a touchpad. In some embodiments, the device has (and/or is in communication with) a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device that is in communication with one or more wearable audio output devices and with one or more sensors for detecting placement of the one or more wearable audio output devices. The method includes, while the one or more wearable audio output devices are not in a respective position relative to a user's ear, detecting occurrence of a plurality of events without outputting notifications corresponding to the events via the one or more audio output devices. The method includes, after detecting the occurrence of the plurality of events, detecting, via the one or more sensors, that the one or more wearable audio output devices have been placed in the respective position relative to the user's ear. The method includes, in response to detecting, via the one or more sensors, that the one or more wearable audio output devices have been placed in the respective position relative to the user's ear, outputting, via the one or more wearable audio output devices, information including one or more audio notifications corresponding to one or more of the plurality of events.

In accordance with some embodiments, a method is performed at an electronic device with one or more audio output devices. The method includes detecting occurrence of an event; and, in response to detecting the occurrence of the event, outputting, via the one or more audio output devices, an audio notification that includes audio content representing the event. In accordance with a determination that the event is associated with a first characteristic in a first group of characteristics, the audio notification includes the audio content representing the event and has a first audio output property that is selected based on the first characteristic. In accordance with a determination that the event is associated with a second characteristic in the first group of characteristics that is different from the first characteristic, the audio notification includes the audio content representing the event and has a second audio output property, different from the first output property, that is selected based on the second characteristic.

In accordance with some embodiments, a method is performed at an electronic device that is in communication with one or more wearable audio output devices and with one or more sensors for detecting placement of the one or more wearable audio output devices. The method includes detecting occurrence of a first event; and, after detecting the occurrence of the first event, outputting, via the one or more wearable audio output devices, one or more audio notifications corresponding to the first event. The method includes, after beginning to output the one or more audio notifications, detecting an input directed to the one or more wearable audio output devices. The method includes, in response to detecting the input directed to the one or more wearable audio output devices: in accordance with a determination that the input is detected within a predefined time period with respect to the one or more audio notifications corresponding to the first event, performing a first operation, where the first operation is associated with the one or more audio notifications corresponding to the first event; and, in accordance with a determination that the input is detected after the predefined time period with respect to the one or more audio notifications corresponding to the first event has elapsed, performing a second operation, where the second operation is not associated with the one or more audio notifications corresponding to the first event.

In accordance with some embodiments, a method is performed at an electronic device that is in communication with one or more wearable audio output devices. The method includes detecting occurrence of a first event; and, after detecting the occurrence of the first event, outputting, via the one or more wearable audio output devices, one or more audio notifications corresponding to the first event. The method includes, after outputting the one or more audio notifications corresponding to the first event, outputting a respective audio output separate from the one or more audio notifications indicating that the electronic device is prepared to receive a response to the first event. The method includes, while outputting the respective audio output, detecting an input corresponding to a response to the first event, and generating a response to the first event based on the input.

In accordance with some embodiments, a method is performed at an electronic device that is in communication with one or more wearable audio output devices. The method includes detecting occurrence of a first event while the one or more wearable audio output devices are being worn by a user. The method includes, in response to detecting the occurrence of the first event, outputting, via the one or more wearable audio output devices, one or more audio notifications corresponding to the first event, including: in accordance with a determination that the user of the electronic device is currently engaged in a conversation, delaying outputting the one or more audio notifications corresponding to the first event until the conversation has ended; and in accordance with a determination that the user of the electronic device is not currently engaged in a conversation, outputting the one or more audio notifications corresponding to the first event without delaying the outputting.

In accordance with some embodiments, an electronic device includes (and/or is in communication with) one or more audio output devices (e.g., one or more wearable audio output devices), optionally one or more sensors for detecting placement of the audio output devices, optionally a display and/or touch-sensitive surface, optionally one or more accelerometers and/or attitude sensors, optionally one or more additional input devices (e.g., a rotatable input mechanism), one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions which, when executed by an electronic device that includes (and/or is in communication with) one or more audio output devices, optionally one or more sensors for detecting placement of the audio output devices, optionally a display and/or touch-sensitive surface, optionally one or more accelerometers and/or attitude sensors, and optionally one or more additional input devices, cause the device to perform or cause performance of the operations of any of the methods described herein. In accordance with some embodiments, a graphical user interface on a device that includes (and/or is in communication with) one or more audio output devices, optionally one or more sensors for detecting placement of the audio output devices, optionally a display and/or touch-sensitive surface, optionally one or more accelerometers and/or attitude sensors, and optionally one or more additional input devices, a memory, and one or more processors to execute one or more programs stored in the memory includes one or more of the elements displayed in any of the methods described herein, which are updated in response to inputs, as described in any of the methods described herein. In accordance with some embodiments, an electronic device includes (and/or is in communication with) one or more audio output devices, optionally one or more sensors for detecting placement of the audio output devices, optionally a display and/or touch-sensitive surface, optionally one or more accelerometers and/or attitude sensors, and optionally one or more additional input devices, and means for performing or causing performance of the operations of any of the methods described herein. In accordance with some embodiments, an information processing apparatus, for use in an electronic device that includes (and/or is in communication with) one or more audio output devices, optionally one or more sensors for detecting placement of the audio output devices, optionally a display and/or touch-sensitive surface, optionally one or more accelerometers and/or attitude sensors, and optionally one or more additional input devices includes means for performing or causing performance of the operations of any of the methods described herein.

Thus, electronic devices that have (and/or are in communication with) one or more audio output devices, optionally one or more sensors for detecting placement of the audio output devices, optionally a display and/or touch-sensitive surface, optionally one or more accelerometers and/or attitude sensors, and optionally one or more additional input devices, are provided with improved methods and interfaces for providing audio notifications, thereby increasing the effectiveness, efficiency, and user satisfaction with such devices. Such methods and interfaces may complement or replace conventional methods for providing audio notifications.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6E are flow diagrams of a process for providing audio notifications to an audio output device worn by a user in accordance with some embodiments.

FIGS. 7A-7C are flow diagrams of a process for providing audio context to convey additional information about events in accordance with some embodiments.

FIGS. 8A-8D are flow diagrams of a process for performing operations based on timing of user inputs with respect to audio notifications in accordance with some embodiments.

FIGS. 9A-9C are flow diagrams of a process for prompting a user and receiving responses to audio notifications in accordance with some embodiments.

FIGS. 10A-10B are flow diagrams of a process for conditionally outputting audio notifications based on user activity and context in accordance with some embodiments.

DESCRIPTION OF EMBODIMENTS

As noted above, audio notifications are useful for conveying information to a user, by providing the information verbally and enabling a user to conveniently listen to the information rather than requiring the user to look at the information. Conventional methods of providing audio notifications are often limited in functionality or efficacy. In some cases, conventional methods of providing audio notifications require multiple inputs to generate or respond to audio notifications. In some cases, conventional methods of providing audio notifications provide audio notifications in an intrusive and distracting manner. The devices, methods, and user interfaces described herein improve user interface interactions with audio notifications in multiple ways. For example, embodiments disclosed herein provide more efficient ways for an electronic device to provide audio notifications and receive responses to audio notifications. Additionally, embodiments herein provide improved audio notifications that convey information to the user more effectively.

Figure 4A:
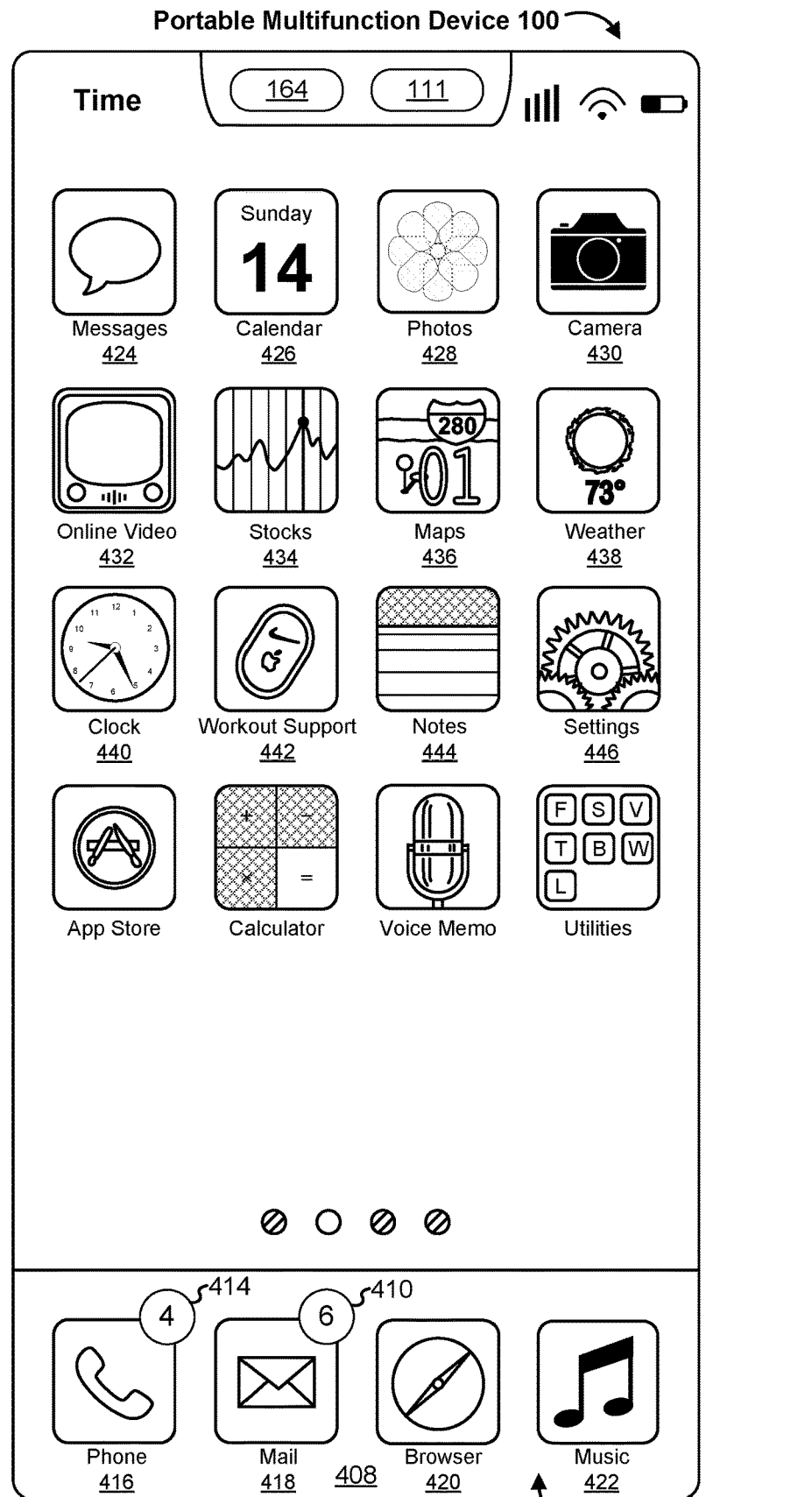
FIG. 4A illustrates an example user interface for a menu of applications on a portable multifunction device in accordance with some embodiments.
Figure 4B:
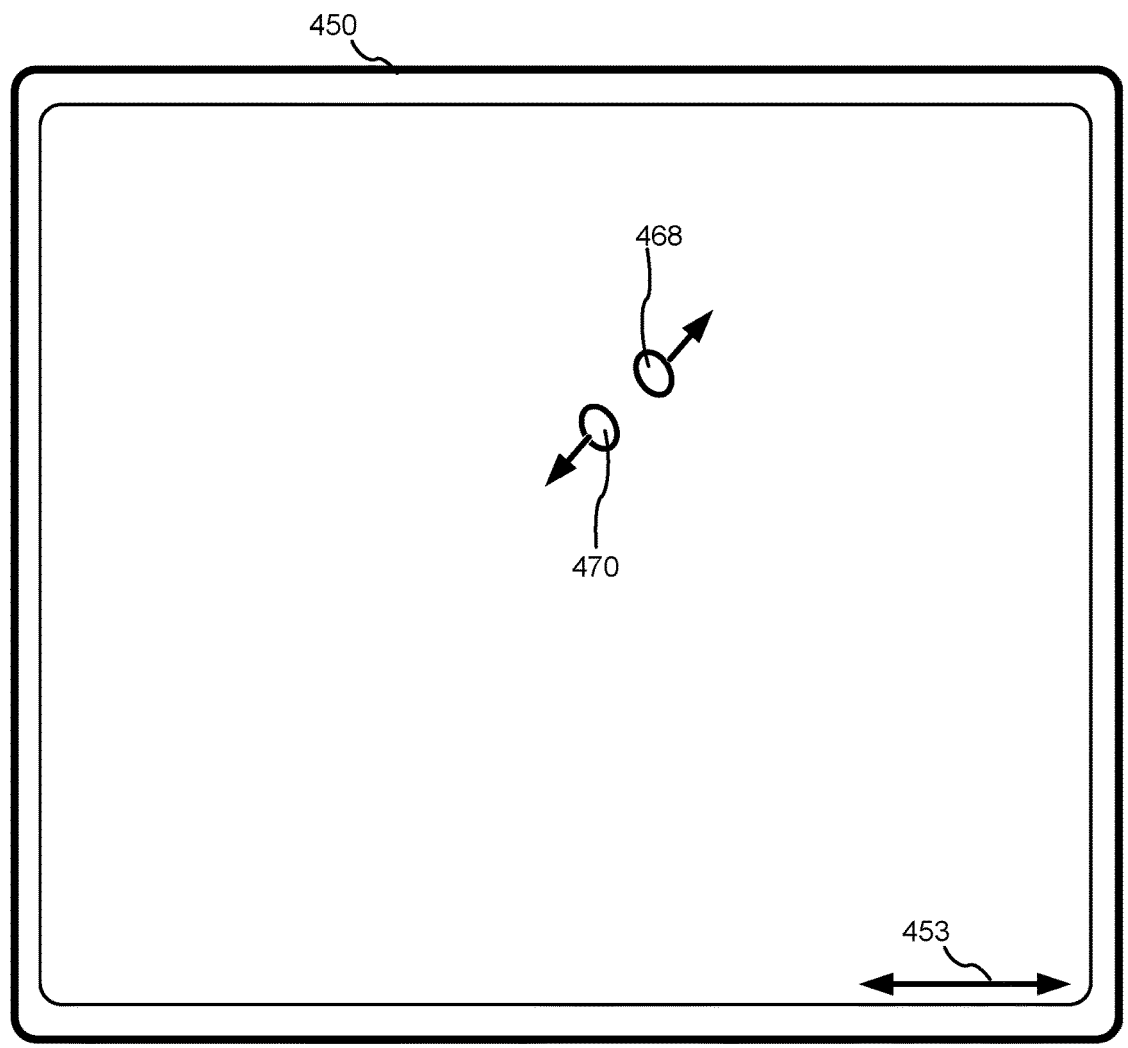
FIG. 4B illustrates an example user interface for a multifunction device with a touch-sensitive surface that is separate from the display in accordance with some embodiments.
Figure 4B:
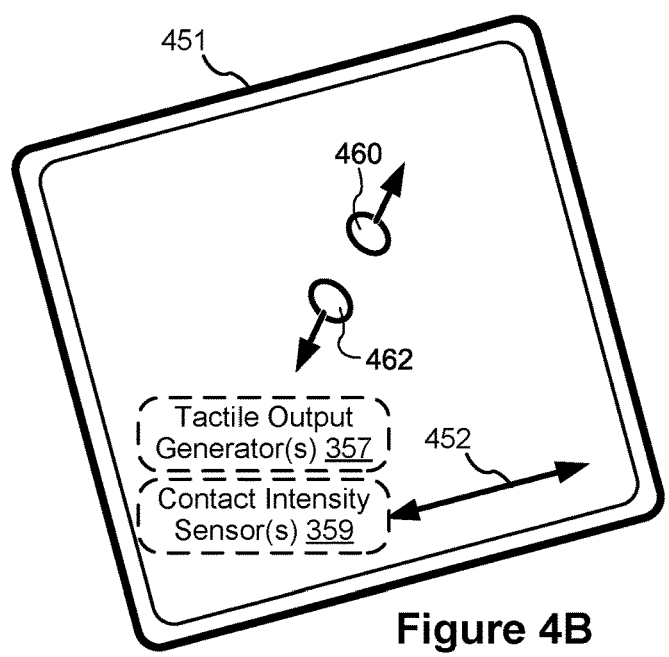
Figure 5A:
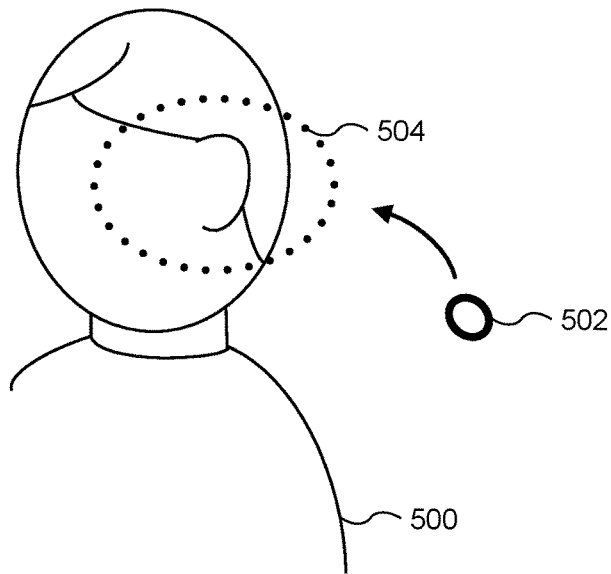
FIGS. 5A-5AD illustrate example audio notifications and example user interfaces and interactions with audio notifications in accordance with some embodiments.
Figure 5A:
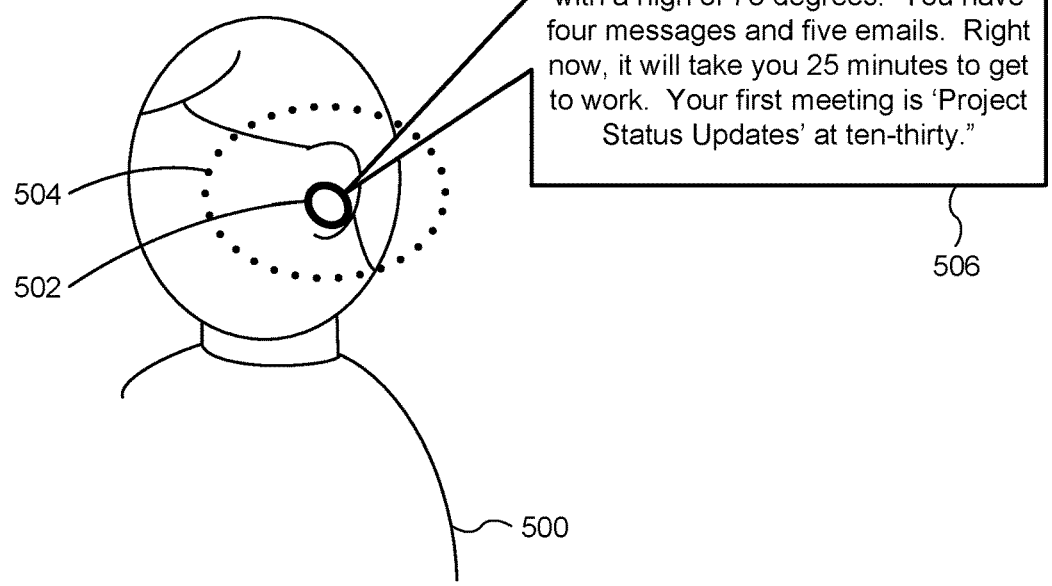
Figure 7A:
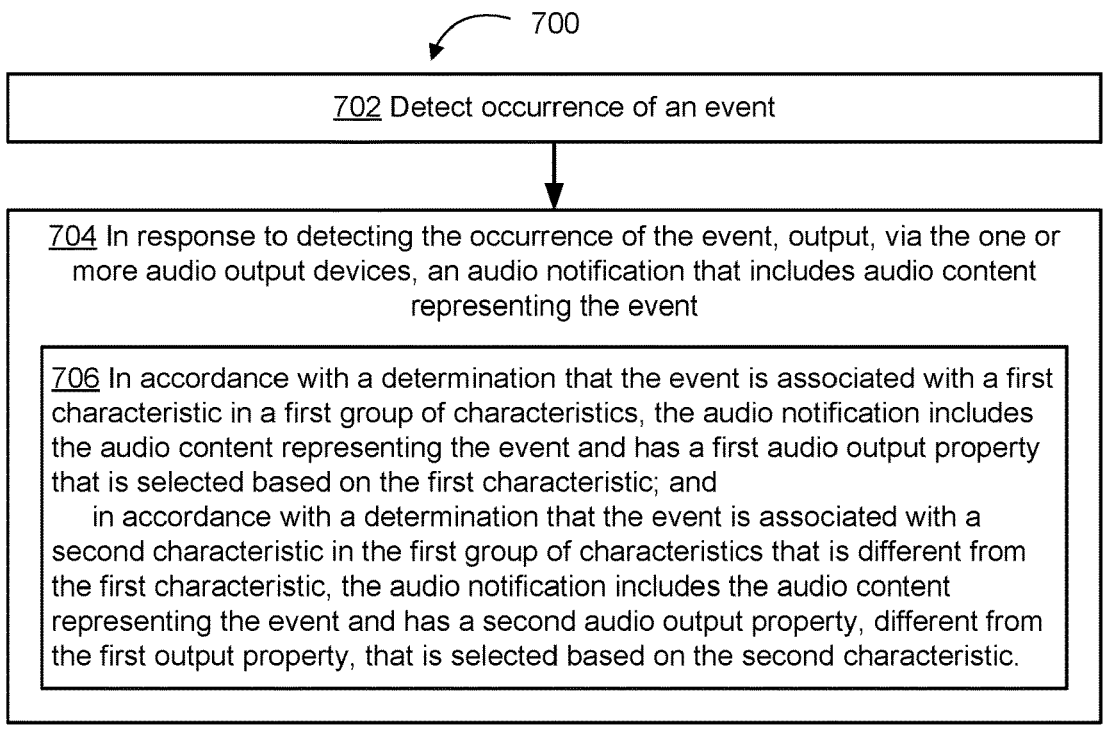
Figure 8A:
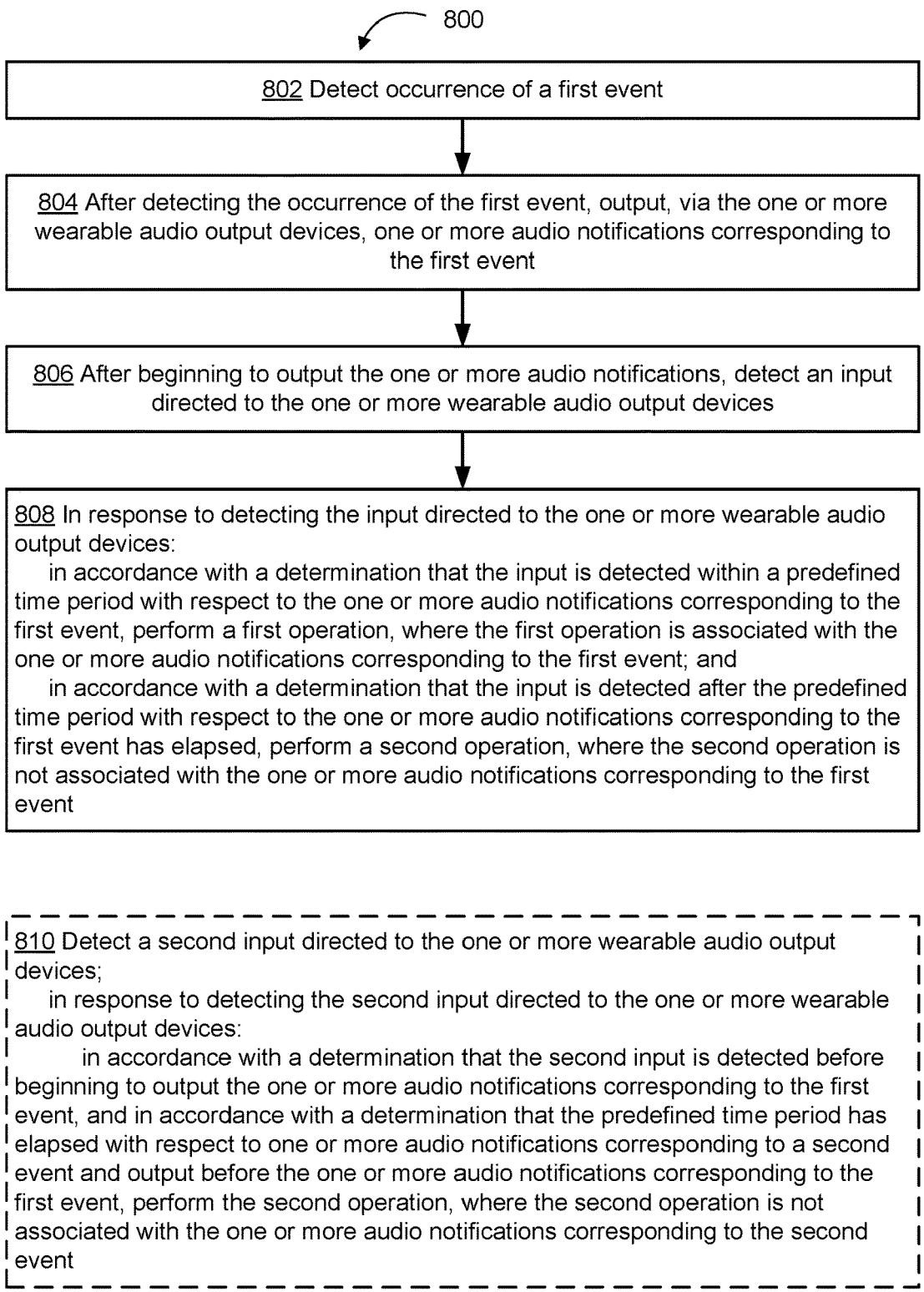
Figure 9A:
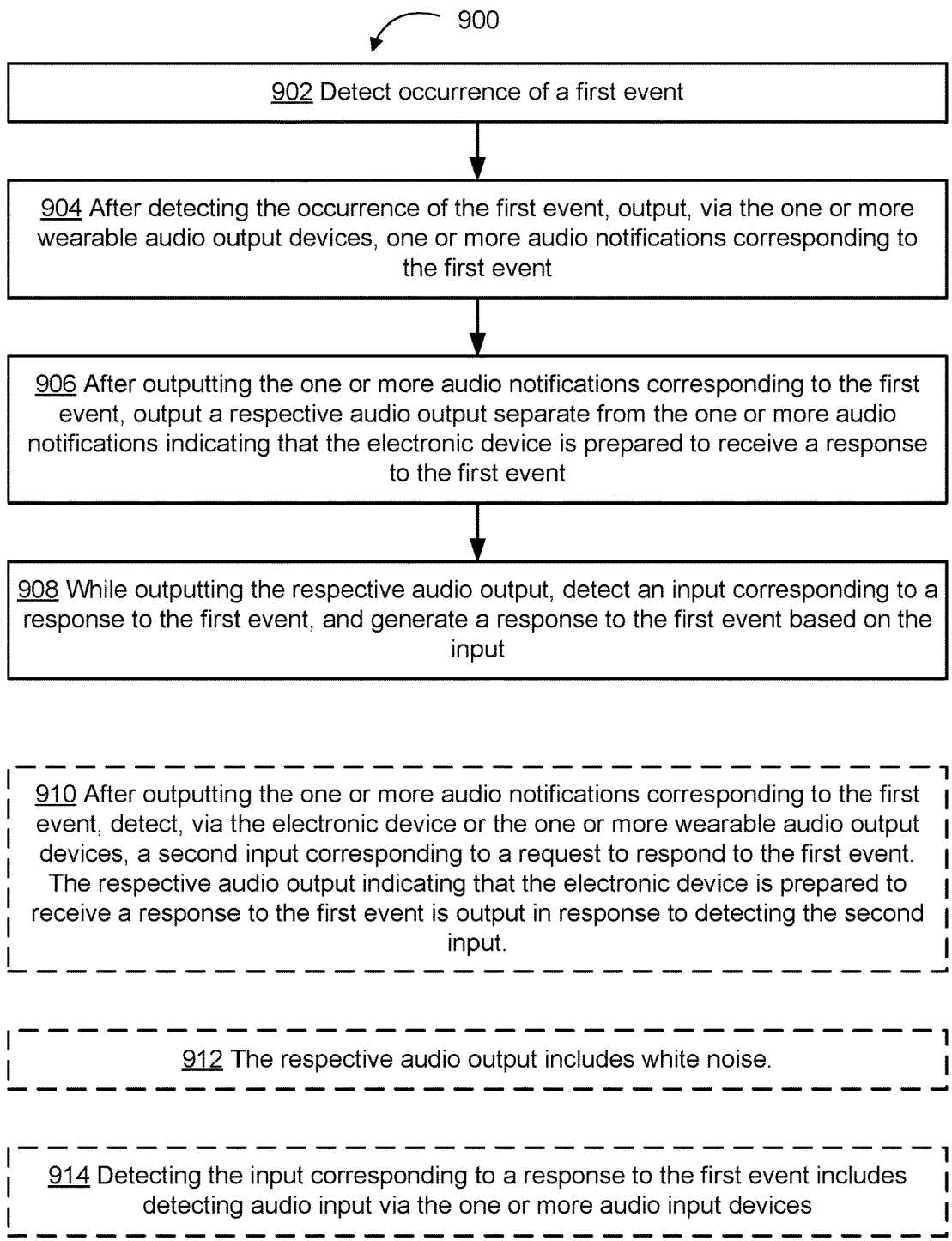
Figure 10A:
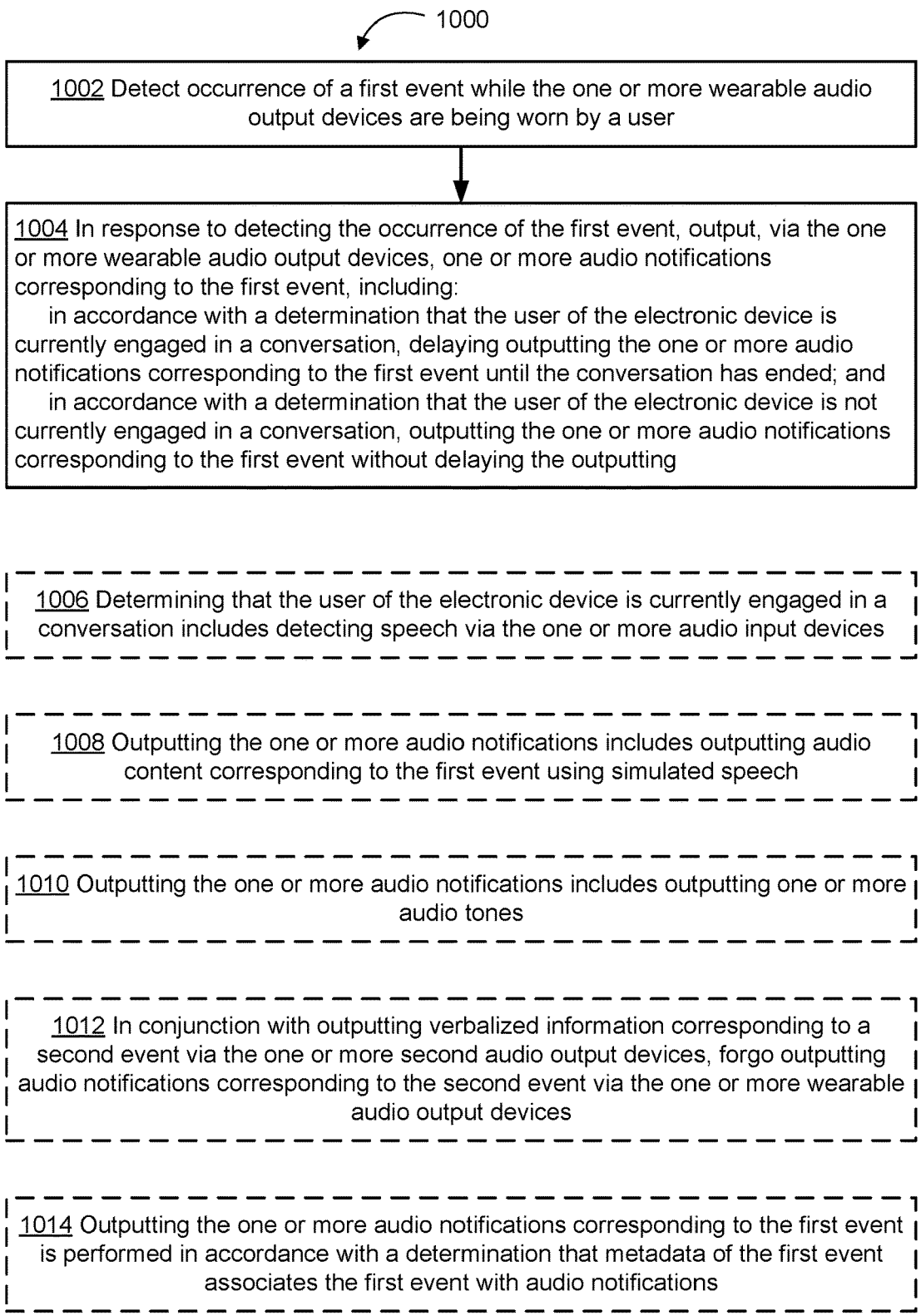

Below, FIGS. 1A-1B, 2, and 3A-3B provide a description of example devices. FIGS. 4A-4B illustrate example user interfaces for example devices on which the embodiments disclosed herein are implemented. FIGS. 5A-5AD illustrate example audio notifications and example user interfaces and interactions with audio notifications. FIGS. 6A-6E illustrate a flow diagram of a method of providing audio notifications to an audio output device worn by a user. FIGS. 7A-7C illustrate a flow diagram of a method of providing audio context to convey additional information about events. FIGS. 8A-8D illustrate a flow diagram of a method of performing operations based on timing of user inputs with respect to audio notifications. FIGS. 9A-9C illustrate a flow diagram of a method of prompting a user and receiving responses to audio notifications. FIGS. 10A-10B illustrate a flow diagram of a method of conditionally outputting audio notifications based on user activity and context. The user interfaces and interactions in FIGS. 5A-5AD are used to illustrate the processes in FIGS. 6A-6E, 7A-7C, 8A-8D, 9A-9C, and 10A-10B.

EXAMPLE DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a gaming application, a note taking application, a drawing application, a presentation application, a word processing application, a spreadsheet application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed by the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
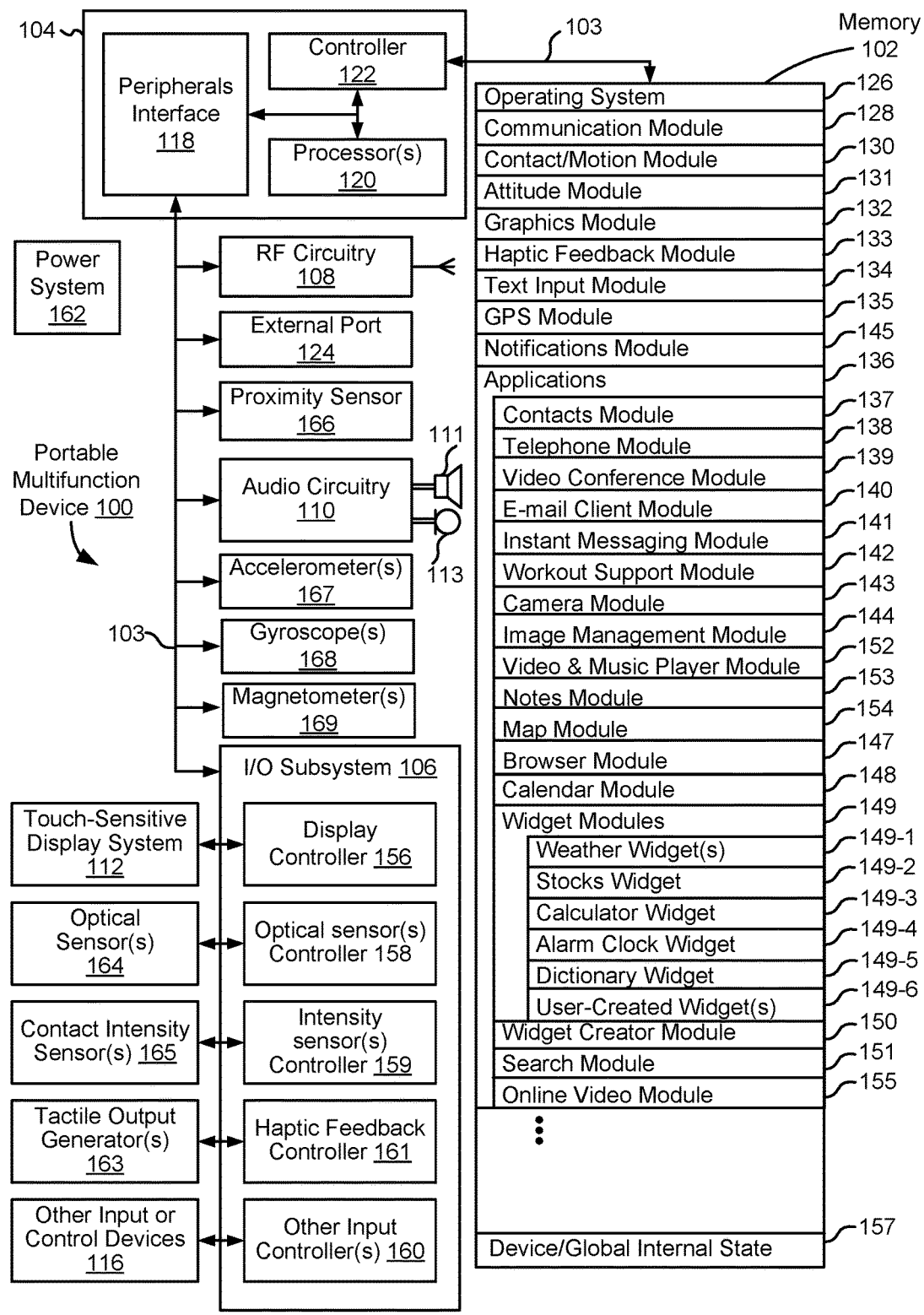
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164 (e.g., as part of one or more cameras). Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. In some embodiments, tactile output generator(s) 163 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Android, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California In some embodiments, the external port is a Lightning connector that is the same as, or similar to and/or compatible with the Lightning connector used in some iPhone®, iPod Touch®, and iPad® devices from Apple Inc. of Cupertino, California In some embodiments, the external port is a USB Type-C connector that is the same as, or similar to and/or compatible with the USB Type-C connector used in some electronic devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Attitude module 131, in conjunction with accelerometers 167, gyroscopes 168, and/or magnetometers 169, optionally detects attitude information concerning the device, such as the device's attitude (e.g., roll, pitch, and/or yaw) in a particular frame of reference. Attitude module 131 includes software components for performing various operations related to detecting the position of the device and detecting changes to the attitude of the device.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts module 137, e-mail module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Notifications module 145 provides logic that processes detected events, such as incoming messages or phone calls, calendar event invitations or reminders, application events, system events, and so on. Notifications module facilitates and/or controls the presentation (e.g., on a display, via audio output, or via another type of output) of notifications and alerts associated with detected events. For example, notifications module 145 may interface with an application 136 to present a notification associated with that application, and/or with operating system 126 to present a system notification.

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touch-sensitive surface. In some other embodiments, the menu button is a physical push button or other physical input control device instead of a touch-sensitive surface.

Figure 1B:
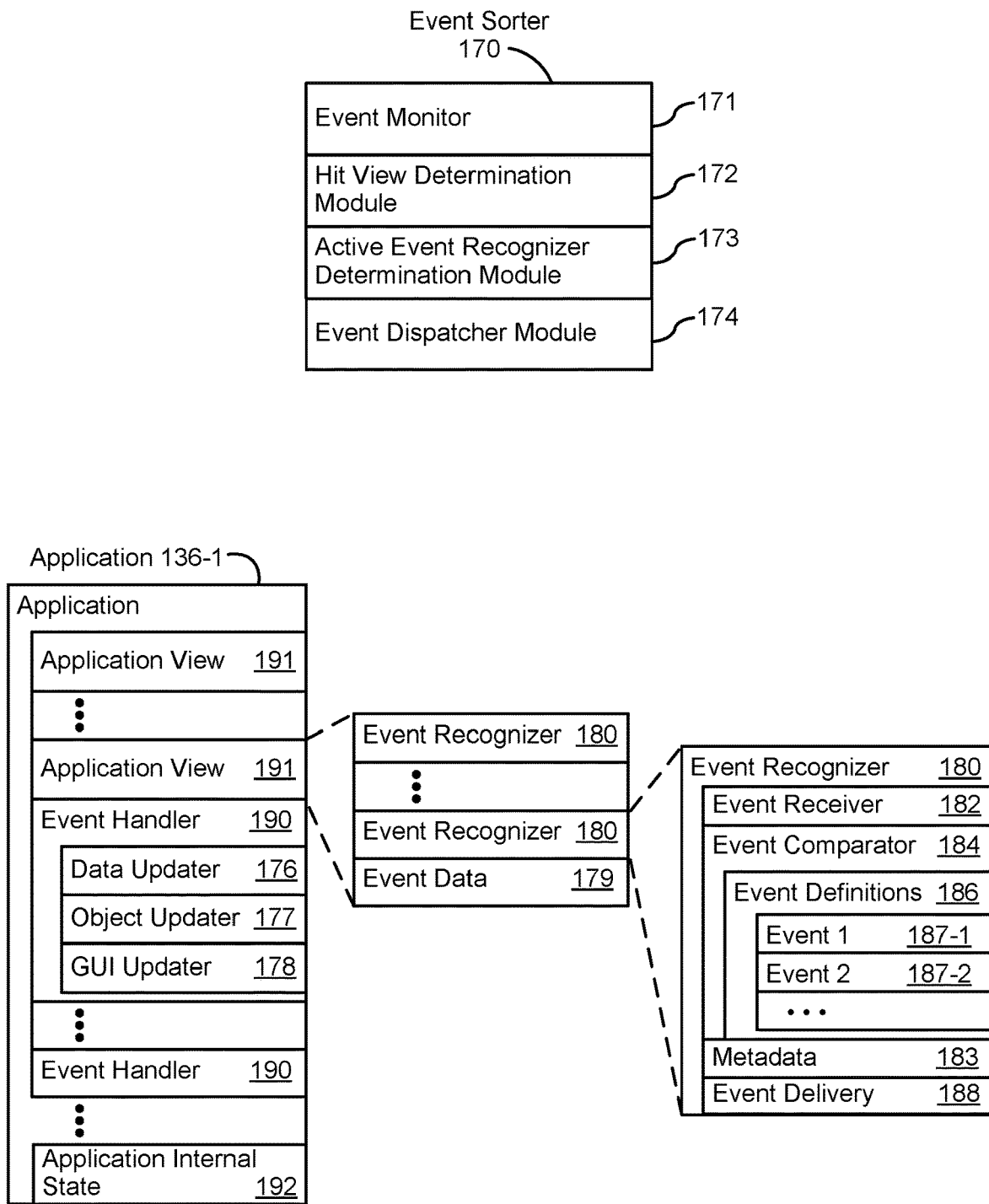
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3A) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; inputs based on real-time analysis of video images obtained by one or more cameras; movement of the device; oral instructions; detected eye movements; biometric inputs; and/or any combination thereof are optionally utilized as inputs corresponding to sub-events which define an event to be recognized.

Figure 2:
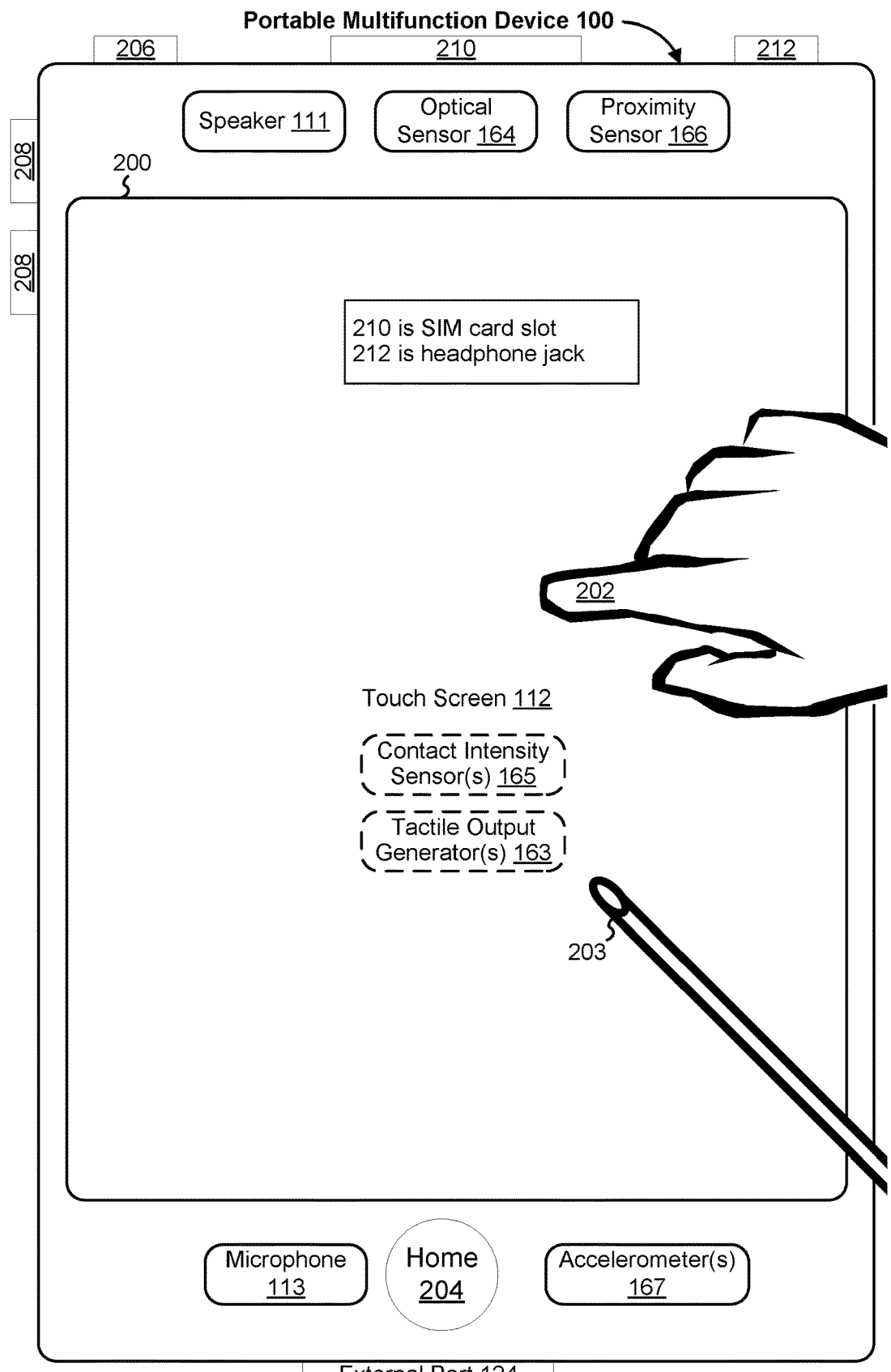
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 163 for generating tactile outputs for a user of device 100.

Figure 3A:
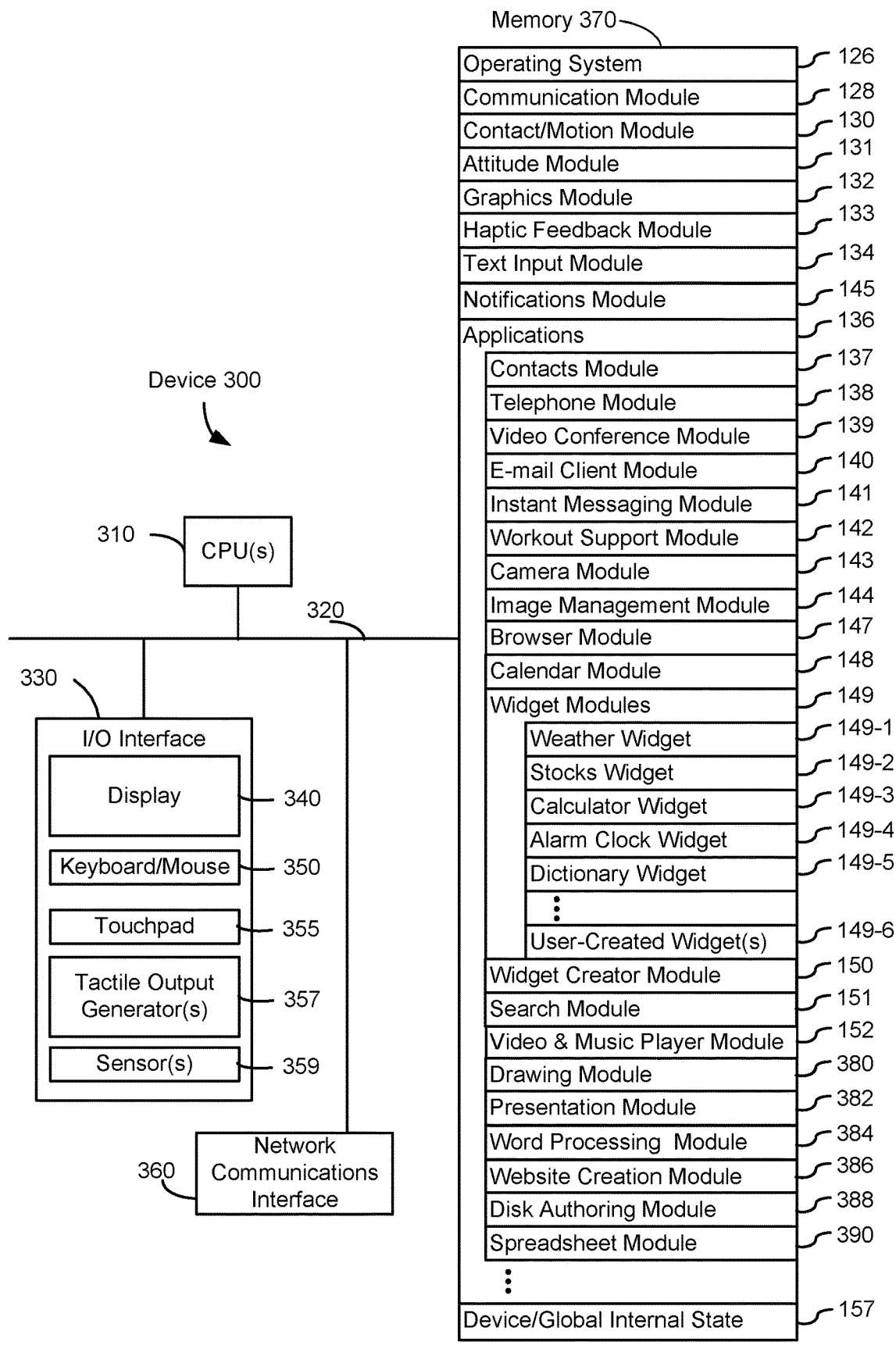
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a gaming system, a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is optionally a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
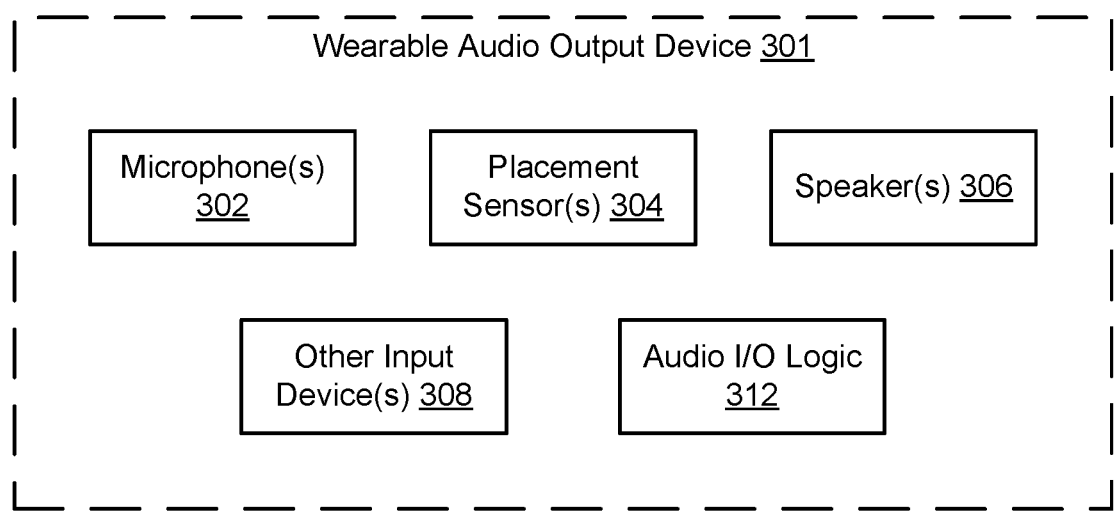
FIG. 3B is a block diagram of an example wearable audio output device in accordance with some embodiments.

FIG. 3B is a block diagram of an example wearable audio output device 301 in accordance with some embodiments. In some embodiments, wearable audio output device 301 is a single earphone. In some embodiments, wearable audio output device 301 includes a pair of earphones (e.g., one for each of a user's ears), or more. In some embodiments, wearable audio output device 301 is one or more in-ear earphone(s), over-ear headphone(s), or the like. In some embodiments, wearable audio output device 301 includes one or more speakers 306 for providing audio output (e.g., to a user's ear). In some embodiments, wearable audio output device 301 includes one or more placement sensors 304 to detect positioning or placement of wearable audio output device 301 relative to a user's ear, such as to detect placement of wearable audio output device 301 in a user's ear. In some embodiments, wearable audio output device 301 conditionally outputs audio based on whether wearable audio output device 301 is in or near a user's ear (e.g., wearable audio output device 301 forgoes outputting audio when not in a user's ear, so as to reduce power usage). In some embodiments, audio I/O logic 312 determines the positioning or placement of wearable audio output device 301 relative to a user's ear based on information received from placement sensor(s) 304, and, in some embodiments, audio I/O logic 312 controls the resulting conditional outputting of audio.

In some embodiments, wearable audio output device 301 includes one or more microphones 302 for receiving audio input. In some embodiments, microphone(s) 302 detect speech from a user wearing wearable audio output device 301 and/or ambient noise around wearable audio output device 301. In some embodiments, audio I/O logic 312 detects or recognizes speech or ambient noise based on information received from microphone(s) 302. In some embodiments, wearable audio output device 301 includes one or more other input devices 308, such a touch-sensitive surface (for detecting touch inputs), accelerometer(s) and/or attitude sensor(s) (for determining an attitude of wearable audio output device 301 relative to a physical environment and/or changes in attitude of the device, and/or other input device by which a user can interact with and provide inputs to wearable audio output device 301. In some embodiments, inputs provided via input device(s) 308 are processed by audio I/O logic 312. In some embodiments, audio I/O logic 312 is in communication with a separate device (e.g., device 100, FIG. 1A) that provides instructions or content for audio output, and that optionally receives and processes inputs (or information about inputs) provided via microphone(s) 302, placement sensor(s) 304, and/or input device(s) 308.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, labeled "Music"; and
Icons for other applications, such as:
  Icon 424 for IM module 141, labeled "Messages";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Maps";
  Icon 438 for weather widget 149-1, labeled "Weather";
  Icon 440 for alarm clock widget 149-4, labeled "Clock";
  Icon 442 for workout support module 142, labeled "Workout Support";

Icon 444 for notes module 153, labeled "Notes"; and

Icon 446 for a settings application or module, labeled "Settings," which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
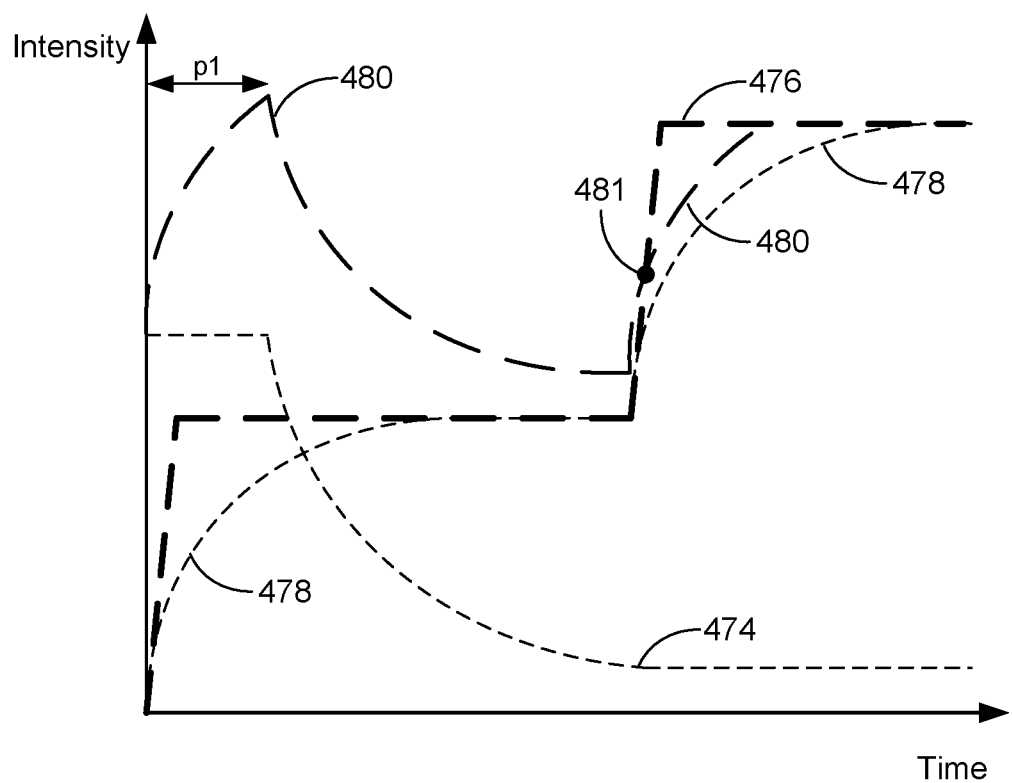
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
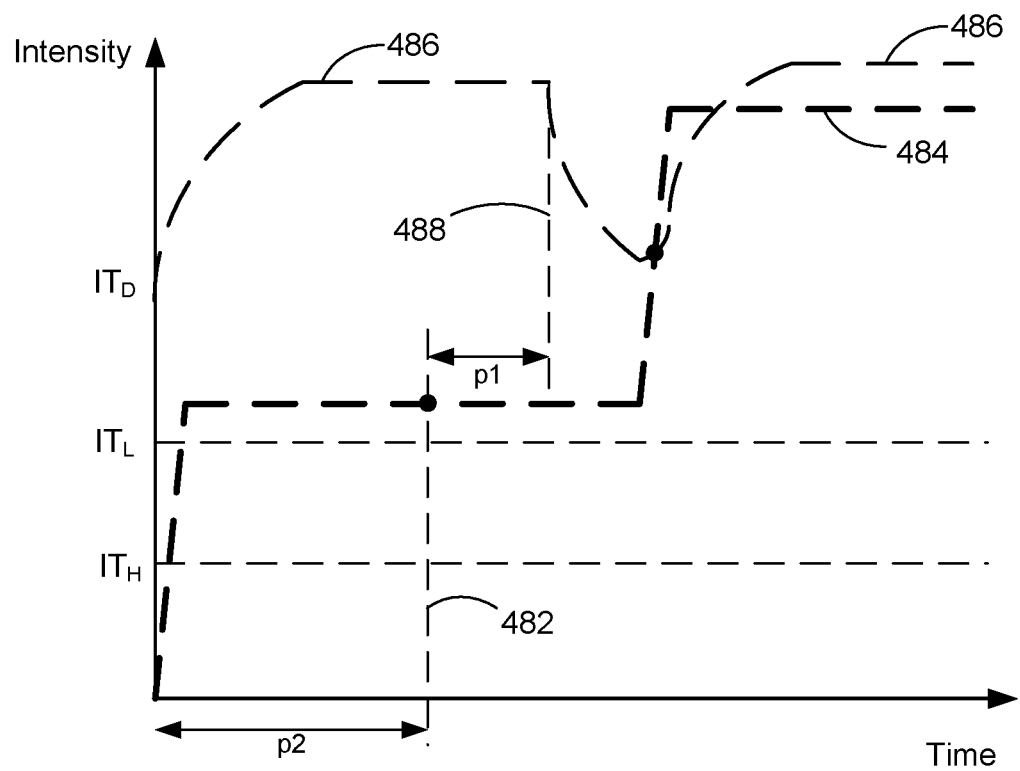

FIG. 4D illustrates another dynamic intensity threshold 486 (e.g., intensity threshold $IT_D$). FIG. 4D also illustrates two other intensity thresholds: a first intensity threshold $IT_H$ and a second intensity threshold $IT_L$. In FIG. 4D, although touch input 484 satisfies the first intensity threshold $IT_H$ and the second intensity threshold $IT_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $IT_L$ was triggered). This type of dynamic intensity threshold reduces accidental triggering of a response associated with the dynamic intensity threshold $IT_D$ immediately after, or concurrently with, triggering a response associated with a lower intensity threshold, such as the first intensity threshold $IT_H$ or the second intensity threshold $IT_L$.

Figure 4E:
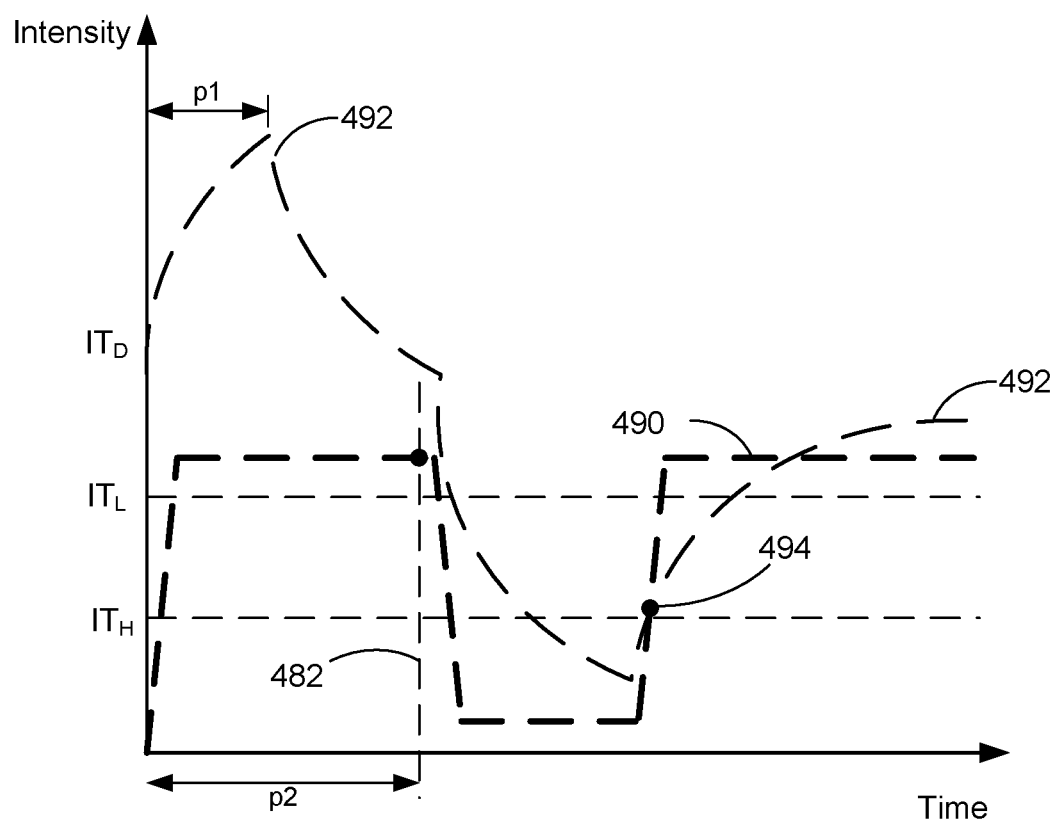

FIG. 4E illustrate yet another dynamic intensity threshold 492 (e.g., intensity threshold $IT_D$). In FIG. 4E, a response associated with the intensity threshold $IT_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $IT_L$, followed by an increase in the intensity of touch input 490, without releasing touch input 490, can trigger a response associated with the intensity threshold $IT_D$ (e.g., at time 494) even when the intensity of touch input 490 is below another intensity threshold, for example, the intensity threshold $IT_L$.

USER INTERFACES AND ASSOCIATED PROCESSES

Attention is now directed towards embodiments of user interfaces ("UI") and associated processes that may be implemented on an electronic device (e.g., portable multifunction device 100, FIG. 1A, or device 300, FIG. 3A) that includes (and/or is in communication with) one or more audio output devices (e.g., one or more wearable audio output devices, such as wearable audio output device 301, FIG. 3B), optionally one or more sensors for detecting placement of the audio output devices, optionally a display and/or touch-sensitive surface, optionally one or more accelerometers and/or attitude sensors, and optionally one or more additional input devices (e.g., a rotatable input mechanism).

FIGS. 5A-5AD illustrate example audio notifications and example user interfaces and interactions with audio notifications in accordance with some embodiments. The user interfaces in these figures are used to illustrate the processes described below, including the processes in FIGS. 6A-6E, 7A-7C, 8A-8D, 9A-9C, and 10A-10B. For convenience of explanation, some of the embodiments will be discussed with reference to operations performed using a wearable output device that is in communication with and separate from a device at which events corresponding to the audio notifications are detected. However, in some cases, analogous operations are optionally performed using audio output devices that are part of the device at which the events are detected.

FIGS. 5A-5AD illustrate example audio notifications and example user interfaces (including verbal, aural, and tactile interfaces) and interactions with audio notifications in accordance with some embodiments.

FIG. 5A illustrates providing audio notifications in response to user 500 putting on one or more earphones 502. Earphone 502 represents a single earphone, two earphones (one in or on each of user 500's ears), in-ear earphone(s), over-ear headphone(s), or the like. In some embodiments, earphone 502 corresponds to wearable audio output device 301 (FIG. 3B). In some embodiments, earphone 502 is in communication with a device (e.g., device 100, FIG. 1A) which may be separate from or integrated with earphone 502.

In FIG. 5A, while earphone 502 positioned away from user 500's ear, and outside of a range 504 around user 500's ear, no audio output is provided via earphone 502.

When earphone 502 is placed in (or moved within range 504 of) user 500's ear, audio summary 506 of the current day is output via earphone 502. In some embodiments, audio summary 506 includes audio notifications (e.g., corresponding to events that occurred, are scheduled to occur, and/or are predicted to occur) at the device that is in communication with earphone 502. In some embodiments, as indicated in FIG. 5A, audio summary 506 is provided only in response to detecting placement of earphone 502 in user 500's ear for the first time in a particular day. As shown in FIG. 5A, audio summary 506 includes one or more of the following:

- the current date (e.g., the statement "Today is Monday, September 24")'
- the weather for the current day (e.g., the statement "It is currently 65 degrees and sunny, with a high of 78 degrees");
- a summary of events missed (e.g., the statement "You have four messages and five emails") while earphone 502 was not in or within range of user 500's ear;
- commute information (e.g., the statement "Right now, it will take you 25 minutes to get to work"); and
- the first upcoming calendar event (e.g., the statement "Your first meeting is 'Project Status Updates' at ten-thirty").

Figure 5B:
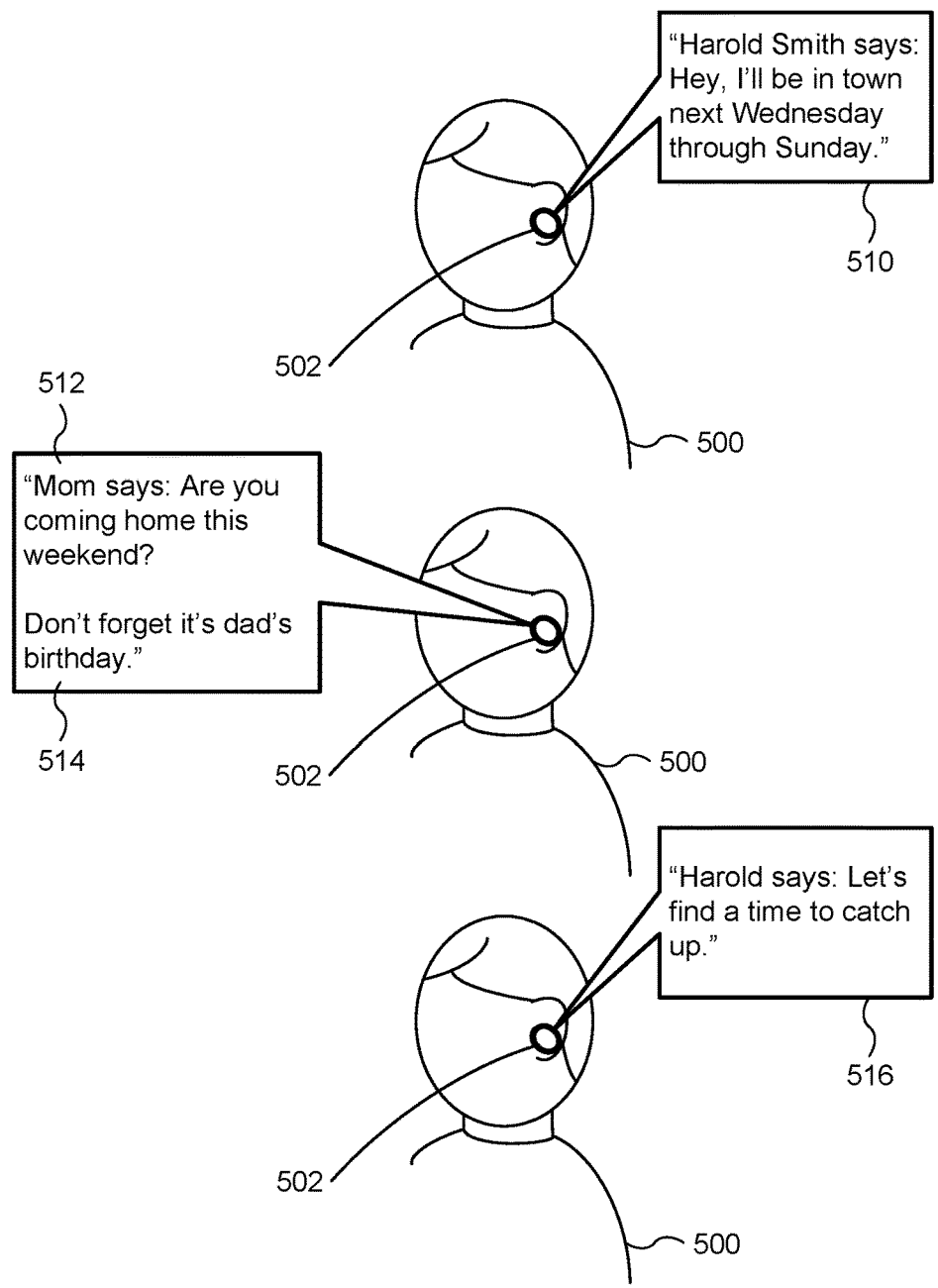

FIG. 5B illustrates examples of differentiating audio notifications based on properties of detected events. As indicated in FIG. 5B, the detected events correspond to received messages 508-1 through 508-4. Message 508-1 is received from "Harold Smith" and includes textual content (e.g., the text "Hey, I'll be in town next Wednesday through Sunday."). Next, messages 508-2 and 508-3 are received from "Barbara Lee (Mom)" (the user's mother) and include textual content (e.g., the text "Are you coming home this weekend?" and the text "Don't forget it's dad's birthday," respectively). Afterwards, message 508-4 is received, also from "Harold Smith," and includes textual content (e.g., the text "Let's find a time to catch up.").

In response to receiving message 508-1, audio notification 510, which includes the content of message 508-1 in verbal form (e.g., read aloud by converting the text of message 508-1 to speech), is provided to user 500 via earphone 502. In the example shown in FIG. 5B, audio notification 510 identifies message sender "Harold Smith" by his full name (e.g., both his first and last names). In some circumstances, as shown in FIG. 5B, the inclusion of the last name of a contact (e.g., "Smith") in addition to his first name (e.g., "Harold") is due to user 500 not having communicated with the contact for at least a predefined period of time (e.g., not for at least the last week, month, year, or other specified period). In some circumstances, the inclusion of a contact's first and last names in an audio notification associated with a message or other event received from that contact is due to the inclusion of another contact in user 500's address book having the same first name (e.g., the inclusion of another "Harold" in user 500's address book).

In response to receiving message 508-2, audio notification 512, which includes the content of message 508-2 in verbal form, is provided to user 500 via earphone 502. In the example shown in FIG. 5B, audio notification 512 identifies message sender "Barbara Lee" (user 500's mother) by her alias, "Mom" (e.g., as specified by user 500 in his address book) instead of by her full name, "Barbara Lee." Because user 500 has communicated with "Mom" within the predefined period of time (e.g., within the last week, month, year, or other specified time period), audio notification 512 does not identify "Mom" by her full name.

In addition, in response to receiving message 508-3, audio notification 514, which includes the content of message 508-3 in verbal form, is provided to user 500 via earphone 502. In the example shown in FIG. 5B, audio notification 514 omits the name of message sender "Barbara Lee," because message 508-3 corresponding to audio notification 514 immediately follows another message (e.g., message 508-2 corresponding to audio notification 512) that was also received from the same sender, "Barbara Lee."

In response to receiving message 508-4, audio notification 516, which includes the content of message 508-4 in verbal form, is provided to user 500 via earphone 502. In the example shown in FIG. 5B, audio notification 516 omits the last name of message sender "Harold Smith," because at this point user 500 has communicated with "Harold Smith" within the predefined period of time, as a result of receiving message 508-1 from the same "Harold Smith."

Figure 5C:
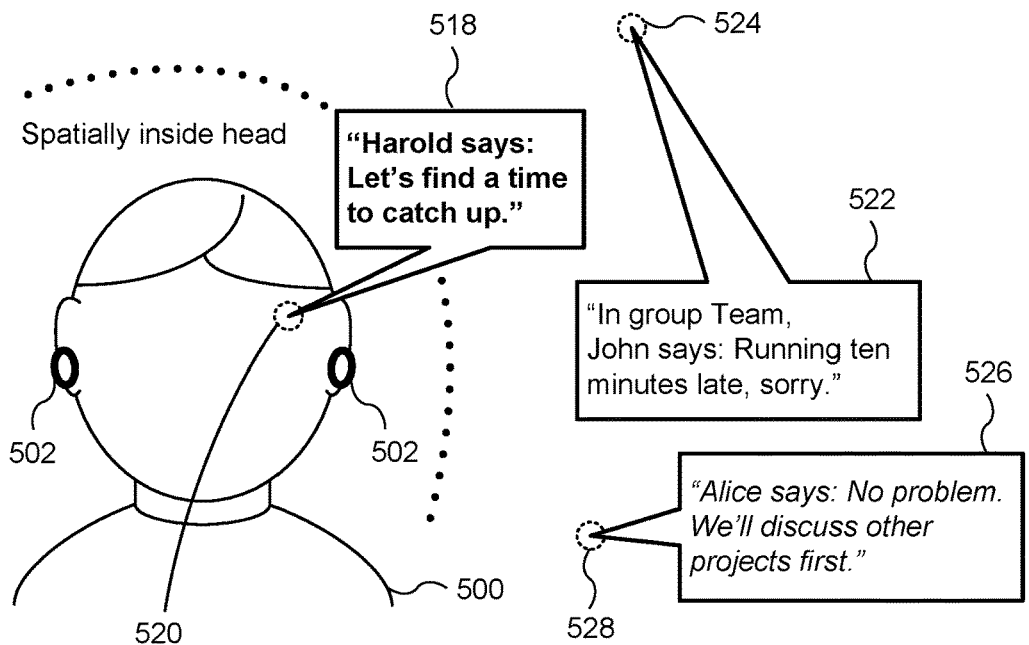

FIG. 5C illustrates examples of outputting audio notifications at different simulated spatial locations based on the properties of corresponding events. In some embodiments, providing audio notifications at different simulated spatial locations requires a plurality of audio output devices. Accordingly, FIG. 5C shows user 500 wearing a pair of earphones 502. As shown in FIG. 5C a plurality of events, message 508-4 through message 508-6, have been received. Message 508-4, as described with reference to FIG. 5B, is a text message from "Harold Smith." In particular, message 508-4 is sometimes referred to as an "individual message," in that message 508-4 is sent from "Harold Smith" to user 500 and to no other recipients. Messages 508-5 and 508-6 are both received as part of a group messaging session between three or more participants and identified as "Team,"

and are sometimes referred to as "group messages." In particular, message 508-5 is received from a participant in the "Team" group message, "John Godfrey," and includes textual content (e.g., the text "Running ten minutes late, sorry."). Next, message 508-6 is received from a different participant in the same "Team" group message, "Alice Young," and includes textual content (e.g., the text "No problem. We'll discuss other projects first.").

In response to receiving message 508-4, audio notification 518, which includes the content of message 508-4 in verbal form, is provided to user 500 via earphone 502. Because message 508-4 is an individual message, audio notification 518 is output at simulated spatial location 520 inside user 500's head, such that audio notification 518 sounds as though it were coming from or being played inside user 500's head at spatial location 520. In some embodiments, individual messages such as audio notification 518 are output at one or more simulated spatial locations inside user 500's head. In some embodiments, different spatial locations are associated with different contacts. For example, an audio notification from a sender other than "Harold Smith" is, in some embodiments, output at a simulated spatial location inside user 500's head that is different from simulated spatial location 520.

In response to receiving messages 508-5 and 508-6, audio notifications 522 and 526, respectively, are provided to user 500 via earphone 502. Audio notification 522 includes the content of message 508-5 in verbal form, prefaced with an indication that the message is part of a group message and an identifier of the group message (e.g., the group message preface "In group Team," where "Team" is the group message identifier). In addition, audio notification 522 is output at simulated spatial location 524 outside of user 500's head, such that audio notification 522 sounds as though it were coming from or being played outside of user 500's head at spatial location 524 (e.g., even though the sound is coming from earphone 502, which is in user 500's ear). Next, audio notification 526 includes the content of message 508-6 in verbal form. In some embodiments, as in the example shown in FIG. 5C, audio notification 526 omits the group message preface (e.g., "In group Team") because message 508-6 corresponding to audio notification 526 immediately follows another message (e.g., message 508-5 corresponding to audio notification 522) that was also received as part of the same group message (e.g., the "Team" group message). Audio notification 526 is output using a different type of audio (e.g., a different audio tone, or a different simulated voice) from audio notification 522 (e.g., as indicated by the italicized text representing audio notification 526, in contrast to the normal text representing audio notification 522). In addition, audio notification 526 is output at simulated spatial location 528 outside of user 500's head, such that audio notification 526 sounds as though it were coming from or being played outside of user 500's head at spatial location 528.

In some embodiments, as shown in FIG. 5C, audio notifications 522 and 526 are output at simulated spatial locations outside of user 500's head (e.g., simulated spatial locations 524 and 528, respectively), because messages 508-5 and 508-6 are group messages rather than individual messages. In addition, in some embodiments, as shown in FIG. 5C, audio notification 522 is output at a different simulated spatial location from audio notification 526, because messages 508-5 and 508-6 are messages from different senders (e.g., different participants in the group message).

In some embodiments, messages for different types of events are distinguished by outputting corresponding audio notifications at different volumes. For example, as shown in FIG. 5C, audio notification 518 is output at a higher volume (as indicated by the bold text) than audio notifications 522 and 526. In some embodiments, individual messages (e.g., message 508-4 from "Harold Smith" to only user 500) are output at a higher volume relative to group messages (e.g., messages 508-5 and 508-6 in group "Team" between user 500 and at least "John Godfrey" and "Alice Young"). One of ordinary skill will appreciate that many other ways of differentiating events are possible, including but not limited to emphasizing audio notifications from specific contacts over other contacts (e.g., in response to user designation of specific contacts, such as through creation of a "white list" of contacts), emphasizing audio notifications associated with specific applications over other applications, emphasizing audio notifications associated with specific types of applications over other types of applications, emphasizing audio notifications that satisfy certain geographic or temporal criteria (e.g., emphasizing audio notifications for certain events while the user is in or near a specific geographic location, or during specific times of day), and so on and so forth.

Figure 5D:
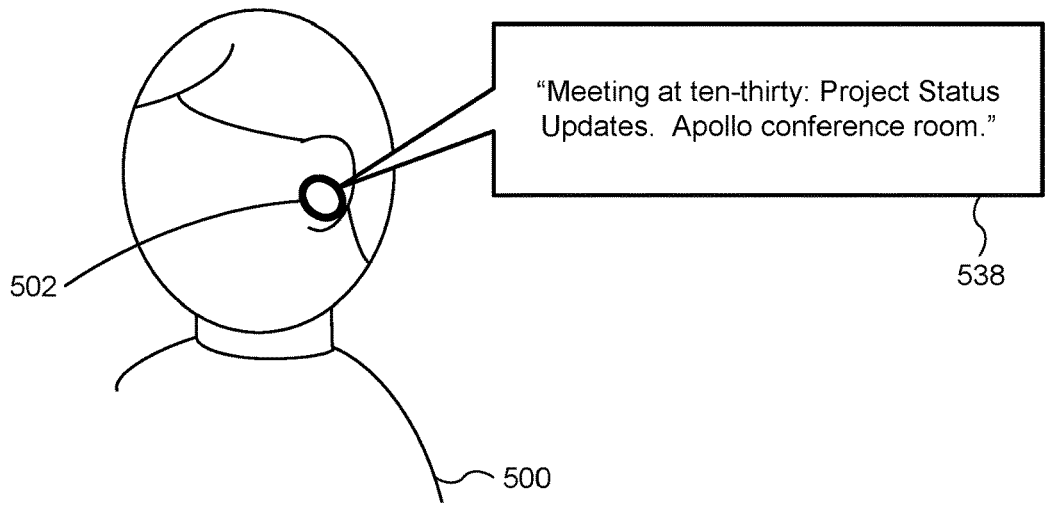
Figure 5D:
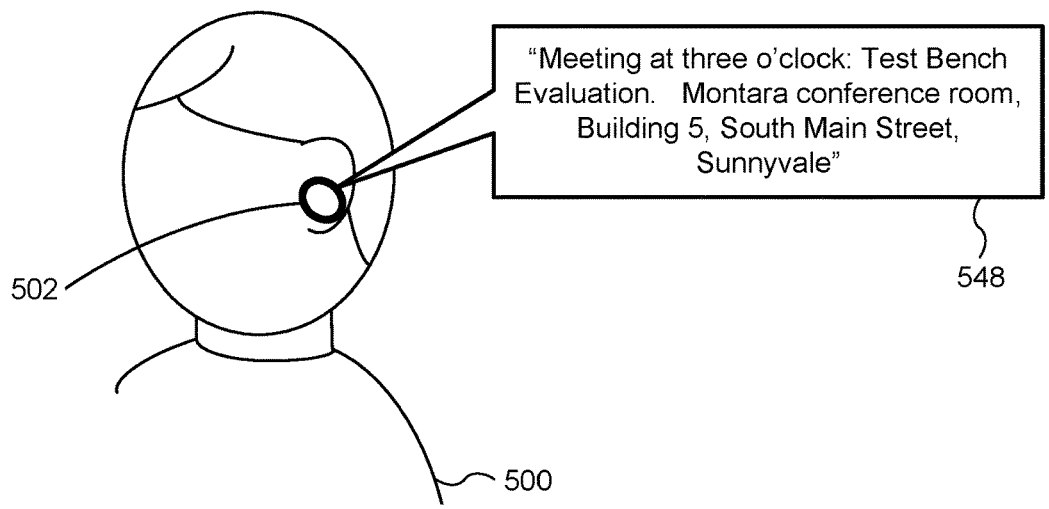

FIG. 5D illustrates examples of differentiating audio notifications based on geographic context. As indicated in FIG. 5D, a first event 530 is detected (e.g., at a device, such as device 100, FIG. 1A, that is in communication with earphone 502). Event 530 is a notification for an upcoming calendar event that is a meeting at a specified time 532 (e.g., "10:30 AM") about a specified subject 531 (e.g., "Project Status Updates") at a specified location 533 (e.g., "Apollo conference room, Building 1, N. De Anza Blvd., Cupertino). Event 530 is detected at a predefined time with respect to the calendar event (e.g., at current time 534, "10:20 AM," which is ten minutes prior to the start of the upcoming calendar event). In response to detecting event 530, audio notification 538 is provided via earphone 502 to notify user 500 of the upcoming meeting. Audio notification 538 includes information about event 530, including an indication of the event type (e.g., "Meeting"), the event time (e.g., "at ten-thirty"), and the event subject (e.g., "Project Status Updates").

As shown in FIG. 5D, audio notification 538 also includes event location information (e.g., "Apollo conference room"). In the example shown in FIG. 5D, the current location 536 of user 500 is "Lobby, Building 1." Thus, user 500 is already in the same building (e.g., "Building 1") as the meeting location associated with event 530. Accordingly, audio notification 538 omits the name of the building (e.g., "Building 1") as well as any description of larger geographic regions such as street name and city name. Audio notification 538 includes only location information for geographic regions that differ from the current location 536 of user 500 (e.g., for geographic regions within the building, such as floor number or conference room name). In some embodiments, where user 500 is already in the same smallest geographic region (e.g., the same conference room) as the upcoming event, no event location information is provided in the corresponding audio notification.

FIG. 5D also indicates that a second event 540 is detected (e.g., at a device, such as device 100, FIG. 1A, that is in communication with earphone 502). Event 540 is a notification for an upcoming calendar event that is a meeting at a specified time 542 (e.g., "3:00 PM") about a specified subject 541 (e.g., "Test Bench Evaluation") at a specified location 543 (e.g., "Montara conference room, Building 5, S. Main St., Sunnyvale). Event 540 is detected at a predefined time with respect to the calendar event (e.g., at current time 544, "2:50 PM," which is ten minutes prior to the start of the upcoming calendar event). In response to detecting event 540, audio notification 548 is provided via earphone 502 to notify user 500 of the upcoming meeting. Audio notification 548 includes information about event 540, including an indication of the event type (e.g., "Meeting"), the event time (e.g., "at three o'clock"), and the event subject (e.g., "Test Bench Evaluation").

In some embodiments, audio notification 548 also includes event location information (e.g., "Montara conference room, Building 5, South Main Street, Sunnyvale"). In the example shown in FIG. 5D, the current location 546 of user 500 is "Lobby, Building 1." Thus, user 500 is in a different city (e.g., "Cupertino") from the city in which event 540 is to take place (e.g., "Sunnyvale"), although the two cities are in the same state. Accordingly, audio notification 548 includes the name of the conference room (e.g., "Montara"), the name of the building (e.g., "Building 5"), the name of the street (e.g., "South Main Street"), and the name of the city (e.g., "Sunnyvale"), all of which are geographic regions that are different from user 500's current location 546. Audio notification 548 omits the name of the state in which event 540 is to take place, because user 500 is in that same state.

Figure 5E:
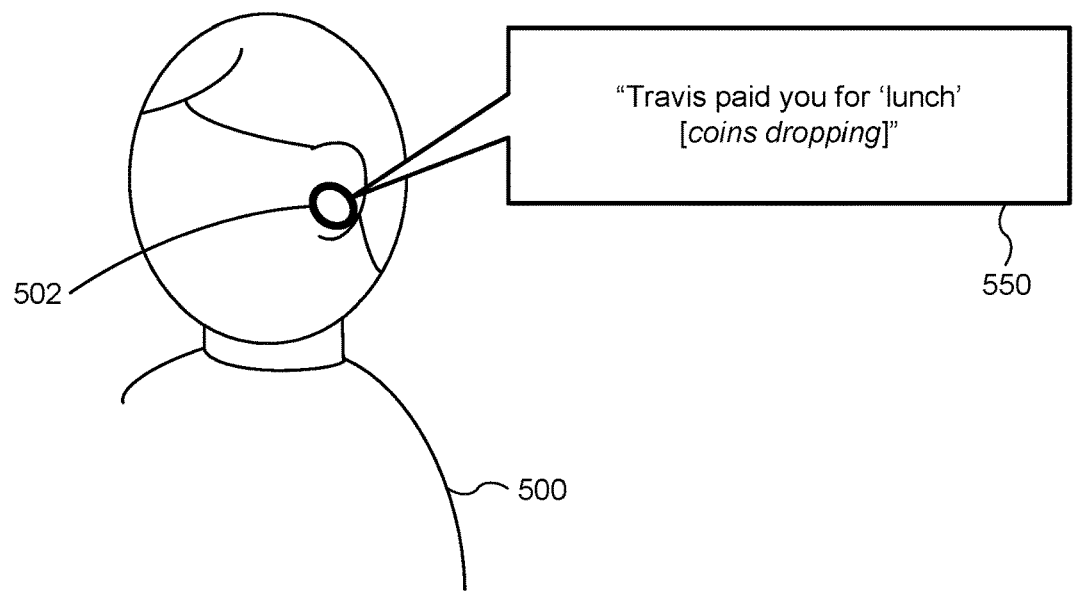
Figure 5E:
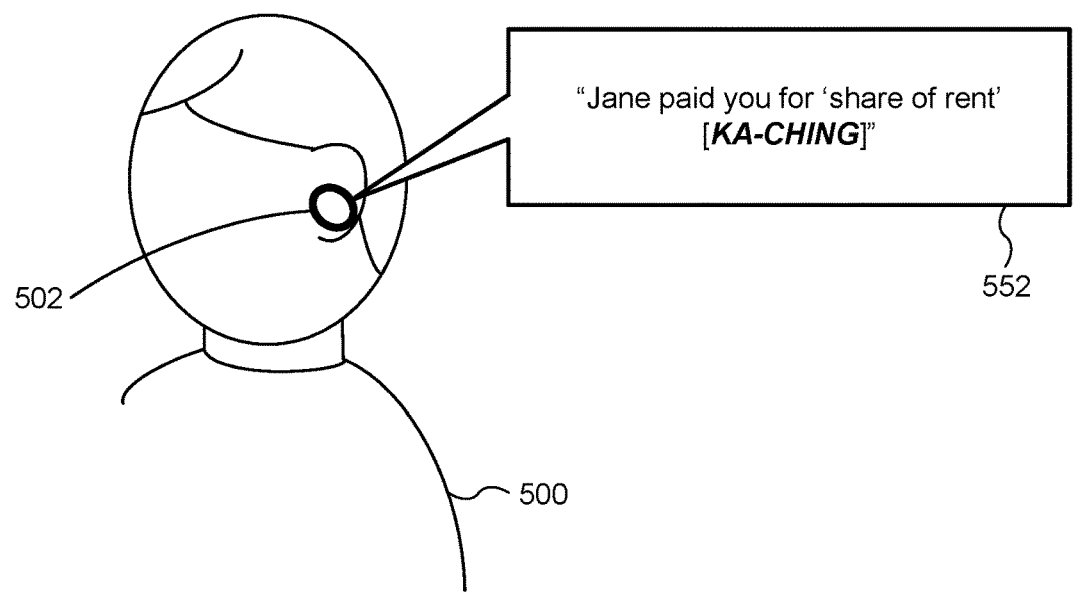

FIG. 5E illustrates examples of differentiating audio notifications based on properties of received events. In particular, FIG. 5E illustrates different sound effects and output volumes being used to represent events indicating transactions of different values. In response to user 500 receiving a payment from "Travis" for a small amount of money (e.g., the cost of his "lunch"), audio notification 550 describing the transaction includes a first "[coins dropping]" sound effect, and is played at a low volume (as indicated by the lowercase text) via earphone 502. In response to user 500 receiving a payment from "Jane" for a large amount of money (e.g., the cost of her "share of rent"), audio notification 552 describing the transaction includes a second "[ka-ching]" cash register sound effect that is different from the first sound effect, and that is played at a high volume (as indicated by the bold uppercase text) via earphone 502.

Figure 5F:
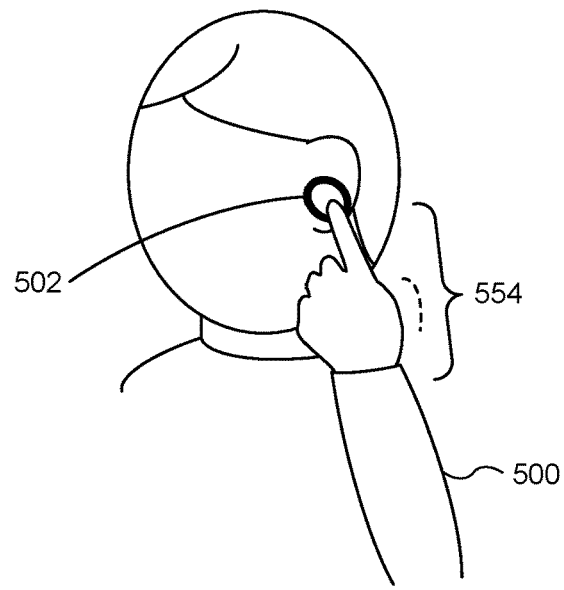
Figure 5F:
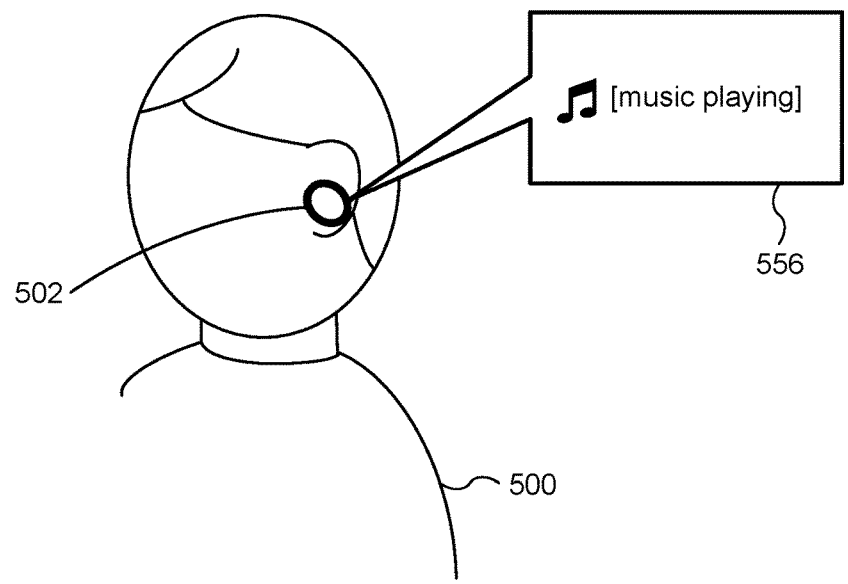

FIG. 5F illustrates an example operation performed in response to user 500 interacting with earphone 502 in the absence of received notifications or events for at least a predefined period of time. In particular, FIG. 5F indicates that no notifications have been received (e.g., by a device in communication with earphone 502) in the last ten minutes. Accordingly, in response to detecting tap input 554 on earphone 502, earphone 502 begins playing music, as indicated by audio output 556.

FIG. 5G-5H illustrate outputting condensed audio notifications in response to detecting a plurality of events while earphone 502 is not in user 500's ear, where the corresponding audio notifications for the detected events, in the aggregate, are numerous and/or lengthy. In particular, FIG. 5G illustrates that, while earphone 502 is not in user 500's ear, multiple events are detected. The detected events correspond to messages 558-1 through 558-3 received from "Travis," messages 560-1 and 560-2 and event invitation 560-3 received from "Octavia," and messages 562-1 through 562-5 received from "Ellie." While earphone 502 is not in user 500's ear, audio notifications corresponding to the detected events are not output via earphone 502.

FIG. 5H illustrates that earphone 502 has been placed in user 500's ear. In response, audio notifications corresponding to the detected events are provided. However, outputting audio content associated with each of the detected events 558-1 through 558-3, 560-1 through 560-3, and 562-1 through 562-5 would, in the aggregate, require more than a predefined amount of time. Instead, as shown in FIG. 5H, condensed audio notifications are provided. In particular, audio notification 564 summarizes messages 558-1 through 558-3, all received from "Travis," into the statement "Travis sent you three messages." Similarly, audio notification 566 summarizes messages 560-1 and 560-2 and event invitation 560-3, all received from "Octavia," into the statement "Octavia sent you two messages and one event invitation." In the example in FIG. 5H, audio notifications 564 and 566 are output at simulated spatial location 568.

FIGS. 5I-5K illustrate changing the amount of content included in audio notifications (sometimes called "verbosity" of audio notifications) in response to user 500 interacting with earphone 502 via head movements. FIG. 5I illustrates that, after hearing audio notification 566 summarizing events 560-1 through 560-3, user 500 tilts his head toward simulated spatial location 568 (e.g., toward the "source" of the sound) to hear more information about the audio notification just played (or in some circumstances, the audio notification being played). In response, in FIG. 5J, additional audio content associated with events 560-1 through 560-3 (e.g., an expanded version of audio notification 566) are provided in the form of audio notifications 566-1 through 566-3. Audio notification 566-1 includes the content of message 560-1 in verbal form, prefaced by only the first name of the sender, "Octavia," with whom user 500 has "recently" communicated (e.g., within a predefined period of time such as the last week, month, or year). Audio notification 566-2 includes the content of message 560-2 in verbal form, omitting any identifier of the sender (because message 560-2 immediately follows another event, message 560-1, from the same sender). Audio notification 566-3 describes event invitation 560-3 (e.g., "Octavia invited you to an event at 4:30 PM today."). In some embodiments, because event invitation 560-3 immediately follows another event (e.g., message 560-2) from the same sender (e.g., "Octavia"), audio notification 566-3 is rephrased to omit any identifier of the sender.

FIG. 5K illustrates that, after hearing audio notification 566-3, user 500 tilts his head away from simulated spatial location 568 to hear less information about subsequent audio notifications (e.g., to return to listening to condensed audio notifications). In response, condensed audio notification 570 is provided at simulated spatial location 568. In particular, audio notification 570 summarizes messages 562-1 through 562-5, all received from "Ellie," into the statement "Ellie sent you five messages."

FIG. 5L-5R illustrate example operations performed in response to user interactions with earphone 502. In FIG. 5L, while audio notification 570 is being provided, or within a predefined period of time (e.g., within a few seconds) after audio notification 570 is provided, user 500 performs tap input 572 on earphone 502. In response to detecting tap input 572, additional audio content associated with messages 562-1 through 562-5 (e.g., an expanded version of audio notification 570) are provided in the form of audio notifications 570-1 through 570-5, as shown in FIGS. 5M-5P. In some embodiments, a (single) tap input directed to earphone 502 during or "soon" after (e.g., within a predefined time period such as a few seconds of) an audio notification performs an operation with respect to the audio notification (e.g., providing additional information, as illustrated in FIGS. 5L-5M), whereas a tap input outside of a time period that is "soon" after an audio notification performs a different operation that is independent of any audio notification (e.g., starting or stopping music playback, as illustrated in FIG. 5F).

In FIG. 5M, audio notification 570-1 includes the content of message 562-1 in verbal form, prefaced by only the first name of the sender, "Ellie," with whom user 500 has "recently" communicated. Audio notification 570-2 includes the content of message 562-2 in verbal form. In particular, because message 562-2 consists of a photograph, audio notification 570-2 includes a verbal description of content of the photograph (e.g., a verbal summary that includes one or more keywords associated with the photograph, determined using image processing). Accordingly, audio notification 570-2 includes the statement "Ellie sent a photo of a cat," describing the photograph of a cat in message 562-2. In some embodiments, because message 562-2 immediately follows another message (e.g., message 562-1) from the same sender (e.g., "Ellie"), audio notification 570-2 is rephrased to omit any identifier of the sender.

In FIG. 5N, audio notification 570-3 includes the content of message 562-3 in verbal form, omitting any identifier of the sender (e.g., "Ellie"), because message 562-3 immediately follows another message 562-2 also from the same sender. After providing audio notification 570-3, earphone 502 begins to provide a first portion of audio notification 570-4, which includes a first portion of the content of message 562-4 in verbal form (e.g., the partial statement "Are you going h - - -"). While audio notification 570-4 is being provided (e.g., after the first portion is provided, but before a second subsequent portion is provided), user 500 directs double-tap input 574 to earphone 502, as shown in FIG. 5O. In response, earphone 502 skips the remainder of audio notification 570-4 corresponding to unread portion(s) of message 562-4, and proceeds to output audio notification 570-5 corresponding to message 562-5, as shown in FIG. 5P. In some embodiments, a (single) tap input directed to earphone 502 during or "soon" after (e.g., within a predefined time period such as a few seconds of) an audio notification performs a different operation with respect to the audio notification (e.g., providing additional information, as illustrated in FIGS. 5L-5M) than a double-tap input directed to earphone 502 during or "soon" after the audio notification (e.g., which skips the remainder of the audio notification, as illustrated in FIGS. 5O-5P).

In addition, in FIG. 5P, audio notification 570-5 is provided at an initial time as indicated by timer 576-1. In FIG. 5Q, after a predefined period of time since providing audio notification 570-5 has elapsed (e.g., more than 7-10 seconds), as indicated by timer 576-2, user 500 directs double-tap input 578 to earphone 502. In response to double-tap input 578 detected after the predefined period has elapsed, a virtual assistant is invoked (e.g., on earphone 502 or a device that is in communication with earphone 502, such as device 100, FIG. 1A). The invocation of the virtual assistant is indicated by sound effect 580 (e.g., a virtual assistant chime or tone, or another indication that the virtual assistant is prepared to receive spoken commands). In some embodiments, a double-tap input directed to earphone 502 during or "soon" after (e.g., within a predefined time period such as a few seconds of) an audio notification performs an operation with respect to the audio notification (e.g., skipping the remainder of the audio notification, as illustrated in FIGS. 5O-5P), whereas a double-tap input outside of a time period that is "soon" after an audio notification performs a different operation that is independent of any audio notification (e.g., invoking a virtual assistant, as illustrated in FIGS. 5Q-5R).

Figure 5S:
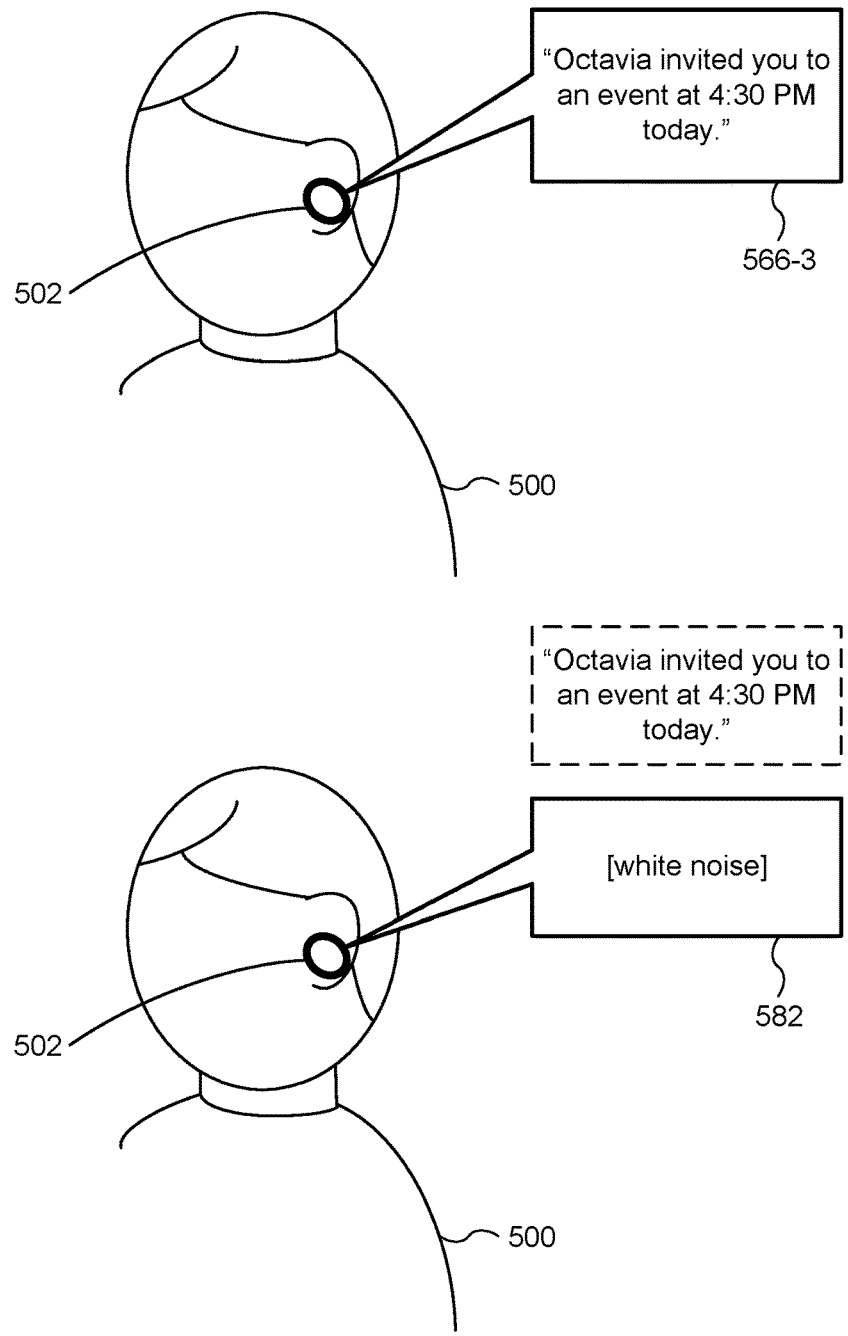

FIGS. 5S-5AB illustrate prompting a user and receiving a response to an audio notification. In response to receiving event 560-3, a calendar event invitation from "Octavia" for a meeting at "4:30 PM," audio notification 566-3 is provided to user 500 via earphone 502. Audio notification 566-3 includes information about event 560-3 in verbal form.

After providing audio notification 566-3, earphone 502 plays sound effect 582 (e.g., white noise) to indicate that earphone 502, or an electronic device that is in communication with earphone 502, is prepared to receive a response to audio notification 566-3, and to prompt user 500 to provide a response. In some embodiments, the electronic device that is in communication with earphone 502 is a smart watch (e.g., as shown in FIGS. 5T-5Y). In some embodiments, the electronic device that is in communication with earphone 502 is a smart phone (e.g., as shown in FIGS. 5Z-5AA).

Figure 5T:
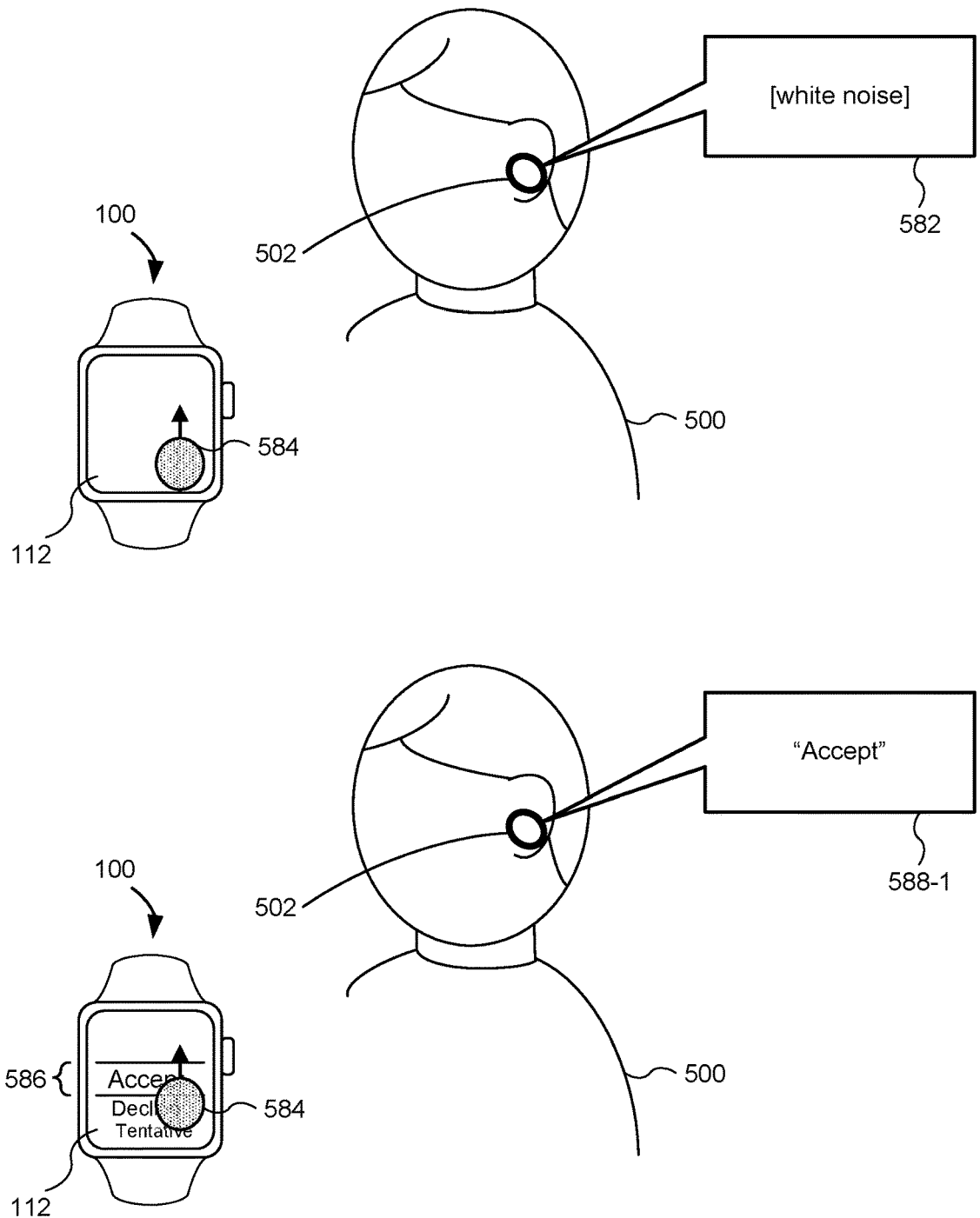

FIG. 5T illustrates a transition from FIG. 5S. FIG. 5T shows electronic device 100 that is in communication with earphone 502. Device 100 includes a touchscreen 112 (also called a "touch-sensitive display"). In response to hearing sound effect 582 played in FIG. 5S following audio notification 566-3, user 500 provides touch input 584 on touchscreen 112. In response to detecting touch input 584, selection indicator 586 indicates selection of a first response option of one or more response options for responding to calendar event invitation 560-3. In response to detecting touch input 584, device 100 initiates audio playback of response options for responding to calendar event invitation 560-3. In particular, FIG. 5T shows that, in response to movement of touch input 584 (or, more generally, a change in touch input 584), selection indicator 586 indicates selection of an option to accept calendar event invitation 560-3 (e.g., "Accept"), and audio notification 588-1 with the response option "Accept" is played to user 500 via earphone 502. In some embodiments, as in the example shown in FIG. 5T, the response options are displayed on touchscreen 112 in conjunction with the audio playback of the response options. In some embodiments, the response options are not displayed on touchscreen 112, and user 500 listens to the response options provided aurally without looking at touchscreen 112, so as to reduce power usage by touchscreen 112. In some embodiments, one or more of the response options are played automatically after audio notification 566-3 is played, and before sound effect 582 is played to indicate that device 100 is prepared to receive a response (e.g., as described herein with reference to FIG. 5AB). In some embodiments, less than all of the response options are played automatically (e.g., as shown in FIG. 5AB), and response options that were not played can be accessed and played in response to an input directed to earphone 502 (e.g., a tap input or double-tap input on earphone 502, or an audio input to earphone 502 via a microphone of earphone 502) or to device 100 (e.g., touch input 584 described herein with reference to FIGS. 5T-5V, or rotation of dial 592 as described herein with reference to FIGS. 5W-5Y).

Figure 5U:
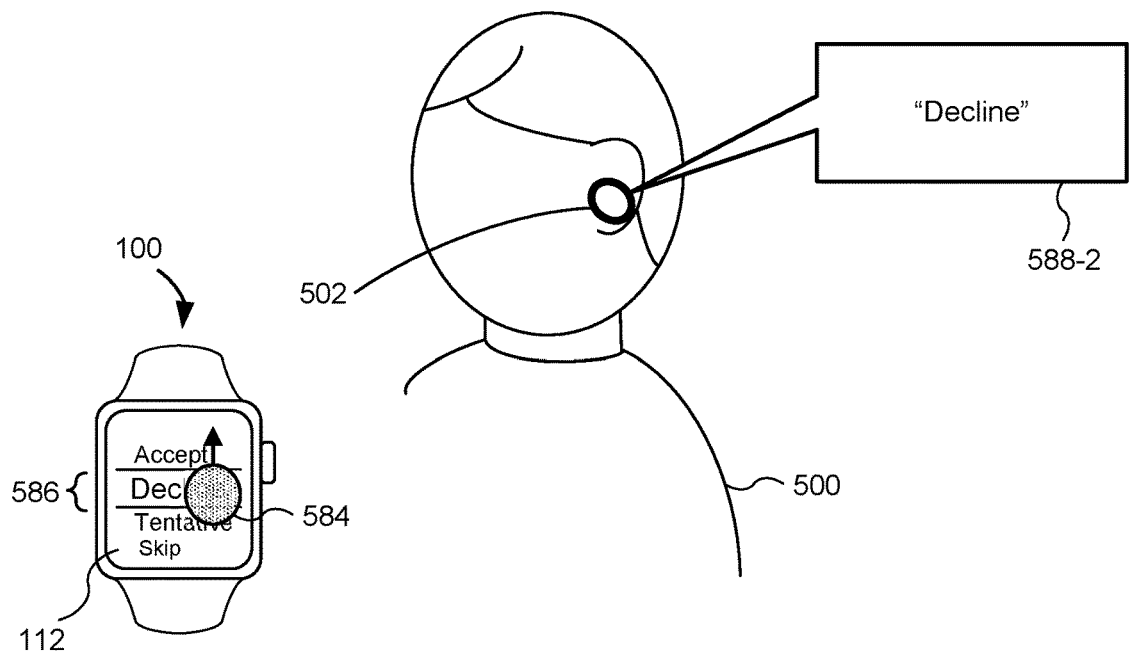
Figure 5U:
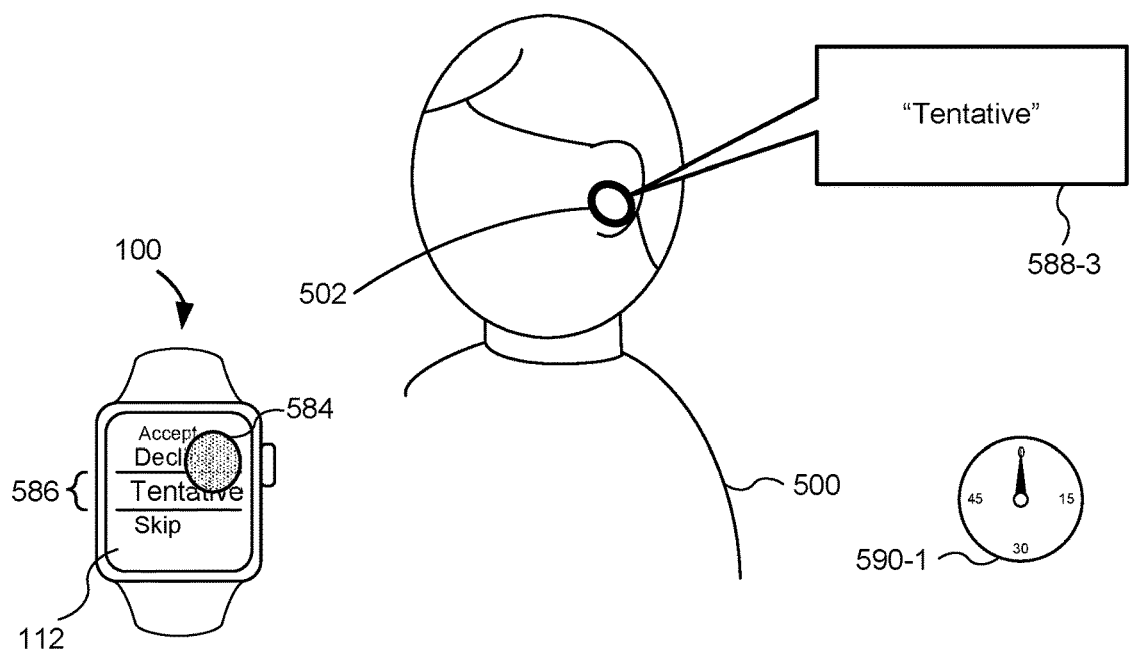

Next, in FIG. 5U, in response to further movement of touch input 584, selection indicator 586 changes to indicate selection of an option to decline calendar event invitation 560-3 (e.g., "Decline"), and audio notification 588-2 with the response option "Decline" is played to user 500 via earphone 502. Next, in response to further movement of touch input 584, selection indicator 586 changes to indicate selection of an option to tentatively accept calendar event invitation 560-3 (e.g., "Tentative"), and audio notification 588-3 with the response option "Tentative" is played to user 500 via earphone 502.

Figure 5V:
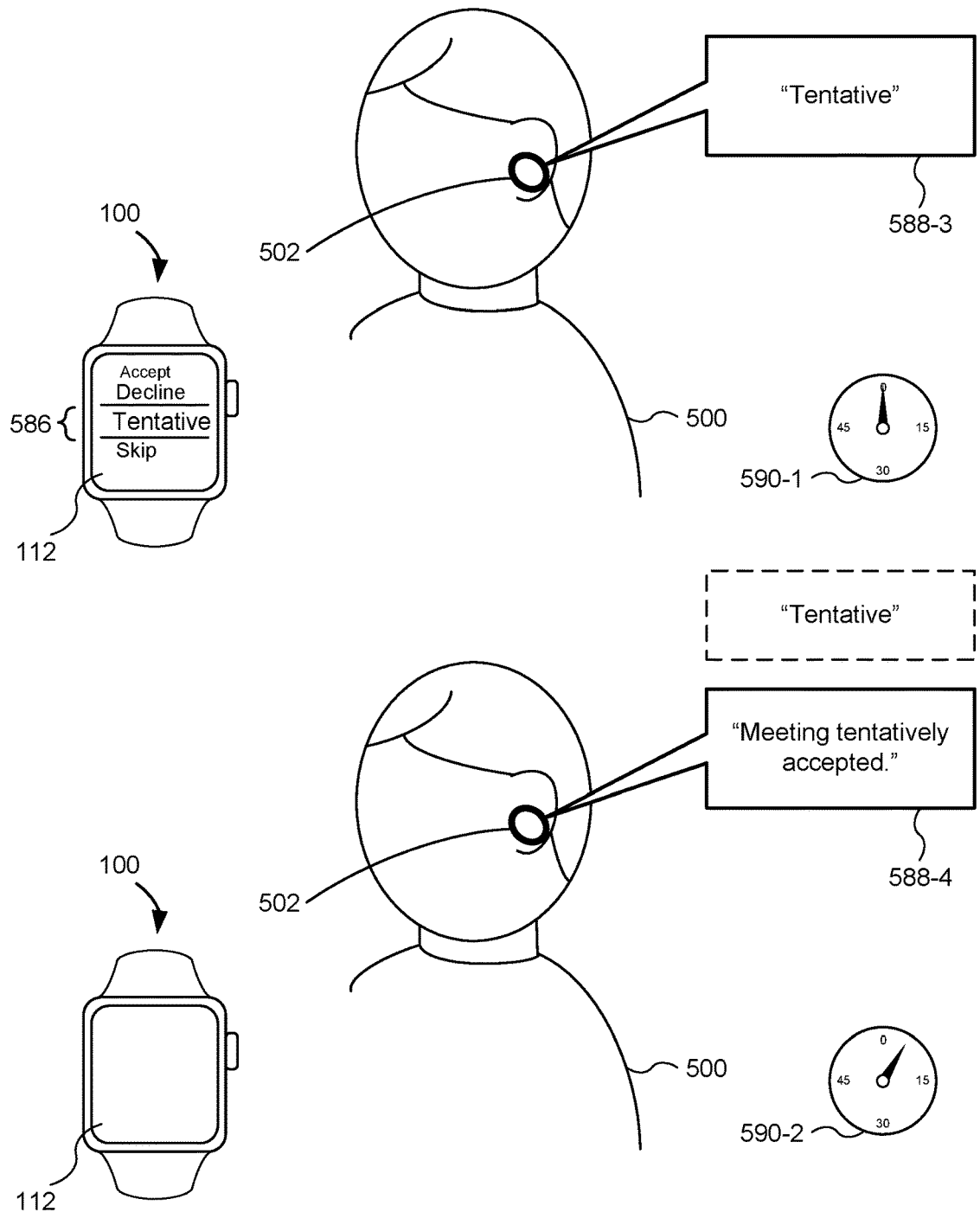

Next, in FIG. 5V, after audio notification 588-3 is provided to user 500 (and before a different audio notification with a different response option is provided), and while selection indicator 586 indicates selection of the option to tentatively accept calendar event invitation 560-3, touch input 584 is removed from touchscreen 112 at an initial time as indicated by timer 590-1. After touch input 584 has been removed from touchscreen 112 for at least a predefined period of time (e.g., a few seconds) as indicated by timer 590-2, selection of the option to tentatively accept calendar event invitation 560-3 is confirmed, and audio notification 588-4 is provided to indicate that calendar event invitation 560-3 has been tentatively accepted. In some embodiments, selection of a respective response option is confirmed in response to a second input (e.g., a tap input on touchscreen 112) detected after providing audio notification 566-3 and before a different audio notification with a different response option is provided. In some embodiments, where the selected response option is displayed on touchscreen 112, selection of the response option is confirmed when a second input is detected while selection indicator 586 indicates selection of the response option. In some embodiments, where one or more response options are concurrently displayed on touchscreen 112, a respective response option is selected and confirmed in response to a touch input (e.g., a tap input) on touchscreen 112 at a location corresponding to the respective response option.

Figure 5W:
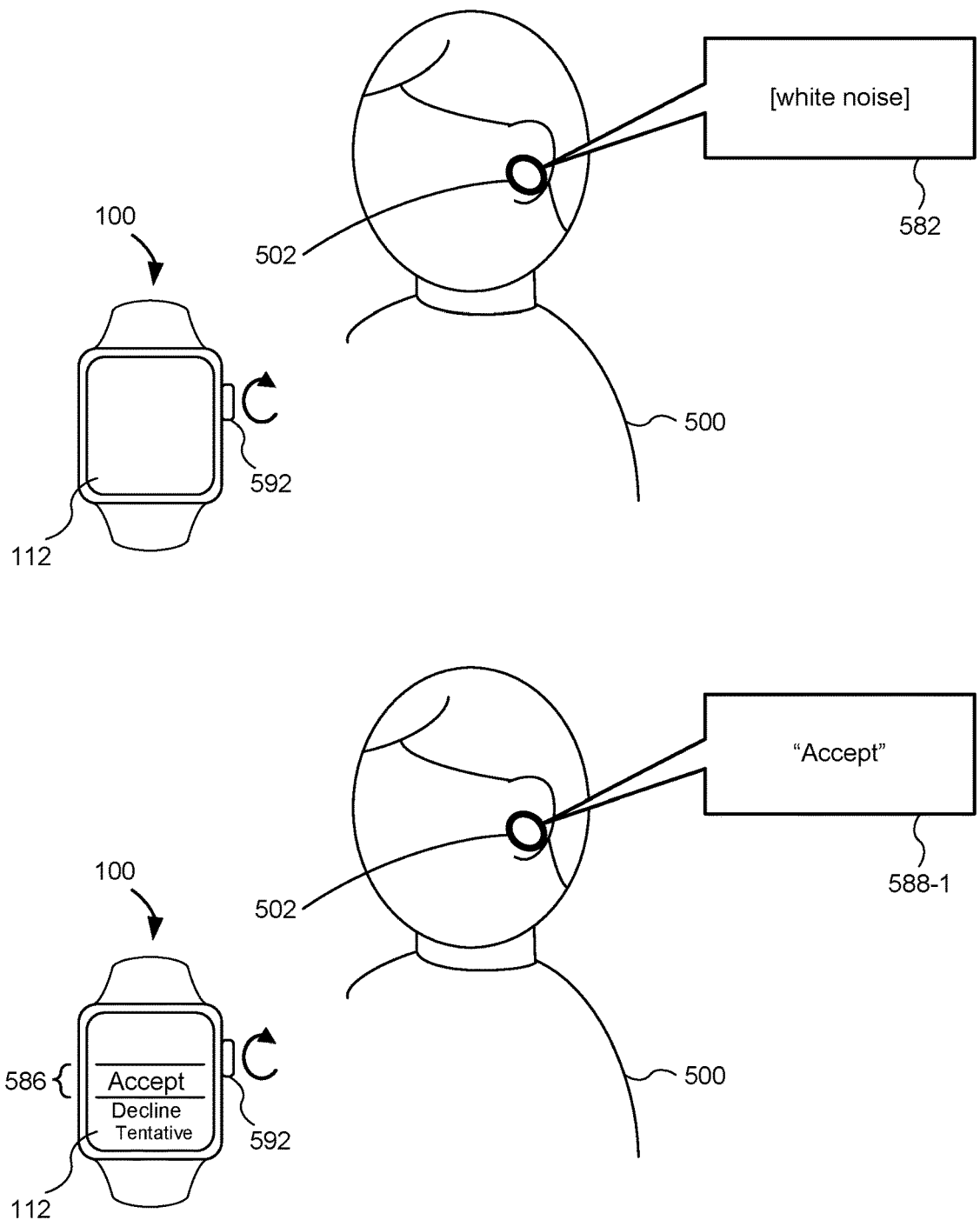

FIG. 5W illustrates an alternate transition from FIG. 5S. FIG. 5W shows electronic device 100 that is in communication with earphone 502. Device 100 includes dial 592 (e.g., a rotatable input mechanism, such as a watch crown) and display 112 (which is optionally a touch-sensitive display like touchscreen 112, FIG. 5U). In response to hearing sound effect 582 played in FIG. 5S following audio notification 566-3, user 500 rotates dial 592. In response to detecting the rotation of dial 592, selection indicator 586 indicates selection of a first response option of one or more response options for responding to calendar event invitation 560-3. In response to detecting the rotation of dial 592, device 100 initiates audio playback of the response options for responding to audio notification 560-3. In particular, FIG. 5W shows that, in response to the rotation of dial 592, selection indicator 586 indicates selection of an option to accept calendar event invitation 560-3 (e.g., "Accept"), and audio notification 588-1 with the response option "Accept" is played to user 500 via earphone 502. In some embodiments, as in the example shown in FIG. 5W, the response options are displayed on display 112 in conjunction with the audio playback of the response options. In some embodiments, the response options are not displayed on display 112, and user 500 listens to the response options provided aurally without looking at display 112, so as to reduce power usage by display 112.

Figure 5X:
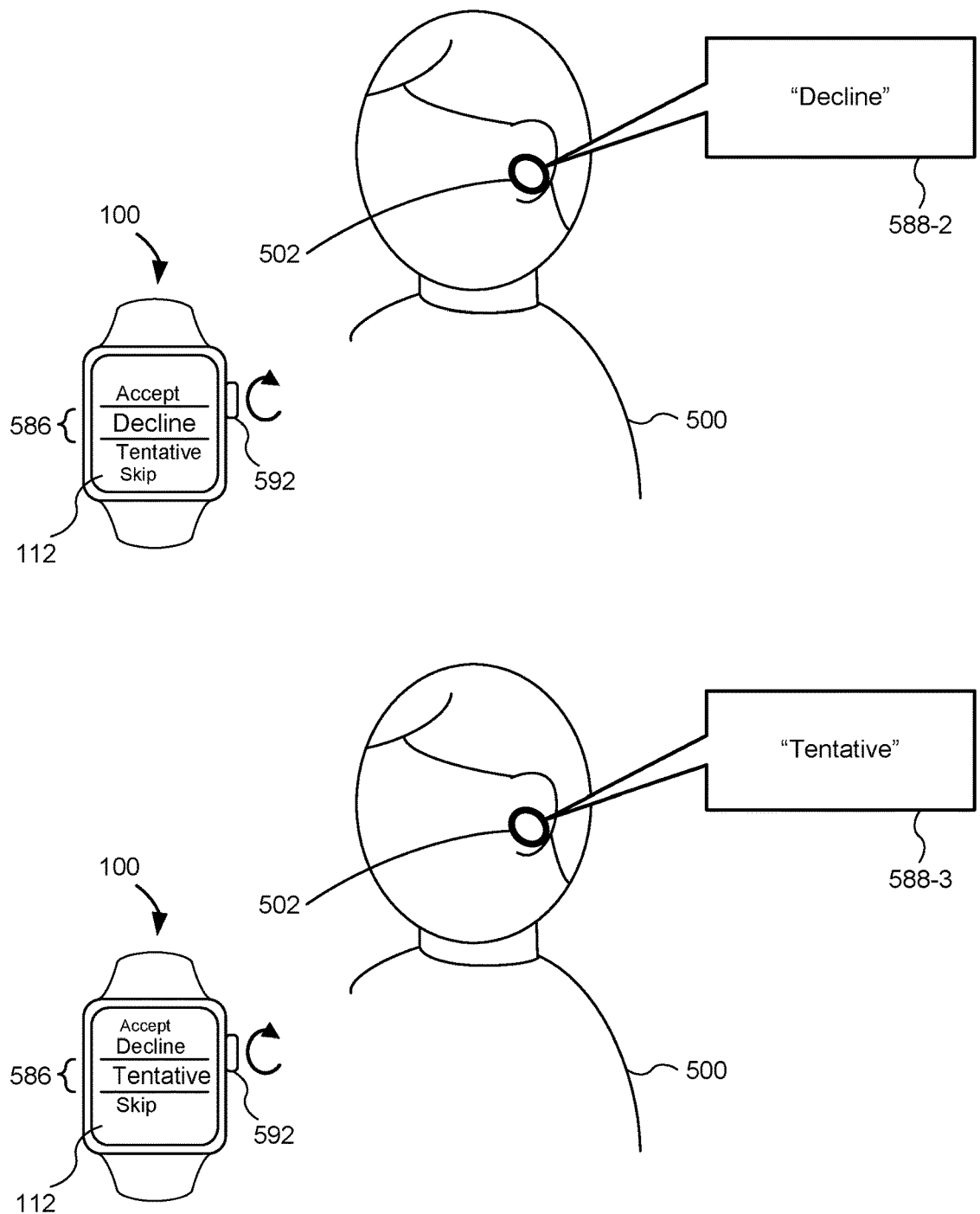

Next, in FIG. 5X, in response to further rotation of dial 592, selection indicator 586 changes to indicate selection of an option to decline calendar event invitation 560-3 (e.g., "Decline"), and audio notification 588-2 with the response option "Decline" is played to user 500 via earphone 502. Next, in response to further rotation of dial 592, selection indicator 586 changes to indicate selection of an option to tentatively accept calendar event invitation 560-3 (e.g., "Tentative"), and audio notification 588-3 with the response option "Tentative" is played to user 500 via earphone 502.

Figure 5Y:
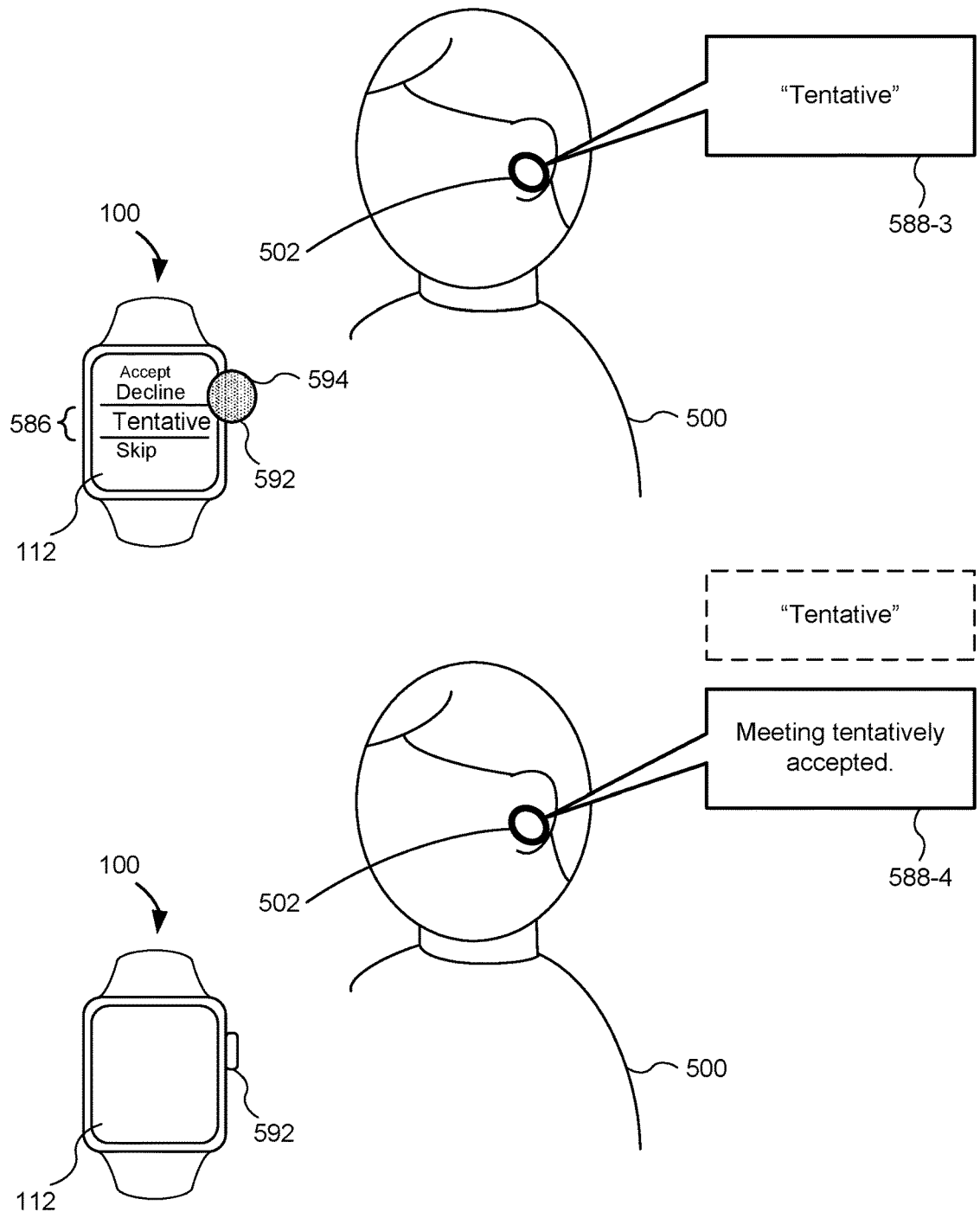
Figure 5Z:
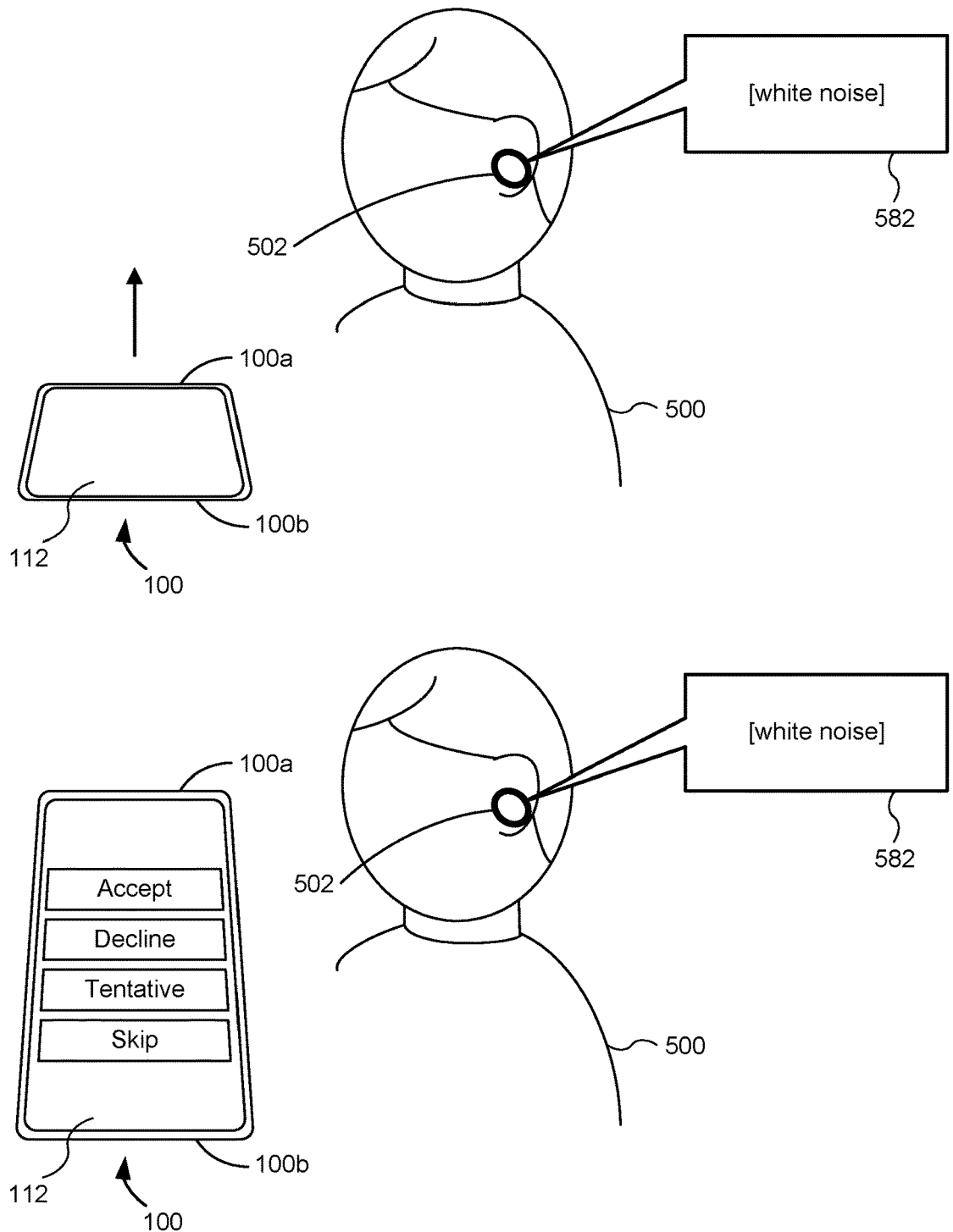
Figure 5A:
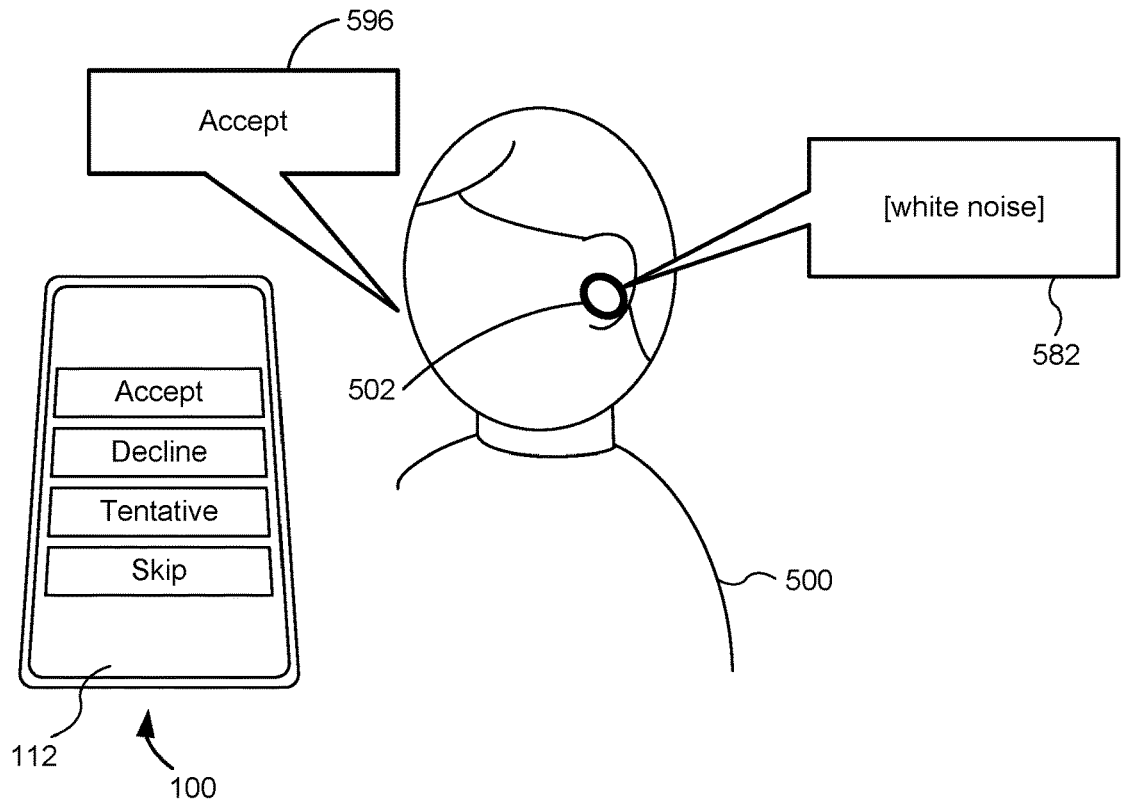
Figure 5A:
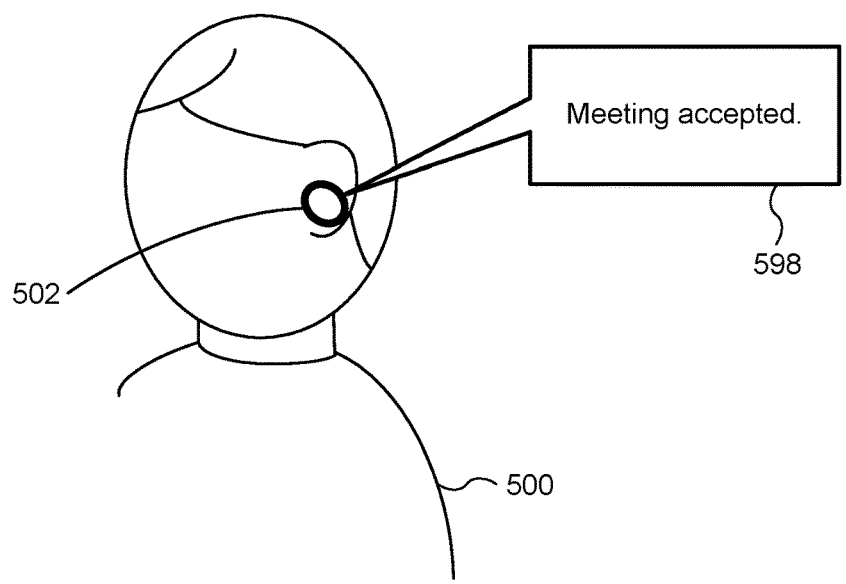
Figure 5A:
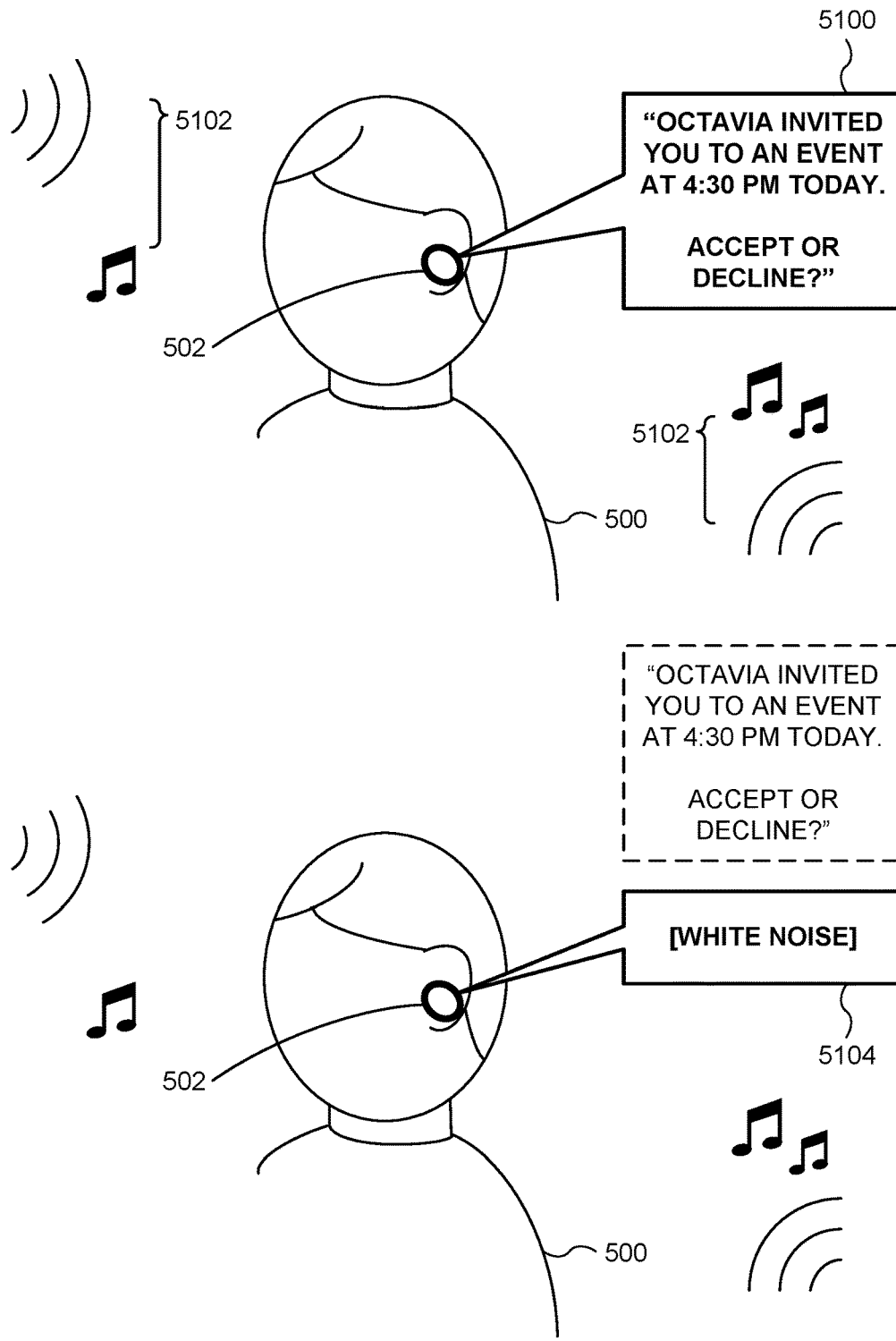
Figure 5A:
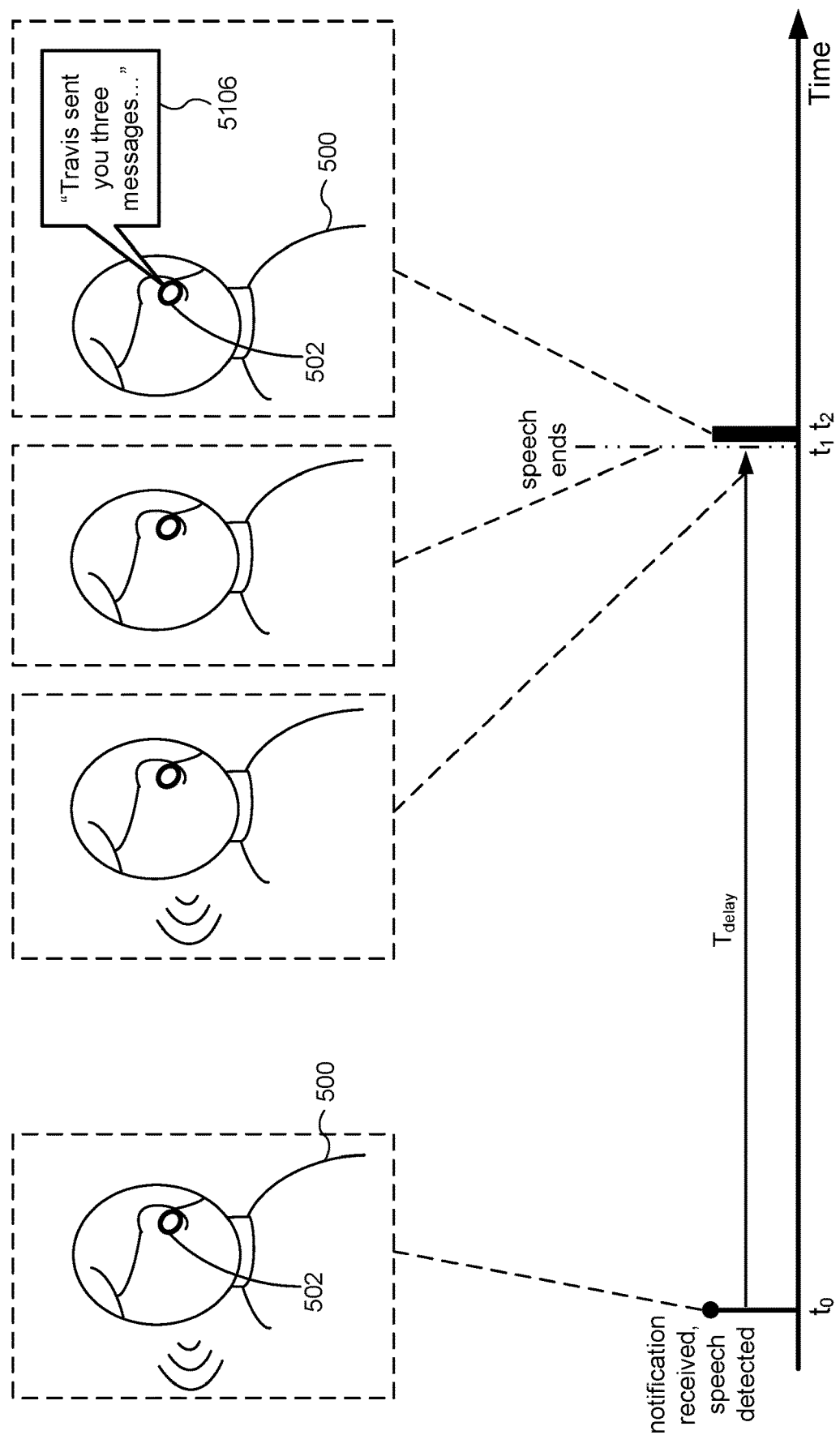
Figure 5A:
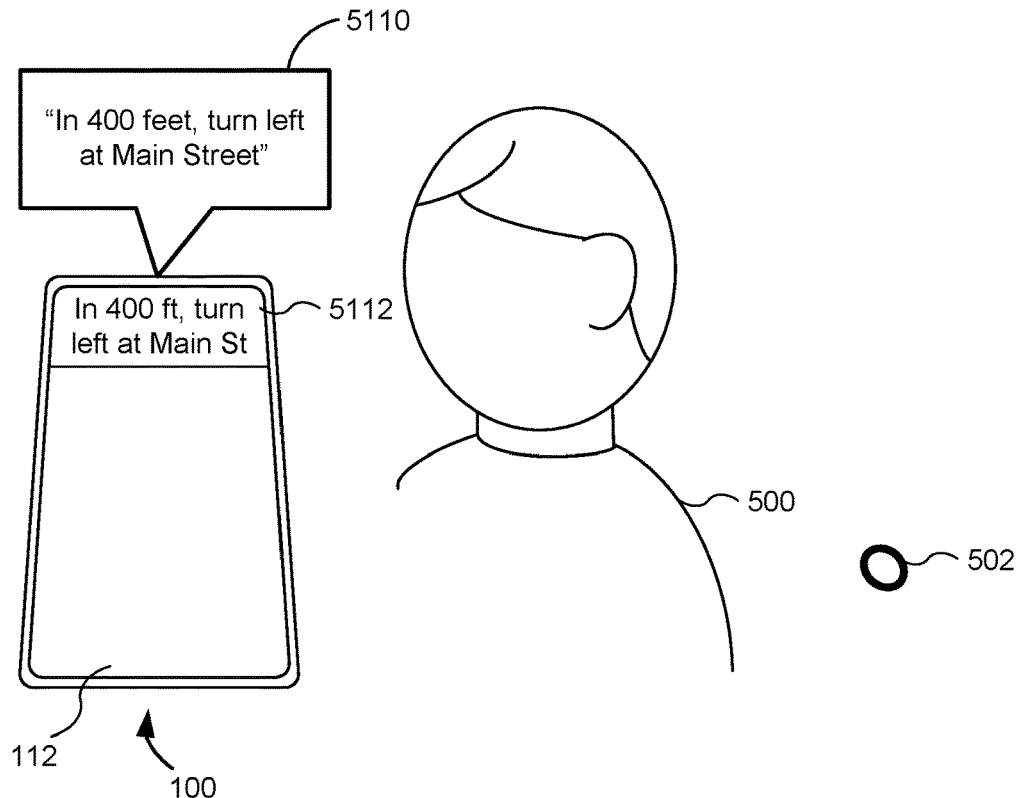
Figure 5A:
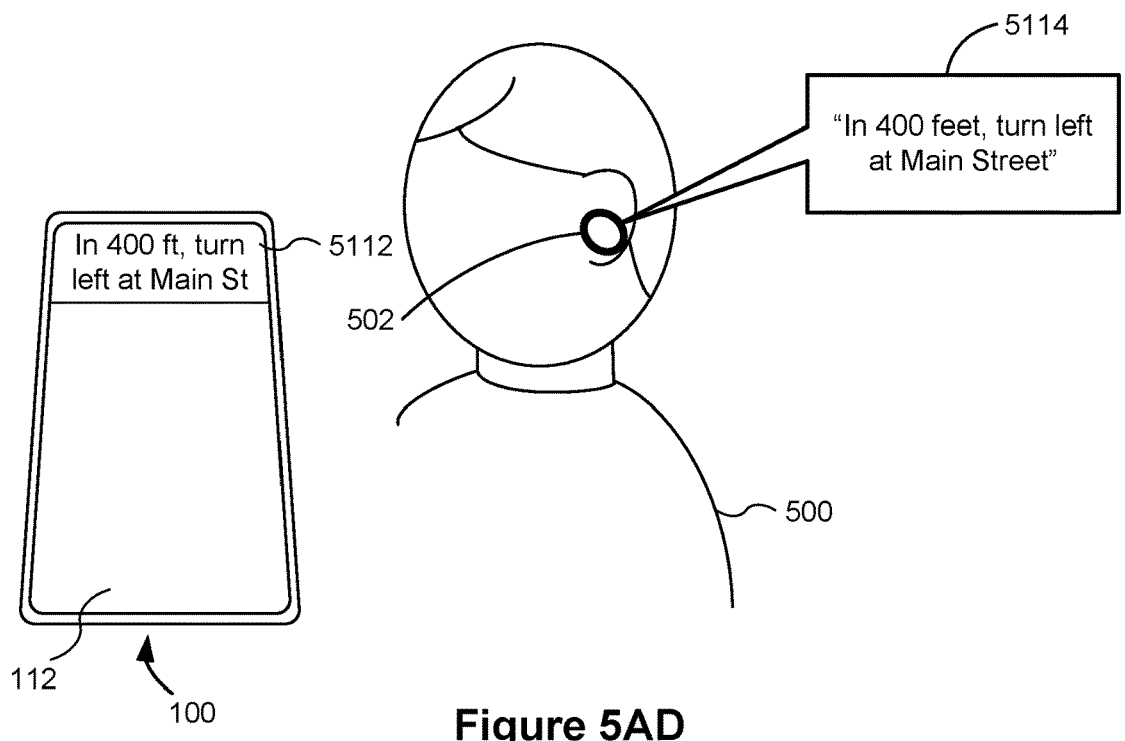
Figure 6A:
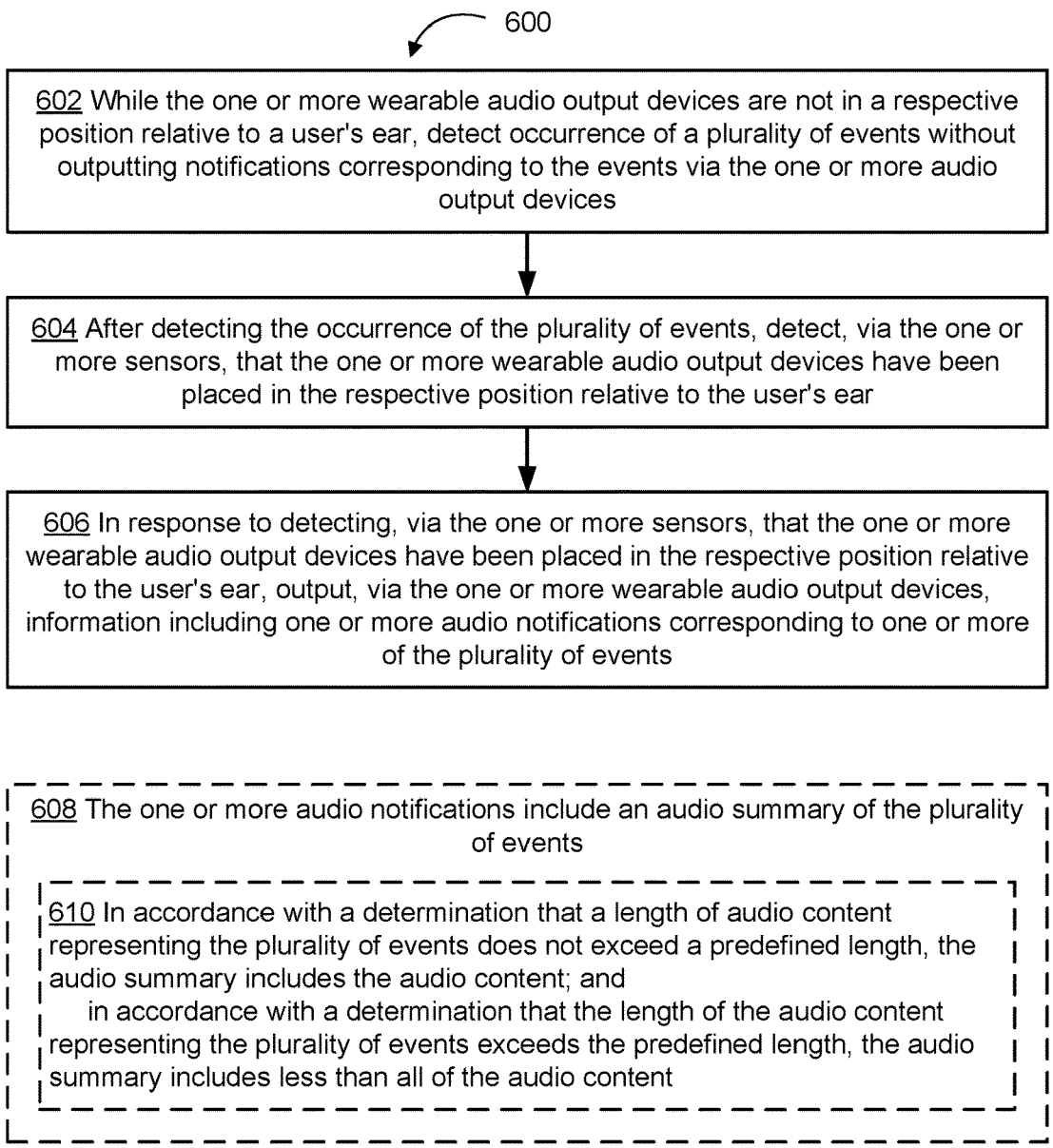

Next, in FIG. 5Y, once audio notification 588-3 is provided to user 500, and while selection indicator 586 indicates selection of the option to tentatively accept calendar event invitation 560-3, input 594 (e.g., a tap input or a press input) is detected via dial 592. In response to press input 594 via dial 592, selection of the option to tentatively accept calendar event invitation 560-3 is confirmed, and audio notification 588-4 is provided to indicate that calendar event invitation 560-3 has been tentatively accepted. In some embodiments, selection of a respective response option is confirmed when no further input is detected via dial 592 for at least a predefined period of time (e.g., a few seconds) after detecting the rotation of dial 592 that caused selection of the respective response option, or after hearing playback of the respective response option. In some embodiments, where the selected response option is displayed on display 112, selection of the response option is confirmed when selection indicator 586 remains on the respective response option for at least the predefined period of time. In some embodiments, device 100 includes a touch-sensitive surface, and where one or more response options are concurrently displayed on display 112, a respective response option is selected and confirmed in response to a touch input (e.g., a tap input) on the touch-sensitive surface at a location corresponding to the respective response option.

FIG. 5Z illustrates an alternate transition from FIG. 5S. FIG. 5Z shows electronic device 100 that is in communication with earphone 502. Device 100 includes display 112. In response to hearing sound effect 582 played in FIG. 5S following audio notification 566-3, user 500 raises device 100 (e.g., lifts atop edge 100a of device 100 relative to a bottom edge 100b of device 100) so as to change the attitude of device 100 by at least a predefined amount (e.g., by at least a predefined number of degrees, such as 30 degrees; from horizontal to at least a predefined number of degrees above horizontal, such as 30 degrees above horizontal; or from within a predefined range of horizontal, such as within 30 degrees of horizontal, to outside of the predefined range).

In response to detecting the change in attitude of device 100, a set of response options for responding to audio notification 566-3 is displayed on display 112 of device 100 (e.g., the options "Accept," "Decline," "Tentative," and "Skip"). In some embodiments, the set of response options is displayed in accordance with a determination that device 100 is raised within a predefined period of time (e.g., a few seconds) from a time when earphone 502 begins outputting sound effect 582.

Next, in FIG. 5AA, upon viewing the response options on display 112, and while sound effect 582 is being played via earphone 502, user 500 responds to calendar event invitation 560-3 by stating his desired response option out loud as indicated by response (speech) 596, "Accept". In response to detecting response 596 (e.g., via earphone 502), device 100 receives and processes the selection of the option to accept calendar event invitation 560-3. In response, audio notification 598 is provided to indicate that calendar event invitation 560-3 has been accepted.

In some embodiments, earphone 502 ceases to play sound effect 582 after a predefined period of time. In some embodiments, after earphone 502 ceases to play sound effect 582, device 100 will not receive a response to calendar event invitation 560-3 via the input mechanisms described with reference to FIGS. 5T through 5AA. In some such embodiments, user 500 may instead respond to calendar event invitation 560-3 by interacting with one or more user interfaces of device 100 to navigate to, view, and manually respond to a visual notification corresponding to event 560-3 on a touch-sensitive display of device 100.

FIG. 5AB illustrates adjustment of audio output volume in accordance with ambient noise levels. In FIG. 5AB, audio notification 5100, which includes the information about event 560-3 in verbal form, is provided to user 500 via earphone 502. Ambient noise elements 5102 indicate that the ambient noise level is high (e.g., in contrast to FIG. 5S, in which ambient noise elements 5102 are absent). In some embodiments, the ambient noise level is detected via one or more microphones on earphone 502 or on an electronic device that is in communication with earphone 502. Because the ambient noise level in FIG. 5AB is high, the output volume of audio notification 5100 is increased so that user 500 can hear audio notification 5100 over the ambient noise (as indicated by the bold uppercase text, in contrast to the normal text of audio notification 566-3, FIG. 5S).

In the example shown in FIG. 5AB, a subset of response options for responding to calendar event invitation 560-3 (e.g., corresponding to the most likely responses) is also provided to user 500 via earphone 502. In particular, after the information about event 560-3 is provided, user 500 is presented with a choice between two response options, "Accept" and "Decline" (e.g., the statement "Accept or Decline?").

After the subset of response options is provided, earphone 502 plays sound effect 5104 (e.g., white noise) to indicate that earphone 502, or the electronic device in communication with earphone 502, is prepared to receive a response to audio notification 5100, and to prompt user 500 to provide a response. Because the ambient noise level is high, the output volume of sound effect 5104 is also increased so that user 500 can hear sound effect 5104 over the ambient noise (as indicated by the bold uppercase text, in contrast to the lowercase text of sound effect 582, FIG. 5S). User 500 may respond to audio notification 5100 in any manner described herein, such as with speech (FIG. 5AA). Alternatively, user 500 may first request to hear additional response options in any manner described herein, such as by providing input via device 100 (e.g., as described herein with reference to FIGS. 5T-5Z), before providing or confirming selection of a response option.

FIG. 5AC illustrates delay of audio notifications while user 500 is engaged in a conversation. At time $t_0$, one or more events are detected (e.g., one or more notifications are received). Also, at time $t_0$, user 500 is determined to be engaged in a conversation (e.g., by detecting speech via one or more microphones on earphone 502 or on a device 100 in communication with earphone 502). Accordingly, outputting an audio notification corresponding to the detected event is delayed while user 500 is engaged in a conversation. At time $t_1$, user 500 is no longer engaged in a conversation (e.g., earphone 502 or device 100 detects that the speech has ended). Accordingly, delayed audio notification 5106 is provided to user 500 via earphone 502 at time $t_2$ following the end of the speech being detected. In some embodiments, as shown in FIG. 5AC, audio notification 5106 includes an audio summary of the one or more events (e.g., a summary of content of the one or more events) detected while user 500 was engaged in the conversation (e.g., using simulated speech, such as with text-to-speech conversion). In some embodiments, audio notification 5106 includes a beep or audio tone, without providing an audio summary of the one or more events.

FIG. 5AD illustrates suppressing redundant audio notifications when a device includes or is in communication with multiple audio output devices. In FIG. 5AD, map navigation event 5108 corresponding to a turn-by-turn direction is detected. While earphone 502 is not worn in user 500's ear, audio notification 5110 including verbal directions are provided via one or more speakers of device 100. Optionally, in conjunction with audio notification 5110 being provided, visual notification 5112 is displayed on display 112 of device 100. While earphone 502 is worn in user 500's ear, audio notification 5114 is provided via earphone 502, optionally in conjunction with visual notification 5112 being displayed.

FIGS. 6A-6E are flow diagrams illustrating method 600 of providing audio notifications to an audio output device worn by a user in accordance with some embodiments. Method 600 is performed at an electronic device (e.g., portable multifunction device 100, FIG. 1A, or device 300, FIG. 3A) that is in communication (e.g., via a wired or wireless connection) with (or includes) one or more wearable audio output devices (e.g., wearable audio output device 301, FIG. 3B, such as in-ear earphones, over ear headphones, or the like that are separate from the electronic device), and one or more sensors for detecting placement of the one or more wearable audio output devices (e.g., placement sensor(s) 304, FIG. 3B). In some embodiments, the sensors are located on the wearable audio output device (e.g., as shown in FIG. 3B). In some embodiments, the sensors are located on the electronic device. In some embodiments, the device includes a display (e.g., touch screen 112, FIG. 1A, or display 340, FIG. 3A) and a touch-sensitive surface (e.g., touch screen 112, FIG. 1A, or touchpad 355, FIG. 3A). In some embodiments, the device is in communication with or includes one or more additional audio output devices (e.g., one or more speakers, such as speaker 111 on device 100, FIG. 1A, or speaker(s) 306 on wearable audio output device 301, FIG. 3B). In some embodiments, the device includes one or more audio input devices (e.g., microphone 113, FIG. 1A, or microphone(s) 302, FIG. 3B). In some embodiments, the device includes a rotatable input mechanism (e.g., as part of other input controller(s) 160, FIG. 1A), which can be used to provide input to the device by rotating the input mechanism (e.g., the crown of a watch). In some embodiments, the device includes one or more accelerometers or attitude sensors (e.g., accelerometer(s) 167, gyroscope(s) 168, and/or magnetometer(s) 169, FIG. 1A) for detecting movement and/or changes in attitude of the device. In some embodiments, the wearable audio output device(s) in communication with the device include one or more accelerometers or attitude sensors (e.g., as part of other input device(s) 306, FIG. 3B) for detecting movement and/or changes in attitude of the wearable audio output device(s). Some operations in method 600 are, optionally, combined and/or the order of some operations is, optionally, changed.

As described below, method 600 automatically provides a user, having put on one or more wearable audio output devices (such as headphone(s) or in-ear earphone(s)), with audio notifications for events that occurred at an associated electronic device while the user was not wearing the wearable audio output device(s). Automatically providing audio notifications when specific conditions have been met (e.g., particular placement of the wearable audio output device(s)) and without requiring further user input makes it easy for the user to obtain information about missed events and reduces the extent of device usage and processing, thereby enhancing the operability of the devices and making the user-device interface more efficient (e.g., by helping the user obtain desired information and reducing user mistakes), reducing power usage, and improving battery life of the devices.

While the one or more wearable audio output devices are not in a respective position relative to a user's ear, the device detects (602) occurrence of a plurality of events without outputting notifications corresponding to the events via the one or more audio output devices.

After detecting the occurrence of the plurality of events, the device detects (604), via the one or more (placement) sensors, that the one or more wearable audio output devices have been placed in the respective position relative to the user's ear (e.g., in the user's ear, on the user's ear, or near the user's ear, as described herein with reference to FIG. 5A and FIGS. 5G-5H).

In response to detecting, via the one or more (placement) sensors, that the one or more wearable audio output devices have been placed in the respective position relative to the user's ear, the device outputs (606), via the one or more wearable audio output devices, information including one or more audio notifications corresponding to one or more of the plurality of events.

In some embodiments, the one or more audio notifications include (608) an audio summary of the plurality of events (e.g., audio summary 506, FIG. 5A). Providing an audio summary of events that occurred while the user was not wearing the wearable audio output device(s) allows the user to more quickly and easily understand missed event information, and reduces the need for the user to look through visual notifications displayed on a display of the electronic device, which reduces the number of inputs that need to be processed and reduces the amount of time that the display needs to be powered on, thereby enhancing the operability of the devices, reducing power usage, and improving battery life of the devices.

In some embodiments, in accordance with a determination that a length of audio content representing the plurality of events does not exceed (610) a predefined length, the audio summary includes the audio content; and in accordance with a determination that the length of the audio content representing the plurality of events exceeds the predefined length, the audio summary includes less than all of the audio content (e.g., audio notifications 564 and 566, FIG. 5H, summarize their corresponding events rather than outputting all of their associated audio content). Reducing the amount of content provided in an audio summary of events when a total length (e.g., a predicted total length) of the audio content would be too long (e.g., longer than a predefined length) reduces the intrusiveness of the audio summary and presents event information more efficiently while reducing the opportunity for the user to become distracted. This reduces the need for the user to review the notifications one or more additional times whether aurally or visually on a display of the device, which reduces the number of inputs that need to be processed and reduces the amount of time that the display needs to be powered on, thereby enhancing the operability of the devices, reducing power usage, and improving battery life of the devices.

In some embodiments, the information includes (612) one or more audio notifications corresponding to one or more events (e.g., received notifications, time-based alerts, proximity based alerts, calendar events, or the like) associated with (e.g., occurring within or scheduled/predicted to occur within) a respective time period (e.g., during the particular day in which the one or more wearable audio output devices have been placed in the respective position relative to the user's ear). In some embodiments, the respective time period is a time period beginning at a time in the past (e.g., a beginning of the day or the last time the one or more wearable audio output devices were detected in the respective position relative to the user's ear) and extending to the current time (e.g., the time that the one or more wearable audio output devices have been placed in the respective position relative to the user's ear). In some embodiments, the respective time period includes (e.g., in addition to the aforementioned time period) a time period beginning from the current time (e.g., the time that the one or more wearable audio output devices have been placed in the respective position relative to the user's ear) and extending to a time in the future (e.g., such as the end of the day). For example, audio summary 506 (FIG. 5A) includes audio notifications corresponding to missed events prior to user 500 putting on earphone 502, and audio notifications corresponding to events for the particular day, including upcoming events.

Providing a summary of events associated with a given time period of interest (such as the particular day in which the audio output device(s)) have been placed in or near the user's ear, or a time period preceding or following the placement of the audio output device(s) in the user's ear allows the user to more quickly and easily understand event information for the given time period (such as missed events or upcoming events). This reduces the need for the user to review missed notifications or upcoming events whether aurally or visually on a display of the device, which reduces the number of inputs that need to be processed and reduces the amount of time that the display needs to be powered on, thereby enhancing the operability of the devices, reducing power usage, and improving battery life of the devices.

In some embodiments, in response to detecting that the one or more wearable audio output devices have been placed in the respective position relative to the user's ear, outputting the one or more audio notifications corresponding to the one or more events associated with the respective time period is (614) performed in accordance with a determination that the one or more wearable audio output devices have been placed in the respective position relative to the user's ear for an initial time during the respective time period (e.g., the one or more wearable audio output devices have not previously been placed in the respective position relative to the user's ear during the respective time period, as noted herein with reference to FIG. 5A). In some embodiments, after detecting that the one or more wearable audio output devices have been placed in the respective position relative to the user's ear, the device detects, via the one or more sensors, that the one or more wearable audio output devices have been placed in the respective position for (or at) a subsequent time during the respective time period (e.g., the one or more wearable audio output devices are placed in the respective position again after being removed from the respective position). In some embodiments, in response to detecting, via the one or more sensors, that the one or more wearable audio output devices have been placed in the respective position for (or at) the subsequent time during the respective time period, the device forgoes outputting audio notifications corresponding to the one or more events associated with the respective time period. For example, audio summary 506 (FIG. 5A) is not provided upon subsequent removal and placement of earphone 502 in user 500's ear during the same day (although audio notifications for missed events in the intervening time while earphone 502 was not in user 500's ear may still be provided). Providing audio notifications for events only once in a predefined time period reduces redundancy of event information provided to the user, which reduces the intrusiveness of audio notifications and reduces device processing (e.g., by reducing the number of times that audio notifications need to be provided to the user), thereby enhancing the operability of the devices and making the user-device interface more efficient (e.g., by helping the user to achieve intended results and reducing user mistakes when operating/interacting with the devices), which, additionally, reduces power usage and improves battery life of the devices by enabling the user to use the devices more quickly and efficiently.

In some embodiments, the information includes (616) one or more audio notifications corresponding to one or more events that are scheduled to occur or predicted to occur within a predefined period of time following placement of the one or more wearable audio output devices in the respective position relative to the user's ear (e.g., an upcoming event as indicated in audio summary 506, FIG. 5A). In some embodiments, the predefined period of time corresponds to the remainder of the particular day in which the one or more wearable audio output devices have been placed in the respective position relative to the user's ear. Automatically providing audio notifications for upcoming events reduces the need for the user to provide inputs to the device to review the event information, and reduces the need for the user to look through the event information visually on a display of the electronic device, which reduces the number of inputs that need to be processed and reduces the amount of time that the display needs to be powered on, thereby enhancing the operability of the devices, reducing power usage, and improving battery life of the devices.

In some embodiments, outputting the one or more audio notifications includes (618) outputting a first audio notification corresponding to a first event in the plurality of events. In some embodiments, in accordance with a determination that the electronic device is in a first context, the first audio notification includes first audio content corresponding to the first context; and, in accordance with a determination that the electronic device is in a second context that is different from the first context, the first audio notification includes second audio content, different from the first audio content, corresponding to the second context. For example, as described herein with respect to FIG. 5D, and further discussed below, the first and second contexts may be distinct first and second geographical locations, or first and second geographical regions, for a first geographical location and geographical region that includes the first geographical location. Other examples are described below. Context-dependent presentation of event information in audio notifications provides the user with information that is useful for a given context of the electronic device (and that may not be useful in a different context of the device), which balances between reducing the redundancy of event information provided to the user and providing sufficient information, thereby providing improved feedback to the user, which in turn enhances the operability of the devices and makes the user-device interface more efficient (e.g., by helping the user to achieve intended results and reducing user mistakes when operating/interacting with the devices), which, additionally, reduces power usage and improves battery life of the devices by enabling the user to use the device more quickly and efficiently.

In some embodiments, the first event corresponds (620) to a calendar event occurring at a first geographical location (and, in some embodiments having an event time and/or an event title), where the first geographical location includes respective location information at a plurality of hierarchical levels in a location hierarchy. In some embodiments, determining that the electronic device is in the first context includes determining that a location of the electronic device is within a same first geographic region as the first geographical location (e.g., within a same building, within a same block, within a same city, etc.), the first geographic region corresponding to a first hierarchical level in the location hierarchy. In some embodiments, the first audio content includes respective location information at hierarchical levels lower than the first hierarchical level in the location hierarchy. In some embodiments, the first range is a smallest range surrounding the first geographical location that also includes the location of the electronic device. In some embodiments, the first audio content includes the event time and/or the event title. In some embodiments, the first audio content excludes respective location information at hierarchical levels at and above the first hierarchical level.

In some embodiments, determining that the electronic device is in the second context includes determining that the location of the electronic device is in a same second geographic region as the first geographical location, where the second geographic region is different from the first geographic region and corresponds to a second hierarchical level, different from the first hierarchical level, in the location hierarchy. In some embodiments, the second audio content includes respective location information at hierarchical levels lower than the second hierarchical level in the location hierarchy. In some embodiments, the second geographic region is a smallest geographic region surrounding the first geographical location that also includes the location of the electronic device. In some embodiments, the second audio content includes, in addition to the aforementioned respective location information at hierarchical levels lower than the second hierarchical level in the location hierarchy, the event time and/or the event title. In some embodiments, the second audio content excludes respective location information at hierarchical levels at and above the second hierarchical level.

When a user of the device is within a same particular geographic region as a destination location (such as a meeting location), providing information that is helpful to the user in navigating to the destination, without providing extraneous location information about larger geographic regions, balances reducing the redundancy of event information provided to the user with providing sufficient information, thereby providing improved feedback to the user, which in turn enhances the operability of the devices and makes the user-device interface more efficient (e.g., by helping the user to achieve intended results and reducing user mistakes when operating/interacting with the devices), which, additionally, reduces power usage and improves battery life of the devices by enabling the user to use the devices more quickly and efficiently. Context-dependent presentation of geographical information associated with events is described herein in more detail with reference to FIG. 5D.

In some embodiments, the first event corresponds (622) to a first message received from a first contact. In some embodiments, determining that the electronic device is in the first context includes determining that a first portion of an identifier (e.g., given name or first name) of the first contact is the same as a first portion of an identifier of at least one other contact in a list of contacts stored on the electronic device (or, in some embodiments, that the user has not communicated with the first contact within the predefined prior amount of time, such as within the last year). In some embodiments, the first audio content includes the first portion of the identifier of the first contact, a second portion of the identifier (e.g., surname or last name) of the first contact, and content of the first message. In some embodiments, determining that the electronic device is in the second context includes determining that the first portion of the identifier (e.g., given name or first name) of the first contact is not a first portion of an identifier of any other contact in the list of contacts. In some embodiments, the second audio content includes the first portion of the identifier of the first contact and the content of the first message without including the second portion of the identifier.

In some embodiments, determining that the electronic device is in the first context further includes determining that a user of the electronic device has communicated with the first contact within at least a predefined prior amount of time (e.g., the user has sent a message to or received a message from the first contact within the last year). In some embodiments, the first audio content excludes a second portion of the identifier (e.g., surname or last name) of the first contact where no other contact in the user's contact list has the same first portion of the identifier (e.g., given name or first name). When the identity of a sender of a message can be inferred from particular identifying information about the sender and from context (e.g., because the user recently communicated with that sender, and/or because the sender has a unique name in the user's address book or another form of contact list or other source(s) of contact information applicable to the user), providing only the particular information about the sender without providing extraneous identifying information balances reducing the redundancy of event information provided to the user with providing sufficient information, thereby reducing device processing, which in turn enhances the operability of the devices, reduces power usage, and improves battery life of the devices. Context-dependent inclusion/omission of portions of contact names is described herein in more detail with reference to at least FIGS. 5B-5C.

In some embodiments or in some circumstances, the first event corresponds (624) to a first message from a first contact (e.g., the device determines that the first event corresponds to a respective message from the first contact). In some embodiments, determining that the electronic device is in the first context includes determining that the first event does not consecutively follow a second event, in the plurality of events, that corresponds to a second message from the first contact (e.g., a second message transmitted or received before the first message). In some embodiments, the first audio content includes an identifier of the first contact and content of the first message. In some embodiments or in some circumstances, the first event does not consecutively follow a second event in the plurality of events that corresponds to a second message from the first contact because (e.g., because the device determines that): the first event is the initial event in the plurality of events; the first event consecutively follows a second event, but the second event does not correspond to a second message; or the first event and a second (e.g., prior) event both correspond to messages from the first contact but with one or more intervening events detected between the first event and the second event. In some embodiments, the identifier of a respective contact includes a first portion, and optionally a second portion, as described herein with reference to operation 622.

In some embodiments, determining that the electronic device is in the second context includes determining that the first event consecutively follows a second event in the plurality of events (e.g., with no intervening events detected) that corresponds to a second message from the first contact (e.g., a second message transmitted or received before the first message). In some embodiments, the second audio content includes the content of the first message and does not include an identifier of the first contact. When the identity of a sender of a given message can be inferred from identifying information provided for a previous message that immediately precedes the given message (e.g., with no intervening events occurring), omitting the identifying information of the sender for the given message reduces the redundancy of event information provided to the user and reduces device processing, thereby enhancing the operability of the devices, reducing power usage, and improving battery life of the devices. Context-dependent inclusion/omission of portions of contact names is described herein in more detail with reference to at least FIGS. 5B-5C.

In some embodiments or in some circumstances, (e.g., the device determines that) the first event corresponds (626) to a first message that is part of a group messaging session for a respective group. Examples of contexts determined, at least in part, based on group messaging, are described herein with respect to FIG. 5C. In some embodiments, determining that the electronic device is in the first context includes determining that the first event does not consecutively follow a second event, in the plurality of events, that corresponds to a second message that is part of the group messaging session (e.g., a second message transmitted or received before the first message and as part of the group messaging session). In some embodiments, the first audio content includes an identifier of the respective group or the group messaging session and content of the first message. In some embodiments, the first event does not consecutively follow a second event in the plurality of events that corresponds to a second message that is part of the group messaging session because (e.g., because the device determines that): the first event is the initial event in the plurality of events; the first event consecutively follows a second event, but the second event does not correspond to a message that is part of the group messaging session; or the first event and a second (e.g., prior) event both correspond to messages that are part of the group messaging session but with one or more intervening events detected between the first event and the second event.

In some embodiments, the identifier of the group messaging session includes a name of the group messaging session. In some embodiments, the identifier of the group messaging session includes identifiers of one or more (or all) participants in the group messaging session. In some embodiments, the first message is from a respective contact, and the first audio content includes an identifier of the first contact. In some embodiments, the identifier of the respective contact includes a first portion, and optionally a second portion, as described herein with reference to operation 622.

In some embodiments, determining that the electronic device is in the second context includes determining that the first event consecutively follows a second event in the plurality of events (e.g., with no intervening events detected) that corresponds to a second message that is part of the group messaging session (e.g., a second message transmitted or received before the first message as part of the group messaging session). In some embodiments, the second audio content includes the content of the first message and does not include an identifier of the respective group or the group messaging session. In some embodiments, the first message is from a first contact, and the second message is from a second contact that is different from the first contact, so the first audio content includes an identifier of the first contact (e.g., including a first portion, and optionally a second portion), as described herein with reference to operation 622. In some embodiments, the first message and the second message are from the same respective contact, so the first audio content does not include the identifier of the first contact, as described herein with reference to operation 622.

When a given message is received as part of a group messaging session, and the identity of the group can be inferred from identifying information provided for a previous message that immediately precedes the given message (e.g., with no intervening events occurring), omitting the identifying information of the group for the given message reduces the redundancy of event information provided to the user and reduces device processing, thereby enhancing the operability of the devices, reducing power usage, and improving battery life of the devices. Context-dependent inclusion/omission of group identifiers is described herein in more detail with reference to at least FIGS. 5B-5C.

In some embodiments, outputting the one or more audio notifications includes (628) outputting a first respective audio notification corresponding to a first respective event in the plurality of events. In some embodiments, the first respective event corresponds to a first application that is associated with a first notification class, and the first respective audio notification has a first structure defined by the first notification class. In some embodiments, the application specifies the respective notification class with which events associated with the application are associated. In some embodiments, the respective structure associated with a respective notification class is defined by an application-independent module (e.g., by an operating system of the electronic device or by an application programming interface). In some embodiments, the first structure specifies a first set of audio content for inclusion in the respective audio notification. In some embodiments, in accordance with a determination that a second application associated with a second respective event is associated with a second notification class that is different from the first notification class, a second respective audio notification has a different, second structure (e.g., a second set of audio content specified for inclusion in the second respective audio notification) that is defined by the second notification class.

For example, audio notifications 538 and 548 for calendar event invitations 530 and 540 may have notification structures defined by a calendar event notification class that defines the notification structure for calendar-type events. Outputting an audio notification for an event using a structure defined by a notification class with which the event is associated provides consistency in how event information is presented, so that the user can more readily understand the event information. Additionally, using a normalized notification structure for audio notifications associated with a given notification class reduces the computation required in determining what information to include in the audio notifications and in outputting the audio notifications, which enhances the operability of the devices, reduces power usage, and improves battery life of the devices.

In some embodiments, outputting the one or more audio notifications includes (630) outputting a second respective audio notification corresponding to a second respective event in the plurality of events. In some embodiments, the second respective event corresponds to a second application, and the second respective audio notification has a second structure defined by the second application. In some embodiments, the second structure specifies a second set of audio content for inclusion in the second respective audio notification. In some embodiments, in accordance with a determination that a third respective event in the plurality of events is associated with a third application that is different from the second application, a third respective audio notification has a different, third structure (e.g., a third set of audio content specified for inclusion in the third respective audio notification) that is defined by the third application.

For example, audio notifications 538 and 548 for calendar event invitations 530 and 540 may have notification structures defined by a calendar application with which the events are associated. If the events are associated with different calendar applications, the events may have different notification structures separately defined by each calendar application. Outputting an audio notification for an event using a structure defined or specified by an application with which the event is associated provides individual applications with greater flexibility in deciding what information to present in their associated audio notifications, and takes into account application developer preferences and determinations as to what information would be useful to the user in an audio notification. Additionally, using an application-specified structure for audio notifications for a given application reduces the computation required in determining what information to include in the audio notifications and in outputting the audio notifications, which enhances the operability of the devices, reduces power usage, and improves battery life of the devices.

It should be understood that the particular order in which the operations in FIGS. 6A-6E have been described is merely an example and is not intended to indicate that the described order is the only order in which the operations could be performed. One of ordinary skill in the art would recognize various ways to reorder the operations described herein. Additionally, it should be noted that details of other processes described herein with respect to one or more other methods described herein (e.g., methods 700, 800, 900, and/or 1000) are also applicable in an analogous manner to method 600 described above with respect to FIGS. 6A-6E. For example, the devices, or components thereof, events, audio notifications, and inputs described above with reference to method 600 optionally have one or more of the characteristics of the devices, or components thereof, events, audio notifications, and inputs described herein with reference to one or more of the other methods described herein (e.g., methods 700, 800, 900, and/or 1000). For brevity, these details are not repeated here.

FIGS. 7A-7C are flow diagrams illustrating method 700 of providing audio context to convey additional information about events in accordance with some embodiments. Method 700 is performed at an electronic device (e.g., portable multifunction device 100, FIG. 1A, or device 300, FIG. 3A, such as a phone, computer, headphones, or one or more earbuds) that is in communication (e.g., via a wired or wireless connection) with or includes one or more audio output devices (e.g., one or more speakers, such as speaker 111 on device 100, FIG. 1A, or speaker(s) 306 on wearable audio output device 301, FIG. 3B). In some embodiments, the device is one or more wearable audio output devices (e.g., wearable audio output device 301, FIG. 3B, such as in-ear earphones, over ear headphones, or the like that are separate from the electronic device). In some embodiments, the device includes one or more sensors for detecting placement of the one or more audio output devices (e.g., placement sensor(s) 304, FIG. 3B). In some embodiments, the device includes a display (e.g., touch screen 112, FIG. 1A, or display 340, FIG. 3A) and/or a touch-sensitive surface (e.g., touch screen 112, FIG. 1A, or touchpad 355, FIG. 3A). In some embodiments, the device includes one or more audio input devices (e.g., microphone 113, FIG. 1A, or microphone(s) 302, FIG. 3B). In some embodiments, the device includes a rotatable input mechanism (e.g., as part of other input controller(s) 160, FIG. 1A), which can be used to provide input to the device by rotating the input mechanism (e.g., the crown of a watch). In some embodiments, the device includes one or more accelerometers or attitude sensors (e.g., accelerometer(s) 167, gyroscope(s) 168, and/or magnetometer(s) 169, FIG. 1A) for detecting movement and/or changes in attitude of the device. In some embodiments where the audio output device(s) are separate from and in communication with the device, the audio output device(s) include one or more accelerometers or attitude sensors (e.g., as part of other input device(s) 306, FIG. 3B) for detecting movement and/or changes in attitude of the wearable audio output device(s). Some operations in method 700 are, optionally, combined and/or the order of some operations is, optionally, changed.

As described below, method 700 varies the audio output properties associated with different types of audio notifications (e.g., varying in spatial location, volume, content, etc.) associated with events having different characteristics (e.g., varying in sender/initiator, value, etc.). It is noted that spatial location, sometimes called simulated spatial location, is a perceptual property of audio outputs. Spatial location can be controlled or varied using well known audio synthesis techniques, so as to make audio outputs be perceived as coming from a particular spatial location in three-dimensional space that is different from the physical location of the speakers that produce the audio outputs. Generally, at least two speakers are required to vary the spatial location of an audio output. Varying audio output properties of audio notifications based on characteristic(s) of the associated events helps the user to distinguish different types of events and different event information. Providing improved feedback enhances the operability of the device and makes the user-device interface more efficient (e.g., by helping the user to achieve intended results and reducing user mistakes when operating/interacting with the device), which, additionally, reduces power usage and improves battery life of the device by enabling the user to use the device more quickly and efficiently.

The device detects (702) occurrence of an event (e.g., a request to play recent notifications, an incoming message, etc.).

In response to detecting the occurrence of the event, the device outputs (704), via the one or more audio output devices, an audio notification that includes audio content representing the event (e.g., the audio content including content of a received message, an indication of a transaction between users, etc.).

In accordance with a determination that the event is (706) associated with a first characteristic in a first group of characteristics (e.g., the event is sent or initiated by a first user of a plurality of users; the event is associated with a first value (e.g., a first transaction value) of a range of values; etc.) the audio notification includes the audio content representing the event and has a first audio output property (e.g., a first spatial location, a first magnitude, a first sound effect, etc.) that is selected based on the first characteristic. In accordance with a determination that the event is associated with a second characteristic in the first group of characteristics that is different from the first characteristic (e.g., a second user of the plurality of users; a second value of the range of values, etc.), the audio notification includes the audio content representing the event and has a second audio output property (e.g., a second spatial location, a second magnitude, a second sound effect, etc.), different from the first output property, that is selected based on the second characteristic. For example, as described herein with reference to FIG. 5C, audio notifications for messages from different senders may be associated with and output at different spatial locations to help the user distinguish between messages.

In some embodiments, the determination that the event is associated with the first characteristic in the first group of characteristics includes (708) a determination that the event is initiated by a first user of a plurality of users; and the determination that the event is associated with the second characteristic in the first group of characteristics includes a determination that the event is initiated by a second user of the plurality of users. In some embodiments, the first audio output property includes a first spatial location that is associated with the first user. In some embodiments, the first spatial location is independent of (e.g., selected without regard to) a physical location of the first user. For example, the first spatial location may be a location relative to the locations of a pair of earphones 502, as shown in FIG. 5C. In some embodiments, the second audio output property includes a second spatial location that is different from the first location and that is associated with the second user. In some embodiments, the second spatial location is independent of (e.g., selected without regard to) a physical location of the second user. In some embodiments, a spatial relationship between the first spatial location and the second spatial location is independent of a spatial relationship between the physical location of the first user and the physical location of the second user. For example, as described herein with reference to FIG. 5C, audio notifications for messages from different participants in a group message may be associated with and output at different spatial locations, relative to the locations of a pair of earphones 502, as shown in FIG. 5C, to help the user distinguish between messages.

Associating events initiated by different users (e.g., different senders of received messages) with different spatial locations (e.g., different simulated spatial locations), and outputting corresponding audio notifications for the events at the different spatial locations, helps the user (e.g., the recipient user) to identify the initiators of the audio notifications and to distinguish between them. Additionally, in some cases, using different spatial locations for different event initiators/senders reduces the amount of information that needs to be verbally, visually, or otherwise provided to the user to help the user identify the sender of a particular event or message (e.g., one or more names of a sender can be omitted). These benefits provide the user with improved feedback and reduce device processing (e.g., by reducing the amount of information that needs to be provided to the user), thereby enhancing the operability of the device and making the user-device interface more efficient (e.g., by helping the user to achieve intended results and reducing user mistakes when operating/interacting with the device), which, additionally, reduces power usage and improves battery life of the device by enabling the user to use the device more quickly and efficiently.

In some embodiments, the determination that the event is associated with the first characteristic in the first group of characteristics includes (710) a determination that the event is initiated by a first user of a plurality of users; and the determination that the event is associated with the second characteristic in the first group of characteristics includes a determination that the event is initiated by a second user of the plurality of users. In some embodiments, the first audio output property includes a first audio tone that is associated with the first user; and the second audio output property includes a second audio tone that is different from the first audio tone and that is associated with the second user. Differentiating audio notifications from different senders by varying the audio tones used to output the audio notifications is described herein with reference to FIG. 5C. Associating different audio tones with events initiated by different users (e.g., different senders of received messages), and incorporating these different audio tones into the corresponding audio notifications for the events, helps the user to identify the initiators of the audio notifications and to distinguish between them. Additionally, in some cases, using different audio tones for different event initiators/senders reduces the amount of information that needs to be verbally, visually, or otherwise provided to the user to help the user identify the sender of a particular event or message (e.g., one or more names of a sender can be omitted). These benefits provide the user with improved feedback and reduce device processing (e.g., by reducing the amount of information that needs to be provided to the user), thereby enhancing the operability of the device and making the user-device interface more efficient (e.g., by helping the user to achieve intended results and reducing user mistakes when operating/interacting with the device), which, additionally, reduces power usage and improves battery life of the device by enabling the user to use the device more quickly and efficiently.

In some embodiments, the determination that the event is associated with the first characteristic in the first group of characteristics includes (712) a determination that the event is initiated by a first user of a plurality of users; and the determination that the event is associated with the second characteristic in the first group of characteristics includes a determination that the event is initiated by a second user of the plurality of users. In some embodiments, outputting an audio notification that includes the audio content representing the event and has the first audio output property includes outputting an audio notification that includes the audio content representing the event using a first simulated voice that is associated with the first user (e.g., without regard to whether the detected event includes a voice communication from the first user). In some embodiments, outputting an audio notification that includes the audio content representing the event and has the second audio output property includes outputting an audio notification that includes the audio content representing the event using a second simulated voice that is different from the first simulated voice and that is associated with the second user (e.g., without regard to whether the detected event includes a voice communication from the second user). Differentiating audio notifications from different senders by varying the simulated voices used to output the audio notifications is described herein with reference to FIG. 5C.

Associating different simulated voices with events initiated by different users (e.g., different senders of received messages), and outputting corresponding audio notifications using the different simulated voices, helps the user to identify the initiators of the audio notifications and to distinguish between them. Additionally, in some cases, using different simulated voices for different event initiators/senders reduces the amount of information that needs to be verbally, visually, or otherwise provided to the user to help the user identify the sender of a particular event or message (e.g., one or more names of a sender can be omitted). These benefits provide the user with improved feedback and reduce device processing (e.g., by reducing the amount of information that needs to be provided to the user), thereby enhancing the operability of the device and making the user-device interface more efficient (e.g., by helping the user to achieve intended results and reducing user mistakes when operating/interacting with the device), which, additionally, reduces power usage and improves battery life of the device by enabling the user to use the device more quickly and efficiently.

In some embodiments, the determination that the event is associated with the first characteristic in the first group of characteristics includes (714) a determination that the event is associated with a first transaction value (e.g., of a transaction between a user of the device and one or more other users or devices); and the determination that the event is associated with the second characteristic in the first group of characteristics includes a determination that the event is associated with a second transaction value that is different from the first transaction value. In some embodiments, the first audio output property includes a first sound effect that represents the first transaction value; and the second audio output property includes a second sound effect that is different from the first sound effect and that represents the second transaction value. In some embodiments, the first sound effect includes a respective sound effect played at a first volume that represents the first transaction value, and the second sound effect includes the same respective sound effect played at a second volume that represents the second transaction value. For example, a larger transaction value is represented by a sound effect played at a higher volume, while a smaller transaction value is represented by the same sound effect played at a lower volume. In some embodiments, the second sound effect includes a different type of sound effect from the first sound effect. Differentiating audio notifications for transactions of different values by varying the sound effect and/or audio volume of the corresponding audio notifications is described herein with reference to FIG. 5E.

Associating different sound effects and/or different sound volumes with events associated with different transaction values, and outputting corresponding audio notifications using the different sound effects and/or different sound volumes, helps the user to identify the values (or relative values) of received transactions and to distinguish between them. Additionally, in some cases, conveying information about the value of a received transaction to a user by using an appropriate sound effect and/or volume reduces the amount of information that needs to be verbally, visually, or otherwise provided to the user to help the user identify the value of the transaction (e.g., a recitation of the value of a transaction can be omitted). These benefits provide the user with improved feedback and reduce device processing (e.g., by reducing the amount of information that needs to be provided to the user), thereby enhancing the operability of the device and making the user-device interface more efficient (e.g., by helping the user to achieve intended results and reducing user mistakes when operating/interacting with the device), which, additionally, reduces power usage and improves battery life of the device by enabling the user to use the device more quickly and efficiently.

In some embodiments, the determination that the event is associated with the first characteristic in the first group of characteristics includes (716) a determination that the event is a first type of notification (e.g., a first type of message, or a notification associated with a first application or group of applications); and the determination that the event is associated with the second characteristic in the first group of characteristics includes a determination that the event is a second type of notification that is different from the first type of notification (e.g., a second type of message, or a notification associated with a second application or group of applications). In some embodiments, the first audio output property includes first background audio that is associated with the first type of notification; and the second audio output property includes second background audio that is different from the first background audio and that is associated with the second type of notification. Associating different background noises with different types of notifications, and incorporating these different background noises into the corresponding audio notifications, helps the user to identify the types of notifications and to distinguish between them. Providing the user with improved feedback enhances the operability of the device and makes the user-device interface more efficient (e.g., by helping the user to achieve intended results and reducing user mistakes when operating/interacting with the device), which, additionally, reduces power usage and improves battery life of the device by enabling the user to use the device more quickly and efficiently.

In some embodiments, the determination that the event is associated with the first characteristic in the first group of characteristics includes (718) a determination that the event is associated with a first type of message (e.g., messages between three or more users, sometimes called "group messages"); and the determination that the event is associated with the second characteristic in the first group of characteristics includes a determination that the event is associated with a second type of message that is different from the first type of message (e.g., messages between two users, sometimes called "individual messages"). In some embodiments, the first audio output property includes a first spatial location (e.g., a first simulated spatial location) that is associated with the first type of message; and the second audio output property includes a second spatial location (e.g., a second simulated spatial location) that is different from the first location and that is associated with the second type of message. Differentiating message types (e.g., individual versus group messages) by outputting corresponding audio notifications at different spatial locations is described herein with reference to FIG. 5C. Associating different types of messages with different spatial locations (e.g., different simulated spatial locations), and outputting corresponding audio notifications at the different spatial locations, helps the user to identify message types and to distinguish between them. Providing the user with improved feedback enhances the operability of the device and makes the user-device interface more efficient (e.g., by helping the user to achieve intended results and reducing user mistakes when operating/interacting with the device), which, additionally, reduces power usage and improves battery life of the device by enabling the user to use the device more quickly and efficiently.

In some embodiments, the first type of message corresponds (720) to messages between a user of the electronic device and at least two other users (e.g., "group messages"); and the second type of message corresponds to messages between the user of the electronic device and at most one other user (e.g., "individual messages").

In some embodiments, the first spatial location is (722) a simulated spatial location outside of the user's head, and the second spatial location is a simulated spatial location inside the user's head. In some embodiments, outputting an audio notification at the simulated spatial location outside the user's head includes outputting the associated audio content of the audio notification so that it sounds like the audio content is coming from or being played outside of the user's head (or at a location that is at least a predefined distance away from the user's head or ears). In some embodiments, outputting an audio notification at the simulated spatial location inside the user's head includes outputting the associated audio content of the audio notification so that it sounds like the audio content is being played inside the user's head.

Differentiating individual messages from group messages by outputting corresponding audio notifications at simulated spatial locations "inside" the user's head and "outside" of the user's head, respectively, is described herein with reference to FIG. 5C. Presenting individual messages at a simulated location so as to sound as if being played "inside" the user's head while presenting group messages so as to sound as if being played "outside" the user's head helps the user to distinguish between the different types of messages and to focus more on messages directed specifically to the user, and reduces distraction from messages in a group messaging session that may not be directed specifically to the user. Providing the user with improved feedback enhances the operability of the device and makes the user-device interface more efficient (e.g., by helping the user to achieve intended results and reducing user mistakes when operating/interacting with the device), which, additionally, reduces power usage and improves battery life of the device by enabling the user to use the device more quickly and efficiently.

In some embodiments where the electronic device includes a display and a touch-sensitive surface, the device displays (724), on the display, a user interface. The user interface includes: a representation of the one or more audio output devices; a first user interface element that represents the first type of message and that is displayed at a first location in the user interface, where the first location in the user interface defines the first spatial location that is associated with the first type of message; and a second user interface element that represents the second type of message and that is displayed at a second location in the user interface, where the second location in the user interface defines the second spatial location that is associated with the second type of message. In some embodiments, the device receives, on the touch-sensitive surface, an input corresponding to the first user interface element (e.g., a drag input including a contact at a location on the touch-sensitive surface that corresponds to the first user interface element, and subsequent movement of the contact along the touch-sensitive surface). In some embodiments, in response to receiving the input, the device: moves the first user interface element to a third location in the user interface; and associates the first type of message with a third spatial location defined by the third location in the user interface (and, in some embodiments, dissociates the first type of message from the first spatial location defined by the first location in the user interface).

In some embodiments, after associating the first type of message with the third spatial location, outputting an audio notification that includes audio content representing an event associated with the first type of message includes outputting the audio content so that it sounds like it is coming from the third spatial location. In some embodiments, more generally, a user interface is provided that displays respective user interface elements for each event characteristic in a respective group of characteristics, where each user interface element of a plurality of user interface elements is associated with a respective audio output property. In some embodiments, a user may provide an input directed to a respective user interface element on the user interface to change the respective audio output property associated with a respective event characteristic. For example, a user can change the spatial location, sound volume, and/or type of sound effect associated with a particular event characteristic (e.g., initiating user, transaction value, message type, etc.). (Unless otherwise indicated, the "spatial locations" discussed herein are simulated spatial locations, corresponding to audio output properties of respective audio notifications.)

Providing a user interface with which the user can add or modify spatial locations associated with different types of messages provides additional control options and allows the user to customize the audio experience to one that is more familiar and recognizable, and reduces the amount of information that needs to otherwise be provided to the user to help the user understand information being presented in audio notifications. These benefits provide the user with improved feedback and reduce device processing (e.g., by reducing the amount of information that needs to be provided to the user), thereby enhancing the operability of the device and making the user-device interface more efficient (e.g., by helping the user to achieve intended results and reducing user mistakes when operating/interacting with the device), which, additionally, reduces power usage and improves battery life of the device by enabling the user to use the device more quickly and efficiently.

It should be understood that the particular order in which the operations in FIGS. 7A-7C have been described is merely an example and is not intended to indicate that the described order is the only order in which the operations could be performed. One of ordinary skill in the art would recognize various ways to reorder the operations described herein. Additionally, it should be noted that details of other processes described herein with respect to one or more other methods described herein (e.g., methods 600, 800, 900, and/or 1000) are also applicable in an analogous manner to method 700 described above with respect to FIGS. 7A-7C. For example, the devices, or components thereof, events, audio notifications, and inputs described above with reference to method 700 optionally have one or more of the characteristics of the devices, or components thereof, events, audio notifications, and inputs described herein with reference to one or more other methods described herein (e.g., methods 600, 800, 900, and/or 1000). For brevity, these details are not repeated here.

FIGS. 8A-8D are flow diagrams illustrating method 800 of performing operations based on timing of user inputs with respect to audio notifications in accordance with some embodiments. Method 800 is performed at an electronic device (e.g., portable multifunction device 100, FIG. 1A, or device 300, FIG. 3A) that is in communication (e.g., via a wired or wireless connection) with (or includes) one or more wearable audio output devices (e.g., wearable audio output device 301, FIG. 3B, such as in-ear earphones, over ear headphones, or the like that are separate from the electronic device), and one or more sensors for detecting placement of the one or more wearable audio output devices (e.g., placement sensor(s) 304, FIG. 3B). In some embodiments, the sensors are located on the wearable audio output device (e.g., as shown in FIG. 3B). In some embodiments, the sensors are located on the electronic device. In some embodiments, the device includes a display (e.g., touch screen 112, FIG. 1A, or display 340, FIG. 3A) and a touch-sensitive surface (e.g., touch screen 112, FIG. 1A, or touchpad 355, FIG. 3A). In some embodiments, the device is in communication with or includes one or more audio output devices (e.g., one or more speakers, such as speaker 111 on device 100, FIG. 1A, or speaker(s) 306 on wearable audio output device 301, FIG. 3B). In some embodiments, the device includes one or more audio input devices (e.g., microphone 113, FIG. 1A, or microphone(s) 302, FIG. 3B). In some embodiments, the device includes a rotatable input mechanism (e.g., as part of other input controller(s) 160, FIG. 1A), which can be used to provide input to the device by rotating the input mechanism (e.g., the crown of a watch). In some embodiments, the device includes one or more accelerometers or attitude sensors (e.g., accelerometer(s) 167, gyroscope(s) 168, and/or magnetometer(s) 169, FIG. 1A) for detecting movement and/or changes in attitude of the device. In some embodiments, the wearable audio output device(s) in communication with the device include one or more accelerometers or attitude sensors (e.g., as part of other input device(s) 306, FIG. 3B) for detecting movement and/or changes in attitude of the wearable audio output device(s). Some operations in method 800 are, optionally, combined and/or the order of some operations is, optionally, changed.

As described below, method 800 performs different operations in response to an input directed to one or more wearable audio output devices based on whether the input is detected within or after a predefined time period with respect to one or more audio notifications output in response to detecting an event. In addition, performing an operation associated with the audio notifications in response to detecting the input within the predefined time period with respect to the audio notifications enables the user to quickly respond to or otherwise interact with the audio notifications or the corresponding event. Performing different operations based on the timing of the input directed to the wearable audio output device(s) and enabling the user to quickly respond to notifications provides the user with additional control options without requiring additional audio or visual output to inform the user of the additional control options, which enhances the operability of the device and makes the user-device interface more efficient (e.g., by helping the user to achieve intended results and reducing user mistakes when operating/interacting with the wearable audio output device(s) and electronic device), which, additionally, reduces power usage and improves battery life of the device by enabling the user to use the device more quickly and efficiently.

The device detects (802) occurrence of a first event.

After detecting the occurrence of the first event, the device outputs (804), via the one or more wearable audio output devices, one or more audio notifications corresponding to the first event.

After beginning to output the one or more audio notifications, the device detects (806) an input directed to the one or more wearable audio output devices (e.g., a verbal input, a touch input, a device movement input such as an accelerometer movement).

In response to detecting the input directed to the one or more wearable audio output devices (808): in accordance with a determination that the input is detected within a predefined time period with respect to the one or more audio notifications corresponding to the first event, the device performs a first operation, where the first operation is associated with the one or more audio notifications corresponding to the first event; and, in accordance with a determination that the input is detected after the predefined time period with respect to the one or more audio notifications corresponding to the first event has elapsed, the device performs a second operation, where the second operation is not associated with the one or more audio notifications corresponding to the first event. For example, tap input 554 (FIG. 5F) detected outside of a predefined time period with respect to any audio notifications, causes an operation to be performed (e.g., playing music) that is different from the operation (e.g., hearing more information) caused by tap input 572 (FIG. 5L), which is detected within the predefined time period with respect to audio notification 570.

In some embodiments, the device detects (810) a second input directed to the one or more wearable audio output devices. In some embodiments, in response to detecting the second input directed to the one or more wearable audio output devices, in accordance with a determination that the second input is detected before beginning to output the one or more audio notifications corresponding to the first event, and in accordance with a determination that the predefined time period has elapsed with respect to one or more audio notifications corresponding to a second event (e.g., an event prior to the first event) and output before the one or more audio notifications corresponding to the first event, the device performs the second operation, where the second operation is not associated with the one or more audio notifications corresponding to the second event.

For example, additional tap inputs that, like tap input 554 (FIG. 5F), are detected outside of a predefined time period with respect to any audio notifications, will also cause the same operation to be performed (e.g., playing music) as tap input 554. Performing operations other than operations with respect to a particular audio notification in response to an input directed to the wearable audio output device(s) outside of a predefined time period with respect to the particular audio notification provides the user with additional control options outside of notification control (e.g., for interacting with other functions or applications of the electronic device) using the same input device, which enhances the operability of the device and makes the user-device interface more efficient (e.g., by enabling the user to achieve a greater number of intended results and reducing user mistakes when operating/interacting with the wearable audio output device(s) and electronic device), which, additionally, reduces power usage and improves battery life of the device by enabling the user to use the devices more quickly and efficiently.

In some embodiments, after detecting the occurrence of the first event, the device detects (812) occurrence of a third event. In some embodiments, after detecting the occurrence of the third event, and after outputting the one or more notifications corresponding to the first event, the device outputs, via the one or more wearable audio output devices, one or more audio notifications corresponding to the third event. In some embodiments, in response to detecting the input directed to the one or more wearable audio output devices, and in accordance with a determination that the input is detected after beginning to output the one or more audio notifications corresponding to the third event, and within the predefined time period with respect to the one or more audio notifications corresponding to the third event, the device performs the first operation, where the first operation is associated with the one or more audio notifications corresponding to the third event.

For example, both the movement of user 500's head (FIG. 5I) and tap input 572 (FIG. 5L), detected within the predefined time period of their respective audio notifications (e.g., audio notifications 566 and 570, respectively) cause the same operation (e.g., hearing more information) to be performed for each of their respective audio notifications. Performing operations associated with a particular audio notification in response to an input directed to the wearable audio output device(s) within a predefined time period with respect to the particular audio notification (e.g., including while outputting the particular notification) provides the user with additional control options for responding to or interacting with a specific audio notification using the same input device, even if the audio notification is one of a sequence of audio notifications being provided. Providing improved control options to the user enhances the operability of the device and makes the user-device interface more efficient (e.g., by enabling the user to achieve a greater number of intended results and reducing user mistakes when operating/interacting with the wearable audio output device(s) and electronic device), which, additionally, reduces power usage and improves battery life of the device by enabling the user to use the devices more quickly and efficiently.

In some embodiments, outputting the one or more audio notifications corresponding to a respective event includes (814) outputting a portion of audio content corresponding to the respective event; and performing the first operation associated with the one or more audio notifications corresponding to the respective event includes forgoing outputting remaining portions of the one or more audio notifications corresponding to the respective event. Skipping remaining portions of an audio notification is described herein with reference to FIGS. 5N-5P. Enabling the user to skip remaining portions of the one or more audio notifications after listening to a first portion reduces the likelihood of presenting the user with unnecessary or undesired information, and may also reduce the amount of time that the audio output device(s) and/or the electronic device need to be active, which enhances the operability of the devices and makes the user-device interface more efficient (e.g., by helping the user to achieve intended results and reducing user mistakes when operating/interacting with the devices), which, additionally, reduces power usage and improves battery life of the devices by enabling the user to use the devices more quickly and efficiently.

In some embodiments, outputting the one or more audio notifications corresponding to a respective event includes (816) outputting a first portion of audio content corresponding to the respective event; and performing the first operation associated with the one or more audio notifications corresponding to the respective event includes outputting a second (e.g., additional) portion, different from the first portion, of the audio content corresponding to the respective event. In some embodiments, the first portion of the audio content corresponds to an abbreviated form of the audio notification corresponding to the respective event, and the second portion of the audio content corresponds to an expanded form of the audio notification that includes audio content excluded from the abbreviated audio notification (such as the summarized, condensed, or truncated audio notifications described herein with reference to method 600). Playing an expanded form of an audio notification initially presented in condensed form in response to a user input directed to the wearable audio device during or "soon" (e.g., within a predefined amount of time with respect to the audio notification) after the condensed audio notification is played is described herein with reference to FIGS. 5I-5J and 5L-5M.

Enabling the user to listen to an expanded form of the audio notifications in response to the user input directed to the wearable audio output device(s) enables the user to quickly obtain additional information about the detected event, without requiring the user to view the information on a display of the electronic device. Reducing the number of inputs needed to hear more information and reducing the amount of time that the display needs to be powered on enhances the operability of the devices and makes the user-device interface more efficient (e.g., by helping the user to achieve intended results more quickly and reducing user mistakes when operating/interacting with the devices), which, additionally, reduces power usage and improves battery life of the devices by enabling the user to use the devices more quickly and efficiently.

In some embodiments, performing the second operation that is not associated with the one or more audio notifications corresponding to a respective event includes (818)

invoking a virtual assistant or controlling media content playback (e.g., playing, pausing, resuming, stopping, rewinding, or fast-forwarding playback of media content distinct from one or more audio notifications corresponding to a respective event), as described herein with reference to FIGS. 5F and 5Q-5R. Performing operations other than operations associated with particular audio notifications in response to an input detected outside of a predefined time period with respect to the particular audio notifications provides the user with additional control options outside of notification control (e.g., for interacting with other functions or applications of the electronic device) using the same input device, which enhances the operability of the device and makes the user-device interface more efficient (e.g., by enabling the user to achieve a greater number of intended results and reducing user mistakes when operating/interacting with the wearable audio output device(s) and electronic device), which, additionally, reduces power usage and improves battery life of the device by enabling the user to use the devices more quickly and efficiently.

In some embodiments, the first operation associated with the one or more audio notifications corresponding to a respective event is (820) based on an application associated with the respective event (e.g., specified in the application settings of the application). Basing the operation performed for audio notifications on an application associated with the event corresponding to the audio notifications enables the user to provide a relevant response to the event, without requiring the user to view the event on a display of the electronic device. This provides the user with additional control options and reduces the amount of time that the display needs to be powered on, which enhances the operability of the device and makes the user-device interface more efficient (e.g., by helping the user to achieve a greater number of intended results and reducing user mistakes when operating/interacting with the device), which, additionally, reduces power usage and improves battery life of the device by enabling the user to use the device more quickly and efficiently.

In some embodiments, detecting a respective event includes (822) receiving media content other than textual content, and performing the first operation associated with the one or more audio notifications corresponding to the respective event includes providing a verbal description of the media content other than textual content. For example, in response to receiving an image, the device provides one or more audio notifications that include a verbal description of the image, as described herein with reference to FIG. 5M. Providing a verbal description of content that is not textual content (such as of image content) provides the user with information about additional types of content without requiring the user to view the content, such as on a display of the electronic device, which is beneficial to visually-impaired users. Providing improved audio feedback to the user and reducing the amount of time that the display needs to be powered on enhances the operability of the device and makes the user-device interface more efficient (e.g., by helping the user to achieve intended results and reducing user mistakes when operating/interacting with the device), which, additionally, reduces power usage and improves battery life of the device by enabling the user to use the device more quickly and efficiently.

In some embodiments, in accordance with a determination that the input is detected while outputting a first audio notification of the one or more audio notifications, the first operation is (824) performed with respect to the first audio notification. In some embodiments, the input is detected after outputting a first portion of the one or more audio notifications, and, in response, the device forgoes outputting (e.g., skips) the remainder of the one or more audio notifications (e.g., as described herein with reference to operation 814). In some embodiments, in accordance with a determination that the input is detected while outputting a second audio notification of the one or more audio notifications that is different from the first audio notification, the first operation is performed with respect to the second audio notification.

For example, the movement of user 500's head (FIG. 5I), if detected while corresponding audio notification 566 is being output, triggers (e.g., results in) performance of an operation with respect to audio notification 566, whereas tap input 572 (FIG. 5L), if detected while corresponding audio notification 570 is being output, triggers (e.g., results in) performance of the operation with respect to audio notification 570. Performing an operation with respect to a particular audio notification in response to an input directed to the wearable audio output device(s) during that particular audio notification enables the user to provide a response or otherwise interact with a specific audio notification, even if the audio notification is one of a sequence of audio notifications being output. Providing improved control options to the user enhances the operability of the device and makes the user-device interface more efficient (e.g., by helping the user to achieve intended results and reducing user mistakes when operating/interacting with the wearable audio output device(s) and electronic device), which, additionally, reduces power usage and improves battery life of the device by enabling the user to use the devices more quickly and efficiently.

In some embodiments, in accordance with a determination that the input is a first type of input (e.g., a single tap), the first operation is (826) a first type of operation (e.g., a reply operation or a "play more" operation); and, in accordance with a determination that the input is a second type of input (e.g., a double tap) that is different from the first type of input (e.g., a single tap), the first operation is a second type of operation (e.g., a "skip" operation) that is different from the first type of operation. Performing different types of operations in response to different types of inputs received during or within a predefined period of time with respect to an audio notification is described herein with reference to FIGS. 5L-5M and 5N-5P. Performing different types of operations associated with a particular audio notification based on the type of input directed to the wearable audio output device(s) within a predefined time period with respect to the particular notification (e.g., including while outputting the particular notification) provides the user with additional control options for responding to or interacting with the particular notification using the same input device, which enhances the operability of the device and makes the user-device interface more efficient (e.g., by enabling the user to achieve a greater number of intended results and reducing user mistakes when operating/interacting with the wearable audio output device(s) and electronic device), which, additionally, reduces power usage and improves battery life of the device by enabling the user to use the devices more quickly and efficiently.

In some embodiments, in accordance with a determination that the input is (828) a first type of input (e.g., a single tap), the second operation is a third type of operation (e.g., a "play/pause" operation); and, in accordance with a determination that the input is a second type of input (e.g., a double tap) that is different from the first type of input (e.g., a single tap), the second operation is a fourth type of operation (e.g., an "invoke virtual assistant" operation) that is different from the third type of operation. Performing different types of operations in response to different types of inputs received outside of a predefined period of time with respect to any audio notification is described herein with reference to FIGS. 5F and 5Q-5R. Performing different types of operations other than operations associated with particular audio notifications based on the type of input directed to the wearable audio output device(s) outside of a predefined time period with respect to the particular audio notifications provides the user with additional control options outside of notification control (e.g., for interacting with other functions or applications of the electronic device) using the same input device, which enhances the operability of the device and makes the user-device interface more efficient (e.g., by enabling the user to achieve a greater number of intended results and reducing user mistakes when operating/interacting with the wearable audio output device(s) and electronic device), which, additionally, reduces power usage and improves battery life of the device by enabling the user to use the devices more quickly and efficiently.

In some embodiments, detecting the input directed to the one or more wearable audio output devices includes (830) detecting a tap input (e.g., a first tap input) on the one or more wearable audio output devices. In some embodiments, detecting the input includes detecting a double-tap input (e.g., a second tap input within a predefined time period with respect to the first tap input). Performing operations in response to one or more tap inputs directed to the wearable audio output device(s) provides the user with control options that use an intuitive user interaction, which enhances the operability of the device and makes the user-device interface more efficient (e.g., by helping the user to achieve intended results and reducing user mistakes when operating/interacting with the wearable audio output device(s) and electronic device), which, additionally, reduces power usage and improves battery life of the device by enabling the user to use the devices more quickly and efficiently.

In some embodiments where the one or more wearable audio output devices include one or more accelerometers, detecting the input directed to the one or more wearable audio output devices includes (832) detecting, via the one or more accelerometers, movement of the one or more wearable audio output devices. Performing operations in response to accelerometer inputs is described herein with reference to FIGS. 5I-5K. Performing operations in response to accelerometer inputs provided via movement of the wearable audio output device(s) provides the user with control options that use an intuitive user interaction (e.g., movement of the user's head while wearing the wearable audio output device(s)), which enhances the operability of the device and makes the user-device interface more efficient (e.g., by helping the user to achieve intended results and reducing user mistakes when operating/interacting with the wearable audio output device(s) and electronic device), which, additionally, reduces power usage and improves battery life of the device by enabling the user to use the devices more quickly and efficiently.

In some embodiments, outputting the one or more audio notifications corresponding to a respective event includes (834) outputting a first portion of audio content corresponding to the respective event. In some embodiments, in accordance with detecting, via the one or more accelerometers, movement of the one or more wearable audio output devices in a first direction (e.g., backward movement or tilting, or away from a simulated spatial location at which the one or more audio notifications are output), performing the first operation includes forgoing outputting a second portion of audio content corresponding to the respective event. In some embodiments, in accordance with detecting, via the one or more accelerometers, movement of the one or more wearable audio output devices in a second direction (e.g., forward movement or tilting, or toward the simulated spatial location at which the one or more audio notifications are output) opposite the first direction, performing the first operation includes outputting the second portion of audio content corresponding to the respective event. In some embodiments, the second portion of audio content includes additional audio content relative to audio content that would have been output if the input directed to the one or more wearable audio devices had not occurred. Providing different amounts of audio content in response to user head movements toward or away from simulated spatial locations of sounds is described herein with reference to FIGS. 5I-5K.

Varying the amount of audio content provided based on direction of movement of the wearable audio output device(s) provides the user with control options for hearing additional information using an intuitive user interaction (e.g., providing additional audio content when the user leans in a specific direction such as toward a simulated location/source of the audio notification, and less audio content when the user leans in a different direction such as away from the simulated location/source), which enhances the operability of the device and makes the user-device interface more efficient (e.g., by helping the user to achieve intended results and reducing user mistakes when operating/interacting with the wearable audio output device(s) and electronic device), which, additionally, reduces power usage and improves battery life of the device by enabling the user to use the devices more quickly and efficiently.

In some embodiments, after detecting the occurrence of a respective event, the device forgoes (836) outputting one or more notifications (e.g., audio, visual, and/or tactile) corresponding to the respective event other than the one or more audio notifications output via the one or more wearable audio output devices. In some embodiments, the device includes or is in communication with one or more audio output devices other than the one or more wearable audio output devices, and the device forgoes outputting audio notifications corresponding to the first event via the one or more other audio output devices. In some embodiments, the device includes one or more tactile output generators, and the device forgoes outputting tactile output notifications corresponding to the first event via the one or more tactile output generators. In some embodiments, the device includes a display, and the device forgoes outputting visual notifications corresponding to the first event. Suppressing redundant audio notifications is described herein with reference to FIG. 5AD.

Suppressing other types of notifications for events for which audio notifications are being or will be provided avoids redundant feedback that may be distracting or confusing to the user, which enhances the operability of the device and makes the user-device interface more efficient (e.g., by helping the user to achieve intended results and reducing user mistakes when operating/interacting with the wearable audio output device(s) and electronic device), which, additionally, reduces power usage and improves battery life of the device by enabling the user to use the devices more quickly and efficiently.

It should be understood that the particular order in which the operations in FIGS. 8A-8D have been described is merely an example and is not intended to indicate that the described order is the only order in which the operations could be performed. One of ordinary skill in the art would recognize various ways to reorder the operations described herein. Additionally, it should be noted that details of other processes described herein with respect to one or more other methods described herein (e.g., methods 600, 700, 900, and/or 1000) are also applicable in an analogous manner to method 800 described above with respect to FIGS. 8A-8D. For example, the devices, or components thereof, events, audio notifications, and inputs described above with reference to method 800 optionally have one or more of the characteristics of the devices, or components thereof, events, audio notifications, and inputs described herein with reference to one or more other methods described herein (e.g., methods 600, 700, 900, and/or 1000). For brevity, these details are not repeated here.

FIGS. 9A-9C are flow diagrams illustrating method 900 of prompting a user and receiving responses to audio notifications in accordance with some embodiments. Method 900 is performed at an electronic device (e.g., portable multifunction device 100, FIG. 1A, or device 300, FIG. 3A) that is in communication (e.g., via a wired or wireless connection) with (or includes) one or more wearable audio output devices (e.g., wearable audio output device 301, FIG. 3B, such as in-ear earphones, over ear headphones, or the like that are separate from the electronic device), and one or more sensors for detecting placement of the one or more wearable audio output devices (e.g., placement sensor(s) 304, FIG. 3B). In some embodiments, the sensors are located on the wearable audio output device (e.g., as shown in FIG. 3B). In some embodiments, the sensors are located on the electronic device. In some embodiments, the device includes a display (e.g., touch screen 112, FIG. 1A, or display 340, FIG. 3A) and a touch-sensitive surface (e.g., touch screen 112, FIG. 1A, or touchpad 355, FIG. 3A). In some embodiments, the device is in communication with or includes one or more audio output devices (e.g., one or more speakers, such as speaker 111 on device 100, FIG. 1A, or speaker(s) 306 on wearable audio output device 301, FIG. 3B). In some embodiments, the device includes one or more audio input devices (e.g., microphone 113, FIG. 1A, or microphone(s) 302, FIG. 3B). In some embodiments, the device includes a rotatable input mechanism (e.g., as part of other input controller(s) 160, FIG. 1A), which can be used to provide input to the device by rotating the input mechanism (e.g., the crown of a watch). In some embodiments, the device includes one or more accelerometers or attitude sensors (e.g., accelerometer(s) 167, gyroscope(s) 168, and/or magnetometer(s) 169, FIG. 1A) for detecting movement and/or changes in attitude of the device. In some embodiments, the wearable audio output device(s) in communication with the device include one or more accelerometers or attitude sensors (e.g., as part of other input device(s) 306, FIG. 3B) for detecting movement and/or changes in attitude of the wearable audio output device(s). Some operations in method 900 are, optionally, combined and/or the order of some operations is, optionally, changed.

As described below, method 900 outputs, via one or more wearable audio output devices (e.g., worn by a user), one or more audio notifications corresponding to an event detected at an associated electronic device and, subsequently, an audio indication that the electronic device is prepared to receive a response to the detected event. Outputting the audio notifications and the audio indication via the wearable audio output device(s) prompts the user to respond and also indicates that the response can be provided via the wearable audio output device(s), which provides an alternate input mechanism that reduces the need for the user to interact with the electronic device, particularly by reducing the need for the user to view and respond to the detected event using a display of the device. This reduces the number of inputs that need to be processed and reduces the amount of time that the display needs to be powered on, thereby enhancing the operability of the devices and making the user-device interface more efficient (e.g., by helping the user to achieve intended results and reducing user mistakes when operating/interacting with the devices), which, additionally, reduces power usage and improves battery life of the devices by enabling the user to use the devices more quickly and efficiently.

The device detects (902) occurrence of a first event.

After detecting the occurrence of the first event, the device outputs (904), via the one or more wearable audio output devices, one or more audio notifications corresponding to the first event.

After outputting the one or more audio notifications corresponding to the first event, the device outputs (906) a respective audio output separate from the one or more audio notifications indicating that the electronic device is prepared to receive a response to the first event.

While outputting the respective audio output, the device detects (908) an input corresponding to a response to the first event, and generates a response to the first event based on the input.

In some embodiments, after outputting (or beginning to output) the one or more audio notifications corresponding to the first event, the device detects (910), via the electronic device or the one or more wearable audio output devices, a second input corresponding to a request to respond to the first event (e.g., a tap input directed to the electronic device or to the one or more wearable audio output devices). The respective audio output indicating that the electronic device is prepared to receive a response to the first event is output in response to detecting the second input. In some embodiments, the respective audio output is output in accordance with a determination that the second input is detected while outputting the one or more audio notifications corresponding to the first event, or within a predefined time period with respect to the one or more audio notifications (e.g., with respect to beginning to output the one or more audio notifications, or with respect to the end of the outputting of the one or more audio notifications).

Requiring the user to provide an input corresponding to a request to respond to the first event provides confirmation that the user intends to provide a response to the first event and, where the confirmation has not been received, avoids unnecessarily processing inadvertent inputs and accordingly avoids unintended operations being performed on the electronic device. Providing improved input processing and control options enhances the operability of the device and makes the user-device interface more efficient (e.g., by helping the user to achieve intended results and reducing user mistakes when operating/interacting with the device), which, additionally, reduces power usage and improves battery life of the device by enabling the user to use the device more quickly and efficiently.

In some embodiments, the respective audio output includes (912) white noise (e.g., as described herein with reference to sound effects 582 and 5104, FIGS. 5S-5AB). In some embodiments, the respective audio output consists of white noise. Providing white noise to indicate that the device is prepared to receive a response to the event for which the audio notification is output prompts the user to respond using an intuitive sound, which enhances the operability of the device and makes the user-device interface more efficient (e.g., by helping the user to provide a requested input and reducing user mistakes when operating/interacting with the device), which, additionally, reduces power usage and improves battery life of the device by enabling the user to use the device more quickly and efficiently.

In some embodiments where the electronic device is in communication with one or more audio input devices (e.g., one or more microphones that are part of the electronic device or part of the one or more wearable audio output devices), detecting the input corresponding to a response to the first event includes (914) detecting audio input via the one or more audio input devices (e.g., as described herein with reference to response 596, FIG. 5AA). Receiving the response to the detected event via one or more audio input devices provides the user with an alternate input mechanism that accepts verbal inputs (e.g., speech), which can be a more intuitive and natural way to provide inputs, as well as reduces the need for the user to view and respond the detected event using another input device such as a touch-sensitive surface or display of the electronic device, which reduces the amount of time that those devices need to be active or powered on and assists vision-impaired users, thereby enhancing the operability of the device and making the user-device interface more efficient (e.g., by helping the user to provide proper inputs and achieve intended results and reducing user mistakes when operating/interacting with the device), which, additionally, reduces power usage and improves battery life of the device by enabling the user to use the device more quickly and efficiently.

In some embodiments where the electronic device includes a touch-sensitive surface, while outputting the respective audio output, and prior to detecting the input corresponding to a response to the first event (916), the device: detects, via the touch-sensitive surface, a first touch input; and, in response to detecting, via the touch-sensitive surface, the first touch input, outputs, via the one or more wearable audio output devices, one or more response options to the first event. In some embodiments, the input is a drag input, and different response options are output as the input moves across the touch-sensitive surface. In some embodiments, detecting the input corresponding to a response to the first event includes detecting, via the touch-sensitive surface, a second touch input (e.g., a tap input) selecting a respective response option of the one or more response options. In some embodiments, the second input selects a respective response option if the second input is detected while outputting or within a predefined time after outputting the respective response option (and, in some embodiments, prior to beginning to output a subsequent response option). In some embodiments, the second input is liftoff of the first touch input in combination with the expiration of a predefined period of time following liftoff of the first touch input without a subsequent touch input being detected during the predefined period of time. In some embodiments, the generated response to the first event corresponds to the selected respective response option. Outputting response options in response to a touch input is described herein with reference to FIGS. 5T-5V.

Outputting response options for responding to a detected event via the wearable audio output device(s) in response to an input on a touch-sensitive surface of the electronic device allows the user to listen to response options before responding, and in some cases without having to view the response options on a display of the electronic device, which reduces the amount of time that the display needs to be powered on and assists vision-impaired users, thereby enhancing the operability of the device and making the user-device interface more efficient (e.g., by helping the user to achieve intended results and reducing user mistakes when operating/interacting with the device), which, additionally, reduces power usage and improves battery life of the device by enabling the user to use the device more quickly and efficiently.

In some embodiments where the electronic device includes a rotatable input mechanism, while outputting the respective audio output, and prior to detecting the input corresponding to a response to the first event (918), the device: detects, via the rotatable input mechanism, a first input (e.g., rotation of the rotatable input mechanism); and, in response to detecting, via the rotatable input mechanism, the first input, outputs, via the one or more wearable audio output devices, one or more response options to the first event. In some embodiments, detecting the input corresponding to a response to the first event includes detecting, via the rotatable input mechanism (or via another input device or sensor of the electronic device, such as a touch-sensitive surface or accelerometer), a second input (e.g., a tap input) selecting a respective response option of the one or more response options. In some embodiments, the second input selects a respective response option if the second input is detected while outputting or within a predefined time after outputting the respective response option (and, in some embodiments, prior to beginning to output a subsequent response option). In some embodiments, the generated response to the first event corresponds to the selected respective response option. Outputting response options in response to rotation of a rotatable input mechanism is described herein with reference to FIGS. 5W-5Y.

Outputting response options for responding to a detected event via the wearable audio output device(s) in response to an input via a rotatable input mechanism allows the user to listen to response options before responding, and in some cases without having to view the response options on a display of the electronic device, which reduces the amount of time that the display needs to be powered on and assists vision-impaired users, thereby enhancing the operability of the device and making the user-device interface more efficient (e.g., by helping the user to achieve intended results and reducing user mistakes when operating/interacting with the device), which, additionally, reduces power usage and improves battery life of the device by enabling the user to use the device more quickly and efficiently.

In some embodiments where the electronic device includes a display and one or more attitude sensors (e.g., one or more cameras, gyroscopes, inertial measurement units, or other sensors to detect changes in an orientation of the electronic device), prior to detecting the input corresponding to a response to the first event, the device detects (920), via the one or more attitude sensors, a change in attitude (e.g., orientation) of the electronic device (e.g., corresponding to upward tilting of the electronic device so as to raise a top edge of the electronic device relative to a bottom edge of the electronic device). In some embodiments, in response to detecting the change in attitude of the electronic device, in accordance with a determination that the change in attitude of the electronic device is detected within a predefined time period with respect to the one or more audio notifications corresponding to the first event (e.g., while outputting or within a predefined time after outputting the one or more audio notifications), the device displays, on the display, one or more response options to the first event (e.g., as described herein with reference to FIGS. 5Z-5AA). In some embodiments, detecting the input corresponding to a response to the first event includes detecting an input selecting a respective response option of the one or more response options.

Displaying response options for responding to a detected event on a display of the electronic device in response to the electronic device being lifted allows the user to quickly view the response options before responding with a minimal number of inputs to the electronic device and without having to wait for the options to be read aloud sequentially via the wearable audio output device(s). This reduces the number of inputs that need to be processed and reduces the amount of time that the wearable audio output device(s) need to be active, thereby enhancing the operability of the device and making the user-device interface more efficient (e.g., by helping the user to achieve intended results more quickly and reducing user mistakes when operating/interacting with the device), which, additionally, reduces power usage and improves battery life of the device by enabling the user to use the device more quickly and efficiently.

In some embodiments, after outputting the one or more audio notifications corresponding to the first event, and before outputting the respective audio output indicating that the electronic device is prepared to receive a response to the first event, the device outputs (922), via the one or more wearable audio output devices, a plurality of response options prompting a user of the electronic device to provide a response to the first event (e.g., as described herein with reference to audio notification 5100, FIG. 5AB). Outputting response options for responding to a detected event via the wearable audio output device(s) automatically after outputting the corresponding audio notification(s) reduces the number of inputs that need to be processed. Outputting the respective audio output indicating that the device is prepared to receive a response after outputting the response options allows the user to listen to the response options before being prompted to respond, which reduces the need for the user to view response options on a display of the device, thereby reducing the amount of time that the display needs to be powered on and assisting vision-impaired users. These benefits enhance the operability of the device and make the user-device interface more efficient (e.g., by helping the user to achieve intended results and reducing user mistakes when operating/interacting with the device), which, additionally, reduces power usage and improves battery life of the device by enabling the user to use the device more quickly and efficiently.

In some embodiments, the first event is a calendar event invitation, and the plurality of response options include an option to accept the calendar event invitation and an option to decline the calendar event invitation (e.g., as described herein with reference to audio notification 5100, FIG. 5AB). In some embodiments, the plurality of response options further includes an option to defer the invitation (e.g., to defer responding to the invitation until a later time) and/or an option to tentatively accept the invitation. In some embodiments, the detected input corresponding to a response to the first event includes selection (e.g., vocal recitation) of a respective option in the plurality of response options.

In some embodiments where the electronic device is in communication with one or more audio input devices, the device detects (926) a volume of ambient noise relative to the one or more audio input devices; and adjusts an output volume of the one or more audio notifications based on the volume of ambient noise (e.g., as described herein with reference to FIG. 5AB). Adjusting the output volume of audio notifications (and/or audio output indicating that the device is prepared to receive a response to corresponding events) based on a volume of ambient noise helps the user hear audio outputs by increasing the output volume in noisy environments while reducing damage to a user's ears by reducing output volume in quieter environments where higher volumes are not necessary for the user to hear the audio output over the ambient noise, thereby providing improved audio feedback to the user. In addition, reducing output volume where higher volumes are unnecessary reduces power usage of the audio output devices. These benefits enhance the operability of the device and make the user-device interface more efficient (e.g., by helping the user to achieve intended results and reducing user mistakes when operating/interacting with the device), which, additionally, reduces power usage and improves battery life of the device by enabling the user to use the device more quickly and efficiently.

It should be understood that the particular order in which the operations in FIGS. 9A-9C have been described is merely an example and is not intended to indicate that the described order is the only order in which the operations could be performed. One of ordinary skill in the art would recognize various ways to reorder the operations described herein. Additionally, it should be noted that details of other processes described herein with respect to one or more other methods described herein (e.g., methods 600, 700, 800, and/or 1000) are also applicable in an analogous manner to method 900 described above with respect to FIGS. 9A-9C. For example, the devices, or components thereof, events, audio notifications, and inputs described above with reference to method 900 optionally have one or more of the characteristics of the devices, or components thereof, events, audio notifications, and inputs described herein with reference to one or more other methods described herein (e.g., methods 600, 700, 800, and/or 1000). For brevity, these details are not repeated here.

FIGS. 10A-10B are flow diagrams illustrating method 1000 of conditionally outputting audio notifications based on user activity and context in accordance with some embodiments. Method 1000 is performed at an electronic device (e.g., portable multifunction device 100, FIG. 1A, or device 300, FIG. 3A) that is in communication (e.g., via a wired or wireless connection) with (or includes) one or more wearable audio output devices (e.g., wearable audio output device 301, FIG. 3B, such as in-ear earphones, over ear headphones, or the like that are separate from the electronic device), and one or more sensors for detecting placement of the one or more wearable audio output devices (e.g., placement sensor(s) 304, FIG. 3B). In some embodiments, the sensors are located on the wearable audio output device (e.g., as shown in FIG. 3B). In some embodiments, the sensors are located on the electronic device. In some embodiments, the device includes a display (e.g., touch screen 112, FIG. 1A, or display 340, FIG. 3A) and a touch-sensitive surface (e.g., touch screen 112, FIG. 1A, or touchpad 355, FIG. 3A). In some embodiments, the device is in communication with or includes one or more audio output devices (e.g., one or more speakers, such as speaker 111 on device 100, FIG. 1A, or speaker(s) 306 on wearable audio output device 301, FIG. 3B). In some embodiments, the device includes one or more audio input devices (e.g., microphone 113, FIG. 1A, or microphone(s) 302, FIG. 3B). In some embodiments, the device includes a rotatable input mechanism (e.g., as part of other input controller(s) 160, FIG. 1A), which can be used to provide input to the device by rotating the input mechanism (e.g., the crown of a watch). In some embodiments, the device includes one or more accelerometers or attitude sensors (e.g., accelerometer(s)

167, gyroscope(s) 168, and/or magnetometer(s) 169, FIG. 1A) for detecting movement and/or changes in attitude of the device. In some embodiments, the wearable audio output device(s) in communication with the device include one or more accelerometers or attitude sensors (e.g., as part of other input device(s) 306, FIG. 3B) for detecting movement and/or changes in attitude of the wearable audio output device(s). Some operations in method 1000 are, optionally, combined and/or the order of some operations is, optionally, changed.

As described below, method 1000 delays output of audio notifications from an electronic device if the user is currently engaged in a conversation (e.g., as detected via microphones on the electronic device or on wearable output device(s) in communication with the electronic device). This reduces the intrusiveness of audio notifications and also increases the likelihood that the user will hear and understand the content of the audio notifications, which reduces the need for the user to review the notifications one or more additional times whether aurally or visually on a display of the device, thus reducing the number of inputs that need to be processed and the amount of time that the display needs to be powered on, and thereby enhancing the operability of the device, reducing power usage, and improving battery life by enabling the user to use the device more quickly and efficiently.

The device detects (1002) occurrence of a first event while the one or more wearable audio output devices are being worn by a user.

In response to detecting the occurrence of the first event, the device outputs (1004), via the one or more wearable audio output devices, one or more audio notifications corresponding to the first event, including: in accordance with a determination that the user of the electronic device is currently engaged in a conversation (e.g., based on detected speech by the user or by another user), delaying outputting the one or more audio notifications corresponding to the first event until the conversation has ended; and, in accordance with a determination that the user of the electronic device is not currently engaged in a conversation, outputting the one or more audio notifications corresponding to the first event without delaying the outputting. Delaying outputting of audio notifications based on whether the user is engaged in a conversation is described herein with reference to FIG. 5AC.

In some embodiments where the electronic device is in communication with one or more audio input devices, determining that the user of the electronic device is currently engaged in a conversation includes (1006) detecting speech via the one or more audio input devices (e.g., as described herein with reference to FIG. 5AC). In some embodiments, the one or more audio input devices include one or more microphones. In some embodiments, one or more audio input devices are part of the electronic device. In some embodiments, one or more audio input devices are part of the one or more wearable audio output devices. Detecting speech automatically via one or more audio input devices such as a microphone allows the device to quickly and easily determine whether the user is engaged in a conversation without needing to use alternative methods that may require the device to prompt the user to provide one or more inputs. Automatically performing speech detection reduces the number of inputs required, which enhances the operability of the devices, reduces power usage, and improves battery life of the devices.

In some embodiments, outputting the one or more audio notifications includes (1008) outputting audio content corresponding to the first event using simulated speech (e.g., as described herein with reference to audio notification 5106, FIG. 5AC). Outputting audio notifications using simulated speech to output audio content corresponding to a detected event provides the user with substantive information about the detected event (e.g., a sender or initiator of the event, content of a received message, time and location information for a calendar or other event invitation, etc.) without requiring the user to provide additional inputs to hear the substantive information or requiring the user to review the event information visually on a display of the device. This reduces the number of inputs that need to be processed and reduces the amount of time that the display needs to be powered on, thereby enhancing the operability of the devices, reducing power usage, and improving battery life of the devices.

In some embodiments, outputting the one or more audio notifications includes (1010) outputting one or more audio tones (e.g., as described herein with reference to audio notification 5106, FIG. 5AC). Outputting audio notifications using one or more audio tones (e.g., without outputting audio content using simulated speech) notifies the user that an event has been detected while reducing the intrusiveness of the notifications and the length of audio content that is output, which reduces the amount of time that the wearable audio output device(s) need to be active or powered on, thereby enhancing the operability of the devices, reducing power usage, and improving battery life of the devices.

In some embodiments, the electronic device includes or is in communication with one or more second audio output devices distinct from the one or more wearable audio output devices (e.g., one or more speakers that are part of the electronic device). In some embodiments, in conjunction with outputting verbalized information corresponding to a second event via the one or more second audio output devices, the device forgoes (1012) outputting audio notifications corresponding to the second event via the one or more wearable audio output devices. In some embodiments, in conjunction with outputting the one or more audio notifications corresponding to the first event via the one or more wearable audio output devices, the device forgoes outputting verbalized information (e.g., audio notifications) corresponding to the first event via the one or more second audio output devices. That is, in some embodiments, the device outputs verbalized information (e.g., audio notifications) via the one or more wearable audio output devices or via the one or more second audio output devices, but not both.

For example, for turn-by-turn navigation, while outputting verbal directions via one or more speakers on or in communication with the electronic device, the device forgoes outputting verbal directions via the one or more wearable audio output devices. In another example, while outputting verbal directions via the one or more wearable audio output devices, the device forgoes outputting verbal directions via one or more speakers on or in communication with the device. These examples are further described herein with reference to FIG. 5AD.

Forgoing outputting audio notifications via some audio output devices while outputting the same audio notifications via other audio output devices avoids redundant audio outputs, thereby reducing power usage by the various audio output devices as a whole, and also reduces user confusion, thereby enhancing the operability of the device and reducing user mistakes, which in turn reduces overall power usage and improves battery life of the devices.

In some embodiments, outputting the one or more audio notifications corresponding to the first event is (1014) performed in accordance with a determination that metadata of the first event associates the first event with audio notifications. In some embodiments, the metadata specifies that notifications corresponding to the first event should be presented to the user verbally. In some embodiments, in accordance with a determination that the metadata of the first event does not associate the first event with audio notifications, the device forgoes outputting the one or more audio notifications corresponding to the first event. In some embodiments, metadata of the first event specifies one or more properties of the first event (e.g., an application, application type, event type, and/or contact of the first event), and metadata or settings stored on the electronic device associates a respective property of the first event with audio notifications.

In some embodiments, the metadata associates an application associated with the first event with audio notifications (e.g., the metadata specifies that notifications corresponding to the particular application should be presented to the user verbally). In some embodiments, the first event is associated with an application that is a particular type of application, and the metadata associates the application type of the application with audio notifications (e.g., the metadata specifies that notifications corresponding to the particular type of application should be presented to the user verbally). For example, the first event is associated with a messaging-type application, and the metadata specifies that notifications corresponding to messaging applications should be presented to the user verbally (e.g., via the one or more wearable audio output devices). Other application types include calendar applications, fitness applications, gaming applications, etc.

In some embodiments, the first event is a first type of event, and the metadata associates the event type of the event with audio notifications. For example, the first event is a calendar event, and the metadata specifies that notifications corresponding to calendar events should be presented to the user verbally. In some embodiments, the first event corresponds to a notification from a particular contact, and the metadata associates notifications from the particular contact with audio notifications. For example, the first event corresponds to a message received from a particular sender, and the metadata specifies that messages from the particular sender should be presented to the user verbally. In some embodiments, the particular contact is one of a plurality of contacts on a contact whitelist stored on the electronic device.

Conditionally outputting audio notifications for a detected event based on metadata of the detected event indicating that the event is associated with audio notifications reduces the intrusiveness and frequency of audio notifications by requiring each event to specify that audio notifications should be provided for that event, and provides flexibility in enabling or disabling audio notifications for specific events. Providing improved control over the presentation of audio notifications enhances the operability of the device, reduces power usage, and improves battery life of the device.

In some embodiments, outputting the one or more audio notifications corresponding to the first event is (1016) performed in accordance with a determination that the electronic device is in a respective mode that allows audio notifications. In some embodiments, in accordance with a determination that the electronic device is in a respective mode that does not allow audio notifications, the device forgoes outputting the one or more audio notifications corresponding to the first event, or delays outputting the one or more audio notifications corresponding to the first event until the device is in a mode that does allow audio notifications.

In some embodiments, one or more device modes can be defined in a settings user interface on the electronic device. In some embodiments, the one or more device modes are defined by the user (e.g., the user specifies modes based on situations in which the user wishes to receive audio notifications or does not wish to receive audio notifications). In some embodiments, the one or more device modes are defined based on volume settings, time of day, geographical location of the device, and/or the user's calendar availability, etc. An example mode that allows audio notifications is a "work" mode defined based on business hours and/or the presence of the device at or near the location of a user's workplace. An example mode that does not allow audio notifications is a "gym" mode defined based on a scheduled time and/or the presence of the device at or near the location of the user's gym. In some embodiments, a specific mode allows specific types of audio notifications without allowing other types of audio notifications (e.g., a "work" mode allows for calendar notifications to be verbalized but not gaming notifications).

Conditionally outputting audio notifications for a detected event based on determination that a current mode or context of the electronic device allows audio notifications reduces the intrusiveness and frequency of audio notifications in certain modes while allowing audio notifications to be provided in other modes, as appropriate for the particular device mode, and provides the user with flexibility in enabling or disabling audio notifications for specific modes (e.g., times of day, locations, types of notifications, etc.) Providing the user with improved control over the presentation of audio notifications enhances the operability of the device, reduces power usage, and improves battery life of the device.

In some embodiments, outputting the one or more audio notifications corresponding to the first event is (1018) performed based on previous user behavior monitored by a virtual assistant executing on the electronic device. In some embodiments, a virtual assistant monitors user behavior on the electronic device to determine situations (e.g., geographical locations, times of day, volume settings, senders, etc.) for which the user has allowed the outputting of audio notifications and situations for which the user has suppressed the outputting of audio notifications (e.g., by choosing not to wear the one or more wearable audio output devices, by skipping audio notifications being presented, etc.). In some embodiments, outputting the one or more audio notifications corresponding to the first event is based on a determination that the device and/or the one or more wearable audio output devices are in a situation in which the user has previously allowed audio notifications. In some embodiments, in accordance with a determination that the device and/or the one or more wearable audio output devices are in a situation in which the user has previously suppressed audio notifications, the device forgoes outputting the one or more audio notifications corresponding to the first event.

Conditionally outputting audio notifications for a detected event automatically based on previous user behavior learned by a virtual assistant reduces the number and extent of control options that need to be presented to the user via a displayed settings interface and reduces the number of inputs that the user needs to provide to the electronic device to specify desired notifications behavior, thereby enhancing the operability of the device, reducing power usage, and improving battery life of the device.

In some embodiments where the electronic device is in communication with one or more audio input devices, prior to outputting the one or more audio notifications corresponding to the first event, the device detects (1020), via the one or more audio input devices, a verbal input indicating a respective event property (e.g., an event type, an application, an application type, etc.) that is of interest to the user. In some embodiments, outputting the one or more audio notifications corresponding to the first event is performed in accordance with a determination that the first event is associated with the respective event property. For example, in response to a verbal input from the user indicating that the user is interested in transportation-related notifications, the device outputs the one or more audio notifications if the first event includes transportation information (e.g., public transportation scheduling information) or if the first event is associated with a navigation application. In some embodiments, the event property that is of interest to the user is inferred from the verbal input by the electronic device (e.g., by a virtual assistant executing on the device).

Conditionally outputting audio notifications for a detected event based on the event being associated with an event property specified by the user with a prior verbal input provides the user with flexibility in enabling or disabling (or emphasizing or deemphasizing) notifications associated with certain types of events, without requiring the user to specify the event property of interest via one or more displayed control options and thus reducing the amount of time that the display needs to be powered on, thereby enhancing the operability of the device, reducing power usage, and improving battery life of the device.

It should be understood that the particular order in which the operations in FIGS. 10A-10B have been described is merely an example and is not intended to indicate that the described order is the only order in which the operations could be performed. One of ordinary skill in the art would recognize various ways to reorder the operations described herein. Additionally, it should be noted that details of other processes described herein with respect to one or more other methods described herein (e.g., methods 600, 700, 800, and/or 900) are also applicable in an analogous manner to method 1000 described above with respect to FIGS. 10A-10B. For example, the devices, or components thereof, events, audio notifications, and inputs described above with reference to method 1000 optionally have one or more of the characteristics of the devices, or components thereof, events, audio notifications, and inputs described herein with reference to one or more other methods described herein (e.g., methods 600, 700, 800, and/or 900). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to provide audio notifications to users to notify the users of events that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver event information as part of the audio notifications that is of greater interest to the user while reducing the volume of delivered event information that is not of interest or value to the user. Accordingly, use of such personal information data enables delivery of event information to the user that is tailored to the user's interests and that takes into account information already known to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of event notification delivery services, the present technology can be configured to allow users to select to "opt in" or "opt out" of participation in the collection of personal information data during registration for services or anytime thereafter. In another example, users can select not to provide contact-identifying data, location data, data of received messages (such as phone calls, text messages, e-mails, etc. calendar invitations or events), etc., for targeted event notification delivery services. In yet another example, users can select to limit the length of time such data is maintained or entirely prohibit the development of a user activity profile based on such data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, event notifications can be selected and delivered to users by inferring preferences based on non-personal information data or a bare minimum amount of personal information, such as the content being requested by the device associated with a user, other non-personal information available to the event notification delivery services, or publicly available information.

What is claimed is:

1. A method, comprising:
    at an electronic device that is in communication with one or more wearable audio output devices:
        detecting occurrence of a plurality of events while the one or more wearable audio output devices are being worn by a user; and
        in response to detecting the occurrence of the plurality of events:
            in accordance with a determination that the user of the electronic device is currently engaged in a conversation, delaying outputting audio notifications corresponding to the plurality of events until the conversation has ended, and after the conversation has ended, outputting a summary of the plurality of events via the one or more wearable audio output devices; and
            in accordance with a determination that the user of the electronic device is not currently engaged in a conversation, outputting one or more audio notifications corresponding to a first event of the plurality of events without delaying the outputting.

2. The method of claim 1, wherein the electronic device is in communication with one or more audio input devices, and determining that the user of the electronic device is currently engaged in a conversation includes detecting speech via the one or more audio input devices.

3. The method of claim 1, wherein outputting the one or more audio notifications includes outputting audio content corresponding to the first event using simulated speech.

4. The method of claim 1, wherein outputting the one or more audio notifications includes outputting one or more audio tones.

5. The method of claim 1, wherein the electronic device includes or is in communication with one or more second audio output devices distinct from the one or more wearable audio output devices, and the method includes, in conjunction with outputting verbalized information corresponding to a second event via the one or more second audio output devices, forgoing outputting audio notifications corresponding to the second event via the one or more wearable audio output devices.

6. The method of claim 1, wherein outputting the one or more audio notifications corresponding to the first event is performed in accordance with a determination that metadata of the first event associates the first event with audio notifications.

7. The method of claim 1, wherein outputting the one or more audio notifications corresponding to the first event is performed in accordance with a determination that the electronic device is in a respective mode that allows audio notifications.

8. The method of claim 1, wherein outputting the one or more audio notifications corresponding to the first event is performed based on previous user behavior monitored by a virtual assistant executing on the electronic device.

9. The method of claim 1, wherein the electronic device is in communication with one or more audio input devices, and the method includes:
    prior to outputting the one or more audio notifications corresponding to the first event, detecting, via the one or more audio input devices, a verbal input indicating a respective event property that is of interest to the user;
    wherein outputting the one or more audio notifications corresponding to the first event is performed in accordance with a determination that the first event is associated with the respective event property.

10. An electronic device that is in communication with one or more wearable audio output devices, the electronic device comprising:
    one or more processors; and
    memory storing one or more programs, wherein the one or more programs are configured to be executed by the one or more processors, the one or more programs including instructions for:
        detecting occurrence of a plurality of events while the one or more wearable audio output devices are being worn by a user; and
        in response to detecting the occurrence of the plurality of events:
            in accordance with a determination that the user of the electronic device is currently engaged in a conversation, delaying outputting audio notifications corresponding to the plurality of events until the conversation has ended, and after the conversation has ended, outputting a summary of the plurality of events via the one or more wearable audio output devices; and in accordance with a determination that the user of the electronic device is not currently engaged in a conversation, outputting one or more audio notifications corresponding to a first event of the plurality of events without delaying the outputting.

11. The electronic device of claim 10, wherein the electronic device is in communication with one or more audio input devices, and determining that the user of the electronic device is currently engaged in a conversation includes detecting speech via the one or more audio input devices.

12. The electronic device of claim 10, wherein outputting the one or more audio notifications includes outputting audio content corresponding to the first event using simulated speech.

13. The electronic device of claim 10, wherein outputting the one or more audio notifications includes outputting one or more audio tones.

14. The electronic device of claim 10, wherein the electronic device includes or is in communication with one or more second audio output devices distinct from the one or more wearable audio output devices, and the one or more programs include instructions for, in conjunction with outputting verbalized information corresponding to a second event via the one or more second audio output devices, forgoing outputting audio notifications corresponding to the second event via the one or more wearable audio output devices.

15. The electronic device of claim 10, wherein outputting the one or more audio notifications corresponding to the first event is performed in accordance with a determination that metadata of the first event associates the first event with audio notifications.

16. The electronic device of claim 10, wherein outputting the one or more audio notifications corresponding to the first event is performed in accordance with a determination that the electronic device is in a respective mode that allows audio notifications.

17. The electronic device of claim 10, wherein outputting the one or more audio notifications corresponding to the first event is performed based on previous user behavior monitored by a virtual assistant executing on the electronic device.

18. The electronic device of claim 10, wherein the electronic device is in communication with one or more audio input devices, and the one or more programs include instructions for:
prior to outputting the one or more audio notifications corresponding to the first event, detecting, via the one or more audio input devices, a verbal input indicating a respective event property that is of interest to the user;
wherein outputting the one or more audio notifications corresponding to the first event is performed in accordance with a determination that the first event is associated with the respective event property.

19. A non-transitory computer readable storage medium storing one or more programs, the one or more programs comprising instructions, which, when executed by an electronic device that is in communication with one or more wearable audio output devices, cause the electronic device to:
detect occurrence of a plurality of events while the one or more wearable audio output devices are being worn by a user; and
in response to detecting the occurrence of the plurality of events:

in accordance with a determination that the user of the electronic device is currently engaged in a conversation, delaying outputting audio notifications corresponding to the plurality of events until the conversation has ended, and after the conversation has ended, outputting a summary of the plurality of events via the one or more wearable audio output devices; and
in accordance with a determination that the user of the electronic device is not currently engaged in a conversation, outputting one or more audio notifications corresponding to a first event of the plurality of events without delaying the outputting.

20. The non-transitory computer readable storage medium of claim 19, wherein the electronic device is in communication with one or more audio input devices, and determining that the user of the electronic device is currently engaged in a conversation includes detecting speech via the one or more audio input devices.

21. The non-transitory computer readable storage medium of claim 19, wherein outputting the one or more audio notifications includes outputting audio content corresponding to the first event using simulated speech.

22. The non-transitory computer readable storage medium of claim 19, wherein outputting the one or more audio notifications includes outputting one or more audio tones.

23. The non-transitory computer readable storage medium of claim 19, wherein the electronic device includes or is in communication with one or more second audio output devices distinct from the one or more wearable audio output devices, and the one or more programs includes instructions that when executed by the electronic device cause the electronic device to:
in conjunction with outputting verbalized information corresponding to a second event via the one or more second audio output devices, forgo outputting audio notifications corresponding to the second event via the one or more wearable audio output devices.

24. The non-transitory computer readable storage medium of claim 19, wherein outputting the one or more audio notifications corresponding to the first event is performed in accordance with a determination that metadata of the first event associates the first event with audio notifications.

25. The non-transitory computer readable storage medium of claim 19, wherein outputting the one or more audio notifications corresponding to the first event is performed in accordance with a determination that the electronic device is in a respective mode that allows audio notifications.

26. The non-transitory computer readable storage medium of claim 19, wherein outputting the one or more audio notifications corresponding to the first event is performed based on previous user behavior monitored by a virtual assistant executing on the electronic device.

27. The non-transitory computer readable storage medium of claim 19, wherein the electronic device is in communication with one or more audio input devices, and the one or more programs includes instructions that when executed by the electronic device cause the electronic device to:
prior to outputting the one or more audio notifications corresponding to the first event, detect, via the one or more audio input devices, a verbal input indicating a respective event property that is of interest to the user;
wherein outputting the one or more audio notifications corresponding to the first event is performed in accordance with a determination that the first event is associated with the respective event property.

\* \* \* \* \*